(12) United States Patent
Weber et al.

(10) Patent No.: US 7,651,114 B2
(45) Date of Patent: Jan. 26, 2010

(54) ADJUSTABLE TRAILER COUPLING SYSTEM

(76) Inventors: Richard Weber, 6800 Reeder Mesa Rd., Whitewater, CO (US) 81527; Linda Weber, 6800 Reeder Mesa Rd., Whitewater, CO (US) 81527

( * ) Notice: Subject to any disclaimer, the term of this patent is extended or adjusted under 35 U.S.C. 154(b) by 477 days.

(21) Appl. No.: 10/592,662

(22) PCT Filed: Mar. 11, 2004

(86) PCT No.: PCT/US2004/007747

§ 371 (c)(1), (2), (4) Date: Sep. 11, 2006

(87) PCT Pub. No.: WO2005/095130

PCT Pub. Date: Oct. 13, 2005

(65) Prior Publication Data

US 2008/0054598 A1    Mar. 6, 2008

(51) Int. Cl.
*B60D 1/36* (2006.01)
(52) U.S. Cl. .................. 280/477; 254/419; 280/475; 280/766.1
(58) Field of Classification Search ............... 280/468, 280/469, 470, 471, 475, 477, 478.1, 479.1, 280/763.1; 254/419, 420, 423, 424, 425, 254/427; 414/481
See application file for complete search history.

(56) References Cited

U.S. PATENT DOCUMENTS

| | | |
|---|---|---|
| 831,956 A | 12/1906 | Jonas |
| 839,518 A | 12/1906 | Shaw |
| 929,920 A | 8/1909 | Davis |
| 1,065,989 A | 7/1913 | Verbeke |
| 1,131,018 A | 3/1915 | Troutman |
| 1,235,082 A | 7/1917 | Brethorst |
| 1,304,276 A | 5/1919 | Haeseleer |
| 1,314,982 A | 9/1919 | Reed |
| 1,326,551 A | 12/1919 | Turnbull |
| 1,350,962 A | 8/1920 | Flory |
| 1,391,760 A | 9/1921 | Collier |
| 1,424,631 A | 8/1922 | Edmonds |

(Continued)

FOREIGN PATENT DOCUMENTS

WO    WO 2005/095130 A1    10/2005

OTHER PUBLICATIONS

International Preliminary Examination Report for PCT/USO4/07747, the parent international application for this application, dated Oct. 19, 2006.

*Primary Examiner*—Ann Marie M Boehler
(74) *Attorney, Agent, or Firm*—Santangelo Law Offices

(57) ABSTRACT

Towing adjustment and coupling techniques may include a retentive lateral trailer adjustment device of a trailer (1) configured to provide lateral adjustment of the trailer (1). In some embodiments, a trailer (1) may include a coupler element (3) and at least one retentive lateral adjustment device configured to provide adjustment in a lateral direction (8) of the coupler element (3). Embodiments may have configurations directed to couplers such as a gooseneck hitch, a fifthwheel hitch, and a pull-type or tongue hitch. Embodiments may also provide a fore-aft position indicator (44) with or without a fore-aft position sensor (50) through which proper positioning of a source of tow power (54) relative to a trailer (1) may be facilitated in a fore-aft direction (7). Corresponding methods are included as embodiments of the invention.

43 Claims, 39 Drawing Sheets

U.S. PATENT DOCUMENTS

| | | |
|---|---|---|
| 1,433,922 A | 10/1922 | Williams |
| 1,450,526 A | 4/1923 | Timmis |
| 1,479,182 A | 1/1924 | Jeschke |
| 1,665,133 A | 4/1928 | Gibson |
| 1,768,304 A | 6/1930 | Ayler |
| 2,050,093 A | 8/1936 | Goldman |
| 2,089,400 A | 8/1937 | Morris |
| 2,091,668 A | 8/1937 | Bradford |
| 2,104,734 A | 1/1938 | Carpenter |
| 2,150,269 A | 3/1939 | Dreisbach |
| 2,287,234 A | 6/1942 | Ducharme |
| 2,386,195 A | 10/1945 | Clark |
| 2,444,876 A | 6/1948 | Kuhl |
| 2,451,660 A | 10/1948 | Clark et al. |
| 2,463,926 A | 3/1949 | Ward |
| 2,472,514 A | 6/1949 | Brinkley |
| 2,475,443 A | 7/1949 | Bill |
| 2,523,211 A | 9/1950 | Hedgpeth |
| 2,531,289 A | 11/1950 | Murat |
| 2,546,531 A | 3/1951 | Vutz |
| 2,638,315 A | 5/1953 | Wagner |
| 2,663,574 A | 12/1953 | Martin |
| 2,687,899 A | 8/1954 | Bendtsen |
| 2,708,045 A | 5/1955 | Shontz |
| 2,712,452 A | 7/1955 | Hallowell |
| 2,736,575 A | 2/1956 | Gebhart |
| 2,783,039 A | 2/1957 | Wilson |
| 2,786,690 A | 3/1957 | Tharp |
| 2,854,148 A | 9/1958 | Mattos et al. |
| 2,864,627 A | 12/1958 | Kleinknecht |
| 2,885,462 A | 5/1959 | Sylvester |
| 2,917,323 A | 12/1959 | Mandekic |
| 2,919,142 A | 12/1959 | Winget |
| 2,947,551 A | 2/1960 | Reimers |
| 2,984,011 A | 5/1961 | Hamilton |
| 2,992,832 A | 7/1961 | Robinson |
| 3,084,953 A | 4/1963 | McGregor |
| 3,099,462 A | 7/1963 | Lent |
| 3,118,688 A | 1/1964 | Stilley |
| 3,126,210 A | 3/1964 | Hill |
| 3,150,884 A | 9/1964 | Drott |
| 3,159,368 A | 12/1964 | Ahlbin el al. |
| 3,169,028 A | 2/1965 | Scrivner |
| 3,178,203 A | 4/1965 | Elliott |
| 3,181,891 A | 5/1965 | Moats |
| 3,201,144 A | 8/1965 | Smyser |
| 3,266,818 A | 8/1966 | Hill et al. |
| 3,281,161 A | 10/1966 | Anderson |
| 3,311,390 A | 3/1967 | Rendessy |
| 3,319,977 A | 5/1967 | Quandt et al. |
| 3,329,402 A | 7/1967 | Grumman |
| 3,400,948 A | 9/1968 | Matson |
| 3,439,764 A | 4/1969 | Kimball |
| 3,464,882 A | 9/1969 | Morton |
| 3,482,847 A | 12/1969 | Hart |
| 3,549,173 A | 12/1970 | Stanfield |
| 3,576,225 A | 4/1971 | Chambers |
| 3,596,925 A | 8/1971 | Richie |
| 3,622,182 A | 11/1971 | Grosse-Rhode |
| 3,659,876 A | 5/1972 | Melton |
| 3,715,132 A | 2/1973 | Denny |
| 3,718,317 A | 2/1973 | Hilmer |
| 3,738,672 A | 6/1973 | Dalton |
| 3,740,077 A | 6/1973 | Williams |
| 3,740,078 A | 6/1973 | Murr |
| 3,765,703 A | 10/1973 | Voelkerding et al. |
| 3,767,230 A | 10/1973 | DeVries |
| 3,774,149 A | 11/1973 | Bennett |
| 3,782,760 A | 1/1974 | Mann |
| 3,807,767 A | 4/1974 | Moline |
| 3,818,599 A | 6/1974 | Tague |
| 3,823,962 A | 7/1974 | Martin, Jr. |
| 3,825,921 A | 7/1974 | Marus et al. |
| 3,837,675 A | 9/1974 | Barnes et al. |
| 3,858,966 A | 1/1975 | Lowell, Jr. |
| 3,860,267 A | 1/1975 | Lyons |
| 3,889,384 A | 6/1975 | White |
| 3,893,713 A | 7/1975 | Ivy |
| 3,904,225 A | 9/1975 | George et al. |
| 3,912,119 A | 10/1975 | Hill et al. |
| 3,918,746 A | 11/1975 | Lehtisaari |
| 3,922,007 A | 11/1975 | Friedebach |
| 3,938,122 A | 2/1976 | Mangus |
| 3,989,270 A | 11/1976 | Henderson |
| 4,029,335 A | 6/1977 | Cady et al. |
| 4,047,734 A | 9/1977 | Miles |
| 4,054,302 A | 10/1977 | Campbell |
| 4,060,255 A | 11/1977 | Zimmerman |
| 4,065,147 A | 12/1977 | Ross |
| 4,073,508 A | 2/1978 | George et al. |
| 4,082,311 A | 4/1978 | Hamman |
| 4,125,272 A | 11/1978 | Putnam, Jr. et al. |
| 4,159,833 A | 7/1979 | Meiners |
| 4,168,082 A | 9/1979 | Hendrickson |
| 4,168,847 A | 9/1979 | Westphal |
| 4,169,610 A | 10/1979 | Paufler |
| 4,173,353 A | 11/1979 | Steele |
| 4,176,853 A | 12/1979 | Brock |
| 4,176,854 A | 12/1979 | Hill et al. |
| 4,183,548 A | 1/1980 | Schneckloth |
| 4,186,938 A | 2/1980 | Youngblood |
| 4,186,939 A | 2/1980 | Woods et al. |
| 4,187,494 A | 2/1980 | Jessee |
| 4,202,562 A | 5/1980 | Sorenson |
| 4,205,453 A | 6/1980 | Steele |
| 4,215,875 A | 8/1980 | Younger |
| 4,254,968 A | 3/1981 | DelVecchio |
| 4,254,969 A | 3/1981 | Martin |
| 4,283,173 A | 8/1981 | Gostomski et al. |
| 4,285,138 A | 8/1981 | Berry |
| 4,313,264 A | 2/1982 | Miller, Sr. |
| 4,320,907 A | 3/1982 | Eaton |
| 4,374,593 A | 2/1983 | Smith et al. |
| 4,398,744 A | 8/1983 | Schoppel et al. |
| 4,428,596 A | 1/1984 | Bell et al. |
| 4,431,208 A | 2/1984 | Geeves |
| 4,472,100 A | 9/1984 | Wagner |
| 4,473,239 A | 9/1984 | Smart |
| 4,511,159 A | 4/1985 | Younger |
| 4,537,416 A | 8/1985 | Linaburg |
| 4,564,209 A | 1/1986 | Kingsley et al. |
| 4,583,481 A | 4/1986 | Garrison |
| 4,621,432 A | 11/1986 | Law |
| 4,666,176 A | 5/1987 | Sand |
| 4,669,748 A | 6/1987 | LeVee |
| 4,708,359 A | 11/1987 | Davenport |
| 4,773,667 A | 9/1988 | Elkins |
| 4,774,823 A | 10/1988 | Callison |
| 4,792,151 A | 12/1988 | Feld |
| 4,799,705 A | 1/1989 | Janes et al. |
| 4,854,604 A | 8/1989 | Stallsworth |
| 4,856,200 A | 8/1989 | Riggs |
| 4,856,804 A | 8/1989 | Nash |
| 4,884,496 A | 12/1989 | Donavich |
| 4,893,829 A | 1/1990 | Davis |
| 4,903,978 A | 2/1990 | Schrum, III |
| 4,905,376 A | 3/1990 | Neeley |
| 4,911,460 A | 3/1990 | DePaula |
| D311,511 S | 10/1990 | Craig |
| 4,961,589 A | 10/1990 | Faurenhoff |
| 4,961,590 A | 10/1990 | Davenport |
| 4,991,865 A | 2/1991 | Francisco |
| 5,005,852 A | 4/1991 | Smyly, Sr. |
| 5,009,444 A | 4/1991 | Williams, Jr. |

| | | | | | |
|---|---|---|---|---|---|
| 5,009,445 A | 4/1991 | Williams, Jr. | 5,669,621 A | 9/1997 | Lockwood |
| 5,016,900 A | 5/1991 | McCully | 5,678,839 A | 10/1997 | Pobud, Jr. et al. |
| 5,035,441 A | 7/1991 | Murray | 5,680,706 A | 10/1997 | Talcott |
| 5,036,593 A | 8/1991 | Collier | 5,690,348 A | 11/1997 | Williams, Jr. |
| 5,080,386 A | 1/1992 | Lazar | 5,697,630 A | 12/1997 | Thompson et al. |
| 5,085,408 A | 2/1992 | Norton et al. | 5,707,070 A | 1/1998 | Lindenman et al. |
| 5,108,123 A | 4/1992 | Rubenzik | 5,725,231 A | 3/1998 | Buie |
| 5,113,588 A | 5/1992 | Walston | 5,758,893 A | 6/1998 | Schultz |
| 5,114,170 A | 5/1992 | Lanni et al. | 5,769,443 A | 6/1998 | Muzny |
| 5,125,679 A | 6/1992 | Delano | 5,779,256 A | 7/1998 | Vass |
| 5,143,393 A | 9/1992 | Meyer | 5,785,330 A | 7/1998 | Shoquist |
| 5,150,911 A | 9/1992 | Williams | 5,797,616 A | 8/1998 | Clement |
| 5,184,839 A | 2/1993 | Guedry | 5,806,196 A | 9/1998 | Gibbs et al. |
| 5,195,769 A | 3/1993 | Williams, Jr. | 5,806,872 A | 9/1998 | Szczypski |
| 5,224,270 A | 7/1993 | Burrus | 5,821,852 A | 10/1998 | Fairchild |
| 5,236,215 A | 8/1993 | Wylie | 5,839,745 A | 11/1998 | Cattau et al. |
| 5,269,554 A | 12/1993 | Law et al. | 5,882,027 A | 3/1999 | Tevis |
| 5,277,446 A | 1/1994 | Hamel | 5,882,029 A | 3/1999 | Kennedy |
| D344,485 S | 2/1994 | Linne et al. | 5,887,884 A | 3/1999 | Smith |
| 5,282,515 A | 2/1994 | Bell | 5,893,575 A | 4/1999 | Larkin |
| 5,286,050 A | 2/1994 | Stallings, Jr. et al. | 5,909,892 A | 6/1999 | Richardson |
| 5,288,095 A | 2/1994 | Swindall | 5,924,716 A | 7/1999 | Burkhart, Sr. et al. |
| 5,288,096 A | 2/1994 | Degelman | 5,927,229 A | 7/1999 | Karr, Jr. |
| 5,309,289 A | 5/1994 | Johnson | 5,927,742 A | 7/1999 | Draper |
| 5,314,202 A | 5/1994 | Wilkins, Jr. | 5,951,035 A | 9/1999 | Phillips, Jr. et al. |
| 5,328,199 A | 7/1994 | Howe | 5,970,619 A | 10/1999 | Wells |
| 5,335,930 A | 8/1994 | Tighe | 5,975,552 A | 11/1999 | Slaton |
| 5,338,047 A | 8/1994 | Knisley | 5,979,927 A | 11/1999 | Hale |
| 5,340,143 A | 8/1994 | Williams, Jr. | 6,010,142 A | 1/2000 | McCoy et al. |
| 5,348,329 A | 9/1994 | Morin et al. | 6,042,136 A | 3/2000 | Heinecke |
| 5,405,160 A | 4/1995 | Weaver | 6,076,847 A | 6/2000 | Thornton |
| 5,449,191 A | 9/1995 | Cattau | 6,086,083 A | 7/2000 | Wilks |
| 5,465,992 A | 11/1995 | Anderson | 6,089,590 A | 7/2000 | Bowers |
| 5,478,101 A | 12/1995 | Roberson | 6,102,422 A | 8/2000 | Damron |
| 5,482,309 A | 1/1996 | Hollis | 6,179,318 B1 | 1/2001 | Howard |
| 5,482,310 A | 1/1996 | Staggs | 6,182,997 B1 | 2/2001 | Ullrich et al. |
| 5,503,422 A | 4/1996 | Austin | 6,193,258 B1 | 2/2001 | Kennedy |
| 5,509,682 A | 4/1996 | Lindenman et al. | 6,250,650 B1 | 6/2001 | Douglas |
| 5,513,870 A | 5/1996 | Hickman | 6,259,357 B1 | 7/2001 | Heider |
| 5,516,137 A | 5/1996 | Kass et al. | 6,312,004 B1 | 11/2001 | Kiss |
| 5,516,139 A | 5/1996 | Woods | 6,318,747 B1 | 11/2001 | Ratican |
| 5,529,329 A | 6/1996 | McCoy | 6,341,794 B1 | 1/2002 | Hunter |
| 5,529,330 A | 6/1996 | Roman | 6,348,112 B1 | 2/2002 | Hildreth et al. |
| 5,558,352 A | 9/1996 | Mills | 6,357,126 B1 | 3/2002 | Gillen, Jr. |
| 5,580,076 A | 12/1996 | DeRoule et al. | 6,357,777 B1 | 3/2002 | Linger et al. |
| 5,580,088 A | 12/1996 | Griffith | 6,585,280 B1 | 7/2003 | Wiers |
| 5,650,764 A | 7/1997 | McCullough | 6,634,666 B2 | 10/2003 | Shilitz et al. |
| 5,657,175 A | 8/1997 | Brewington | 2002/0185838 A1 | 12/2002 | Shilitz et al. |

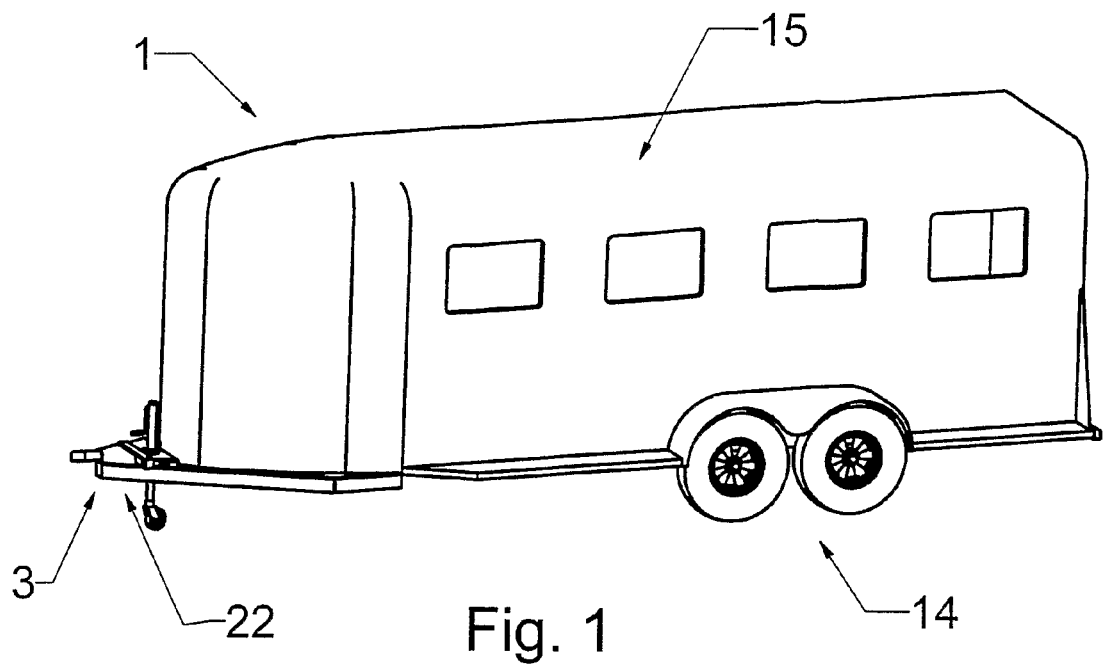
Fig. 1
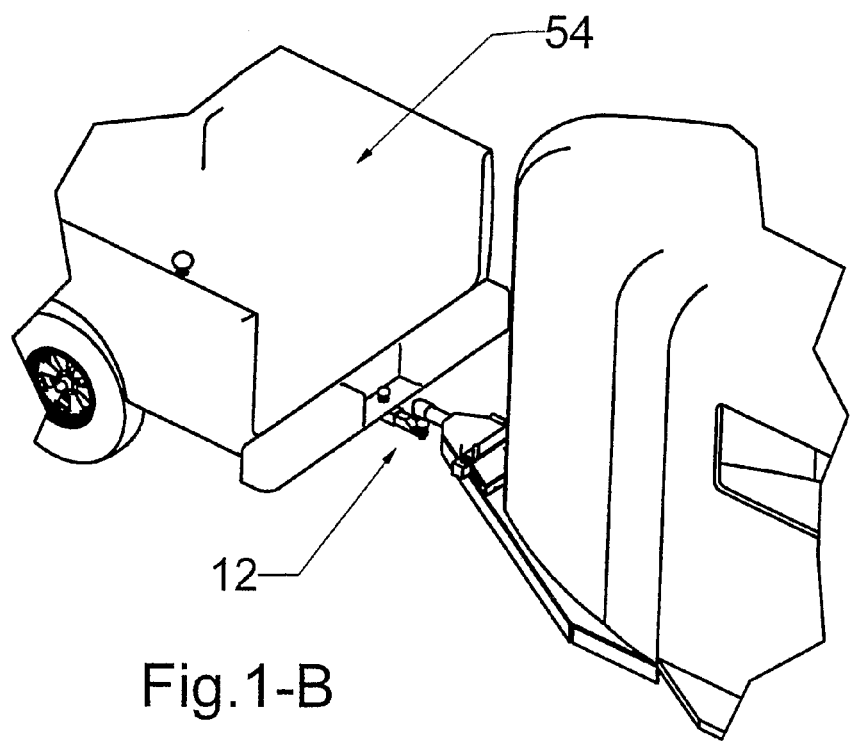
Fig.1-B

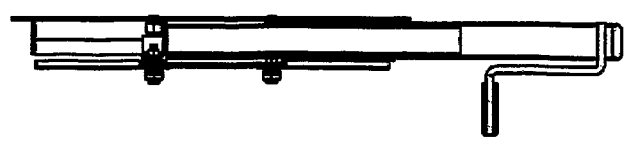
Fig. 13C
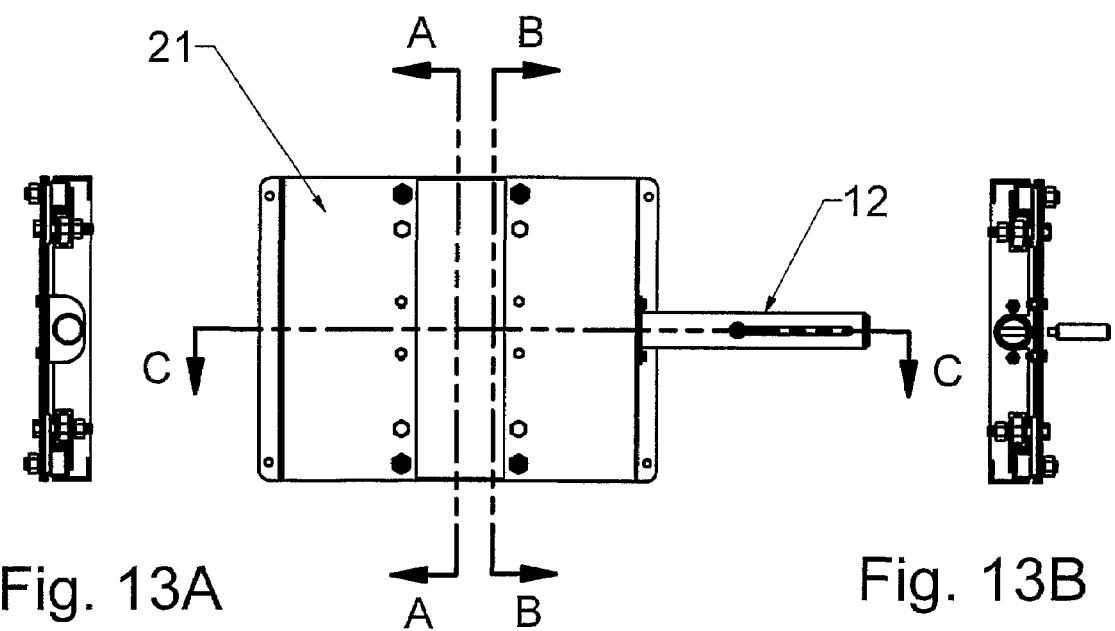
Fig. 13A  Fig. 13B
Fig. 13

ADJUSTABLE TRAILER COUPLING SYSTEM

TECHNICAL FIELD

The present invention is directed to the field of vehicle towing technology, and may especially relate to trailer technology, such as towed implements, trailers, or vehicles. Specifically, the invention relates to adjustments made when hitching a trailer to a vehicle.

BACKGROUND

Traditional towing technologies have incorporated various types of coupling devices, which may traditionally be referred to as a hitch or hitches, for the coupling of a trailer to a source of towing power. Hitches may generally be considered implements in a broad field potentially including a coupling portion associated with a source of towing power and a coupling portion associated with the trailer to be towed. A hitch configuration may be generally considered as having portions that are associated with the "tow-side" and portions that are associated with a "towed-side".

Hitch technology can include various hitch configurations, and may include gooseneck configurations, fifth wheel configurations, bumper pull or tongue configurations, pintle configurations, as well as other hitch configurations. The hitch may have one or more couple portions such as one or more receivers, inserts, pins, balls, rings, hooks, bars, tubes, bumpers, plates, plugs, tongues, or other such couplings. In order to affect a coupling of the portions of the hitch, each portion of the hitch may need to be aligned so that a coupling may be established. The task of coupling the couple portions of a hitch, and the alignment of such portions, is traditionally accomplished in some fashion by adjusting the position of one or both of the couple portions. The task of adjusting couple portions of hitches, however, may not have been conventionally facilitated for the various hitch configurations. As but one example, a traditional pull-type trailer may have a tongue hitch portion or a bumper or receiver portion at the towed-side and a ball hitch portion at the tow-side. These may require alignment of the tongue or coupler element and the ball to establish the coupling. Other hitch configurations and trailer types, can also require alignment of coupling portions to establish the coupling and allow towing.

In a typical hitch coupling process, the source of tow power may be initially positioned in a fore-aft direction to bring the tow-side hitch portion and the tow-side couple portion (such as a ball) within an acceptable distance of the towed-side hitch portion and the towed-side couple portion (such as a tongue). An initial tow-side adjustment may involve a rough alignment in a lateral direction (a direction roughly perpendicular to the typical direction of towing). The relative positions of the ball and tongue and the vertical distance between the hitch portions may be potentially considered as part of the initial tow-side adjustment. To establish the coupling, an adjustment of the towed-side hitch portion may follow the initial positioning of the source of tow power. This may even be followed by subsequent steps of attempted adjustment from the tow-side until an acceptable alignment of the tow-side and towed-side hitch portions is achieved and hitch coupling is established. This adjustment process can apply to each of the various hitch and trailer configurations, such as gooseneck, fifth wheel, bumper/receiver, A-frame types (including but not limited to industry standard class I, II, III, IV and V configurations), coupler-ball, and pintle configurations as may be used for various trailer body types, including but not limited to: camper bodies, van bodies, horse trailer bodies, flat beds, agricultural use bodies, car haulers, and all other commercial and recreational bodies.

As mentioned, after achieving a first gross adjustment or perhaps an initial positioning of the tow-side (which in some instances can involve several adjustments of the source of tow power), a second adjustment is often made to the towed-side hitch portion. In some hitch configurations, the towed-side hitch portion, and potentially the trailer itself, may be physically forced by one or more individuals to provide lateral and/or vertical adjustment of the towed-side hitch portion. Often this only works on hard, smooth, flat, and fairly level surfaces. The individuals may also interpose themselves between the source of tow power and the trailer during these adjustments, creating a potentially dangerous situation. In some hitch applications, a vertical jack may be provided for vertical adjustment of the towed-side hitch portion. Sometimes, the individuals involved may provide visual or audible guidance to an individual controlling the source of tow power during the adjustment from the tow-side. Again, this sometimes-difficult process can create a dangerous situation.

In some hitch configurations, positioning of the tow-side hitch portion is only approximate in that additional lateral and vertical adjustment may be required of either or both the tow-side and the towed-side hitch portions to achieve coupling. The additional lateral and vertical adjustment of the tow-side and the towed-side hitch portions of conventional technologies may be a time-consuming and inconvenient. Individuals controlling the source of tow power may be inexperienced, delays can occur, and risks can be created. Some trailers may be simply too heavy for manual lifting and lateral adjustment by individuals, potentially resulting in a failure to initially couple the hitch portions and possibly creating further risks or strains to individuals. Environmental factors can also affect the hitch coupling process. Terrain conditions can affect the positioning of the source of tow power during the coupling process. Sometimes, after an adjustment of the source of tow power has been made the source of tow power, such as a truck or other vehicle, may adjust under its own weight, a result potentially due to mud, snow, mechanical, or other conditions. Wind or unintended forces applied to the vehicle could also cause the vehicle to move from an adjusted position.

In all of the foregoing, the conventional technologies can suffer from various drawbacks. Some hitch and trailer configurations may provide a wheel at or near the towed-side hitch portion to allow lateral adjustment of such portion. Even with this type of an arrangement, drawbacks such as accuracy, time to achieving hitch coupling, and dangers and strains to individuals during the adjustment process can remain. This wheel-type technology can also suffer unintended adjustment. This type of unintended adjustment may even be generated by an unintended movement of the trailer, such as movement created by external forces corresponding to wind or an errant force applied by an individual or vehicle, or even as a result of lower frictional forces and the weight of the trailer. Forces may be generated by potential energy, tensions or elastic movements of wheels, axles, or other portions of the trailer, and may further manifest themselves as torque applied to or from portions of the trailer after or during such a process. The wheel-type technology may also not optimally maintain the intended position of the towed-side hitch portion or the intended trailer position, under some conditions and may require additional adjustments of one or both of the tow-side and towed-side hitch portions. These conditions may also exist during vertical adjustment of the towed-side hitch portion, and lateral positioning may not be maintained during vertical adjustment of the towed-side hitch portion. Wheel-type technology may also be difficult to use for heavy trailers and it is not usually even available for heavier commercial flat bed, pintle-type trailers or for gooseneck or fifth wheel-type trailers in either a commercial or a recreational context.

Other systems have attempted to address positioning as well. These technologies may include one or more plates or other elements that are laid upon the ground surface and upon which a wheel or other support element of the trailer rests. Some of the existing technologies can still require physical adjustment such as pushing, pulling, or lifting the towed-side hitch portion. They can also need to be stored for use when hitch coupling is established, potentially creating additional inconvenience. Plates can need to be placed underneath supporting elements of the trailer, adding further complication and steps to the hitch coupling process. Existing systems may even lack refined adjustment capability. Some existing systems have attempted to address lateral adjustment of one or more hitch portions during the coupling process. V-pan or guidance elements may lack the ability to maintain or be responsive to positioning of the tow-side and towed-side hitch portions, especially if unintended movement of the towed-side hitch portion or trailer occurs as described above. They may lack full adjustment capabilities and can still require multiple steps for adequate alignment, perhaps two actions at once such as the act of pushing or pulling the trailer laterally while simultaneously lowering the trailer onto the ball. Some systems may be associated with the source of tow power, thereby potentially reducing the availability of certain sources of tow power or requiring removal and/or reconfiguration of the source of tow power.

DISCLOSURE OF INVENTION

The present invention can be configured in many different embodiments to provide a system through which the challenges mentioned can be avoided. It addresses inadequacies in many of the variety of previously identified conventional technologies. Accordingly, the present invention, in some initial embodiments, may address adjustments made to facilitate coupling and towing a trailer, and the adjustment of trailers, generally, as well as the coupling of coupler elements of hitches, as well as the alignment and adjustment of such elements. The invention may also address other aspects of coupling and towing that may potentially be applicable to conventional technologies. Various objects, advantages, and features of the invention are, of course, set forth throughout the entire disclosure, figures, and claims of the application.

In summary, the invention, in some embodiments, involves a retentive lateral trailer adjustment device that can provide lateral adjustment of some coupler element to facilitate hitching up the trailer. In some embodiments, a trailer may include a couple portion and at least one retentive lateral adjustment element that permits a user to cause lateral adjustment of some coupler element, whether the trailer, the ball, the hitch or the like. Embodiments may have configurations directed to gooseneck hitches, fifthwheel hitches, tongue hitches (including but not limited to industry standard class I, II, III, IV and V configurations), or the like. Methods relative to each of these are also provided.

Embodiments may include a relative fore-aft position indicator to provide an indication of some position of a vehicle, such as a pickup or other vehicle (or more generally, a source of tow power) relative to a trailer. This may provide an indication of a towing position of the source of tow power, an indication of the fore-aft positioning of the source of tow power with respect to a position of a trailer, a position of a hitch, a position of a couple element such as of a hitch, a coupling status indication, or a towing status of a trailer. Corresponding methods of indicating the position of a source of tow power, methods of indicating the position of a trailer, methods of indicating the position of a hitch couple portion, methods of indicating coupling status of a coupler element, and methods of indicating towing status of a trailer are also provided as embodiments of the invention. Some embodiments involve methods of coupling a trailer to a source of tow power using one or more of the features, such as those described above, methods of adjusting a trailer, methods of adjusting coupler elements, methods of indicating the position of a source of tow power, and methods of indicating the position of a trailer. It should also be understood that all actions may be expressed as a means for taking an action or as an element, which causes that action. Similarly, each physical element disclosed should be understood to encompass a disclosure of the steps or actions facilitated by that physical element.

BRIEF DESCRIPTION OF THE DRAWINGS

The accompanying drawings, which are incorporated in and form a part of the specification, and disclosure generally, illustrate some embodiments of the present invention, and together with the description and claims, serve to explain the principles and enabling of such embodiments.

FIGS. 1 and 1-B are perspective views of an embodiment configured for an A-frame pull-type trailer with a tongue-and-ball hitch configuration.

FIG. 7-7D shows side, front, back and top section views of the isolated lateral trailer adjustment portion of the pedestal design in FIG. 2.

FIG. 13-13D shows front, side, and top section views of the isolated lateral trailer adjustment portion of the pedestal design in FIG. 8.

MODE(S) FOR CARRYING OUT THE INVENTION

As can be understood from the discussion, the present invention may be embodied in a variety of ways. Although discussed in the context of variety of particular embodiments, it should be understood that the various elements can be altered and even replaced or omitted. An understanding of the invention can be made from the written description, the figures, and the claims. As mentioned earlier, it includes a variety of aspects, which may be combined in different ways. The following descriptions are provided to list elements and describe some of the embodiments of the present invention. These elements are listed with initial embodiments, however it should be understood that they may be combined in any manner and in any number to create additional embodiments. The variously described examples and preferred embodiments should not be construed to limit the present invention to only the explicitly described systems, techniques, and applications. Further, this description should further be understood to support and encompass descriptions and claims of all the various embodiments, systems, techniques, methods, devices, and applications with any number of the disclosed elements, with each element alone, and also with any and all various permutations and combinations of all elements in this or any subsequent application.

Figure 8:
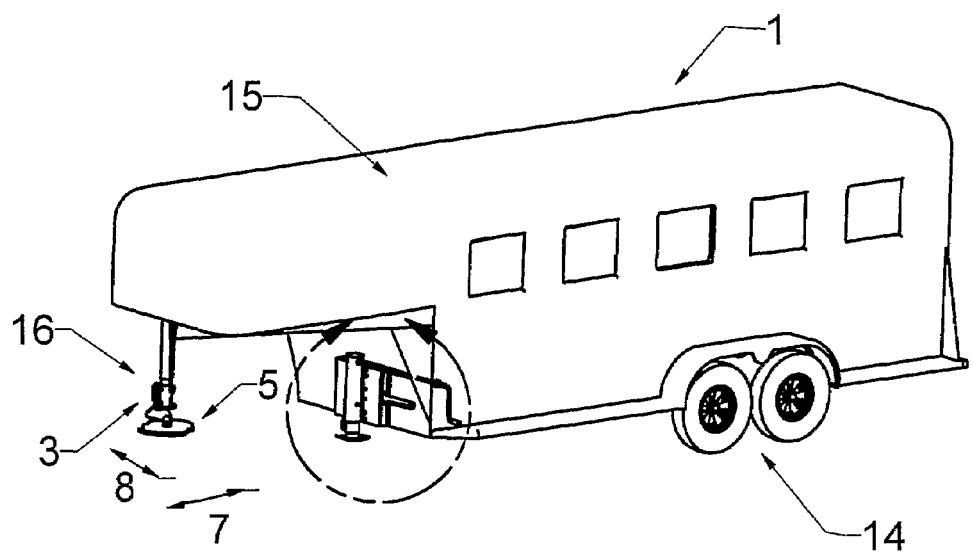
FIG. 8 is a perspective view of an embodiment configured for a pull-type trailer with a gooseneck hitch configuration.

Referring to FIGS. 1 and 8, it can be seen that generally the invention involves some type of trailer 1, which may be mounted on trailer wheels 14 to be towed behind a vehicle or, more generally, some source of towing power 54. In some embodiments, the trailer 1 may have a trailer body 15 which may include any one or more of a chassis, frame, bed, shell, or other enclosure. Of course, it is desirable that the source of towing power be coupled to the trailer 1 for towing. As shown in FIGS. 1-2, 8, and 28-30, the coupling can be accomplished by providing a variety of coupler elements 3, perhaps more specifically through providing a trailer coupler element 4. In order to couple the trailer 1 and the source of towing power through the coupler element 3, it may be necessary to position the two relative to each other. This can involve position the source of towing power or more precisely, position the trailer coupler element 4 (including at least part of the trailer coupler element) in both a fore-aft direction 7 (as perhaps shown best in FIGS. 29 and 30) and in a lateral direction 8 (as perhaps shown best in FIGS. 8 and 34). By positioning the trailer coupler element 4 appropriately, there can be a coupling of the trailer 1 and the source of towing power. Since the vehicle may be designed to be driven in the fore-and-aft direction 7, positioning in that direction may be straightforward. Positioning of the source of towing power relative to the trailer 1 in a lateral direction can be more difficult.

As shown in FIGS. 2, 3, 9, 28, and 35, when the trailer 1 is not connected to the source of towing power, it may be supported at one or more locations by a pedestal 6. This pedestal may or may not include a trailer vertical adjustment element or perhaps even a vertical jack. The vertical jack may be adjusted when the pedestal 6 is supporting the trailer 1 such as at one end of the trailer 1. The pedestal itself may be connected some location on the trailer by a pedestal mount 9. This pedestal mount 9 may connect the pedestal 6 to the trailer 1 by attaching the pedestal to a solid location such as by attaching it to the trailer's chassis, such as by connecting it to a portion of the frame, or the like. As numbered in FIGS. 2-4, 9-10, 15-16, 20, 23, 26, 34 and as shown in various of the other figures, there may also be a lateral trailer adjustment element 10 connected in such an arrangement, perhaps be connection between the pedestal 6 and the trailer 1. In some arrangements such as that shown in FIGS. 2 and 9, the design may include a frame mount 11 so that at least a portion of the frame of the trailer is responsive to any action of the lateral adjustment element 10. This may include, but is not limited to, mounting the lateral adjustment element 10 directly to the frame of the trailer 1. Attachment may also be a retentive attachment, perhaps one that remains on the trailer 1 at nearly all time and thus the arrangement may present a capability that is nearly always available. It may present elements that are permanently or perhaps at least semi-permanently (such as removably bolted) mounted to the trailer 1. Similarly, the lateral trailer adjustment element 10 may be rigidly or even fixedly mounted or fixedly connected to the trailer 1 so that no activity is necessary to put the element on the trailer 1 and thus it is largely always available without a need to attach the device if desired to be used.

One way of dealing with the challenges that may exist in properly positioning the coupler element 3 may be to move the pedestal 6 laterally relative to the trailer, or at least some portion of it. This, of course, can result in moving the coupler element 3 also if the two are responsive to each other. By the term "responsive" it is meant that the two may be either connected either directly or indirectly (such as when there are any number of intermediate elements) or one element may merely have some change in condition, or response, as a result of the other. In moving the pedestal 6 by a retentive lateral adjustment element 10, the pedestal 6 once adjusted may keep or retain its new position. Thus the pedestal 6 actually may move relative to the trailer 1, not merely permit a rolling or other movement motion of both the pedestal 6 and it attached the trailer 1.

When the coupler element 3 is responsive to the pedestal 6, naturally, the coupler element 3 may also retain its new position as well and so this process may be one example of positioning a coupler element in a retentive manner. This may even be considered the act of retentively laterally adjusting the trailer coupler element. Once it is understood that in some arrangements, the coupler element 3 may include both a trailer coupler element 4 (a portion mounted on the trailer 1) and, as shown in FIGS. 8, 29, 30, and 34-35, a vehicle coupler element 5 (a portion mounted on a vehicle) one example of a process according to the present invention can be further understood. First the vehicle, or more generally the source or towing power, may be positioned in the fore-aft direction 7, then the coupler element 3 may be laterally adjusted to permit a connection to be established. In achieving the movement the design may be such that there may be a continuous adjustment or an adjustment that can be moved any amount, not just a significant amount in a number of increments, such as a discrete amount. In permitting continuous movement, embodiments may include a continuous movement retentive lateral trailer adjustment element 10. Naturally, this element may be one way to permit the act of continuously retentively laterally adjusting the vehicle coupler element 5. As can be seen from the figures the lateral trailer adjustment element 6 may be retentively attached or perhaps mounted to the trailer so that only it needs to be moved. This can facilitate movement by not requiring movement of the usually heavier or more involved vehicle or source of towing power.

As shown in FIGS. 2-27, in order to permit the lateral adjustment element 10 to cause movement, there may be some type of actuator element 12 to which the lateral adjustment element 10 is responsive (again, as throughout this description, the term "responsive" should be broadly interpreted as explained above). This actuator element 12 may range from a simple manual actuator element, one example of which may be a hand crank 13, shown in FIGS. 3-7, 9-11, and 14-19 to more sophisticated devices such as a an electronic or even wireless remote actuator or the like. By the actuator element 12, the lateral adjustment element 10 may respond to cause the appropriate lateral movement of at least some portion of the coupler element 3. As can be seen in aforementioned Figures, in at least one embodiment the actuator element 12 may not only generally be a manual actuator element, it may actually be a hand crank 13. Through this arrangement, the lateral adjustment element 10 may be manually activated by hand cranking the appropriate portion.

Figure 25:
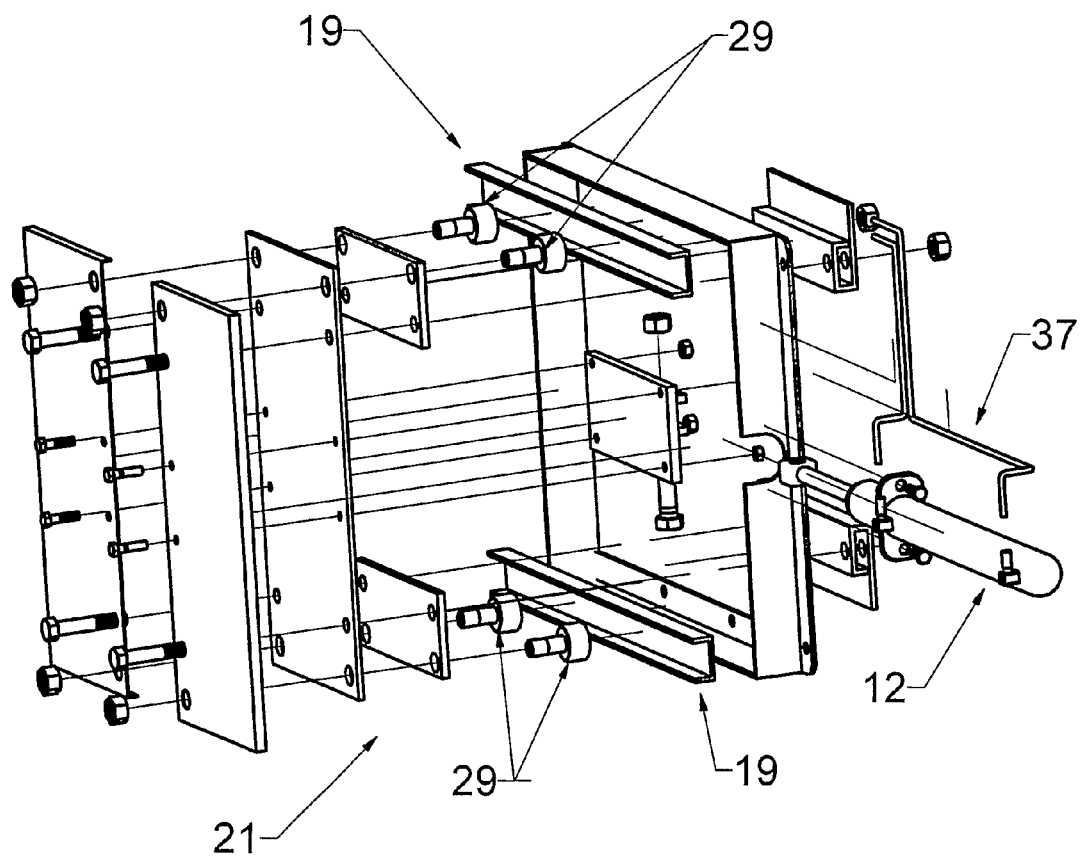
FIG. 25 is an exploded view of the hydraulic design shown in FIG. 23.
Figure 26:
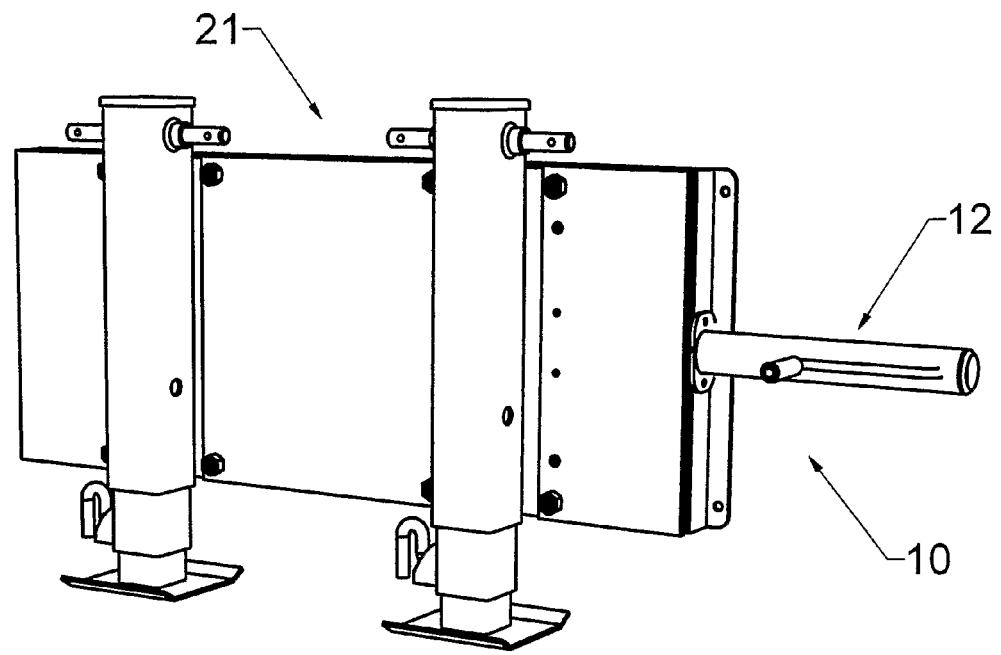
FIG. 26 shows a front view of another embodiment of an isolated lateral trailer adjustment portion.
Figure 38:
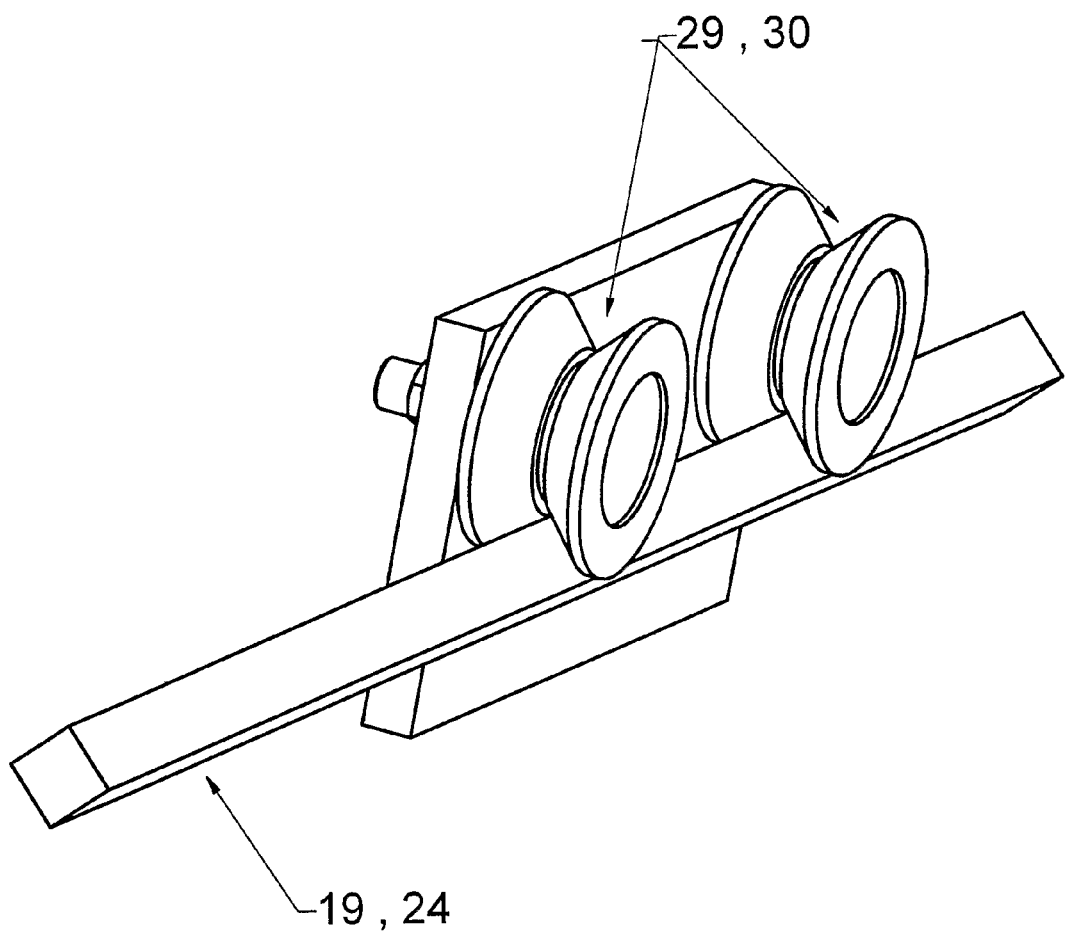
FIG. 38 is a perspective view of the indicator element shown in FIG. 28 prior to attachment.
Figure 39:
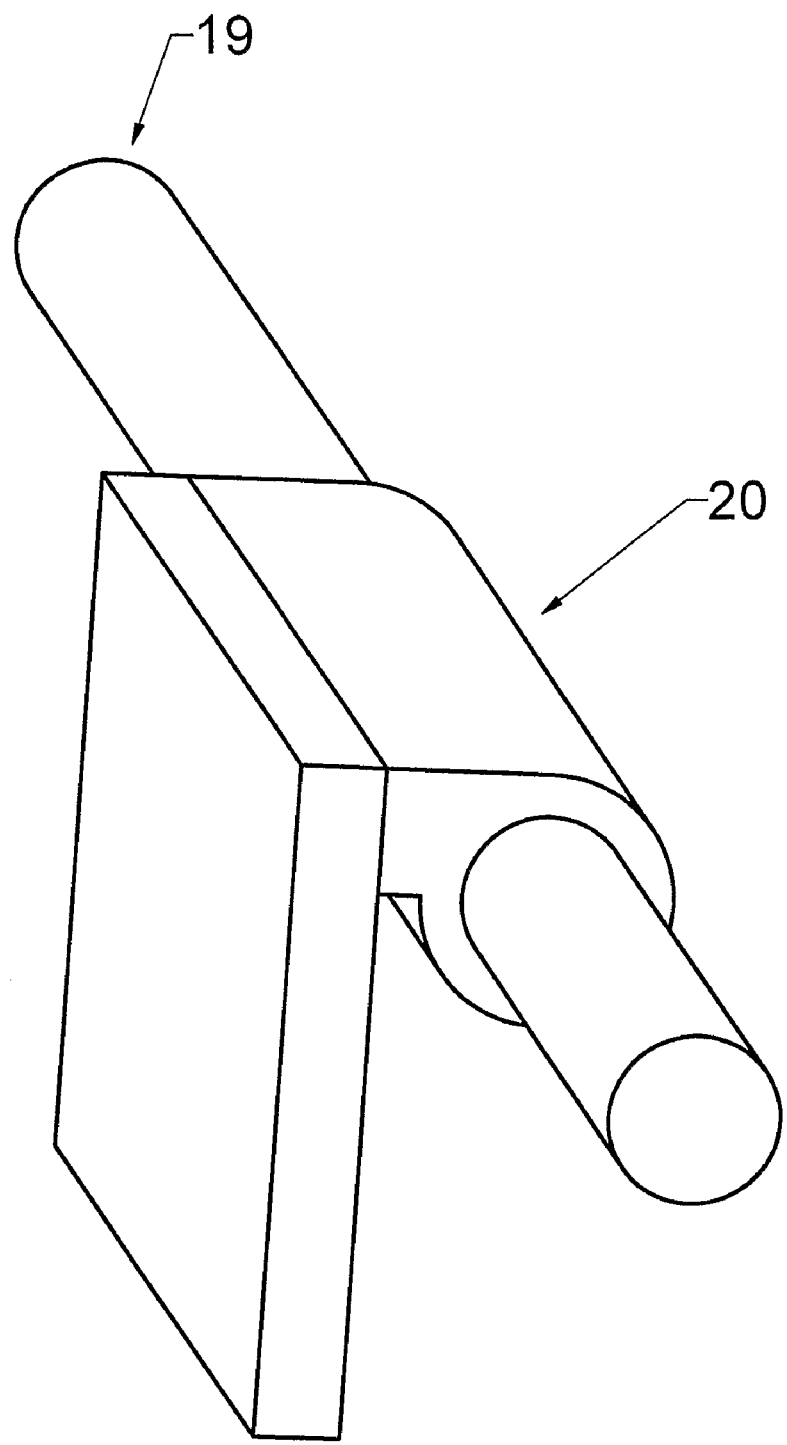
FIG. 39 is a perspective view of one embodiment of a pedestal movement guide.
Figure 40:
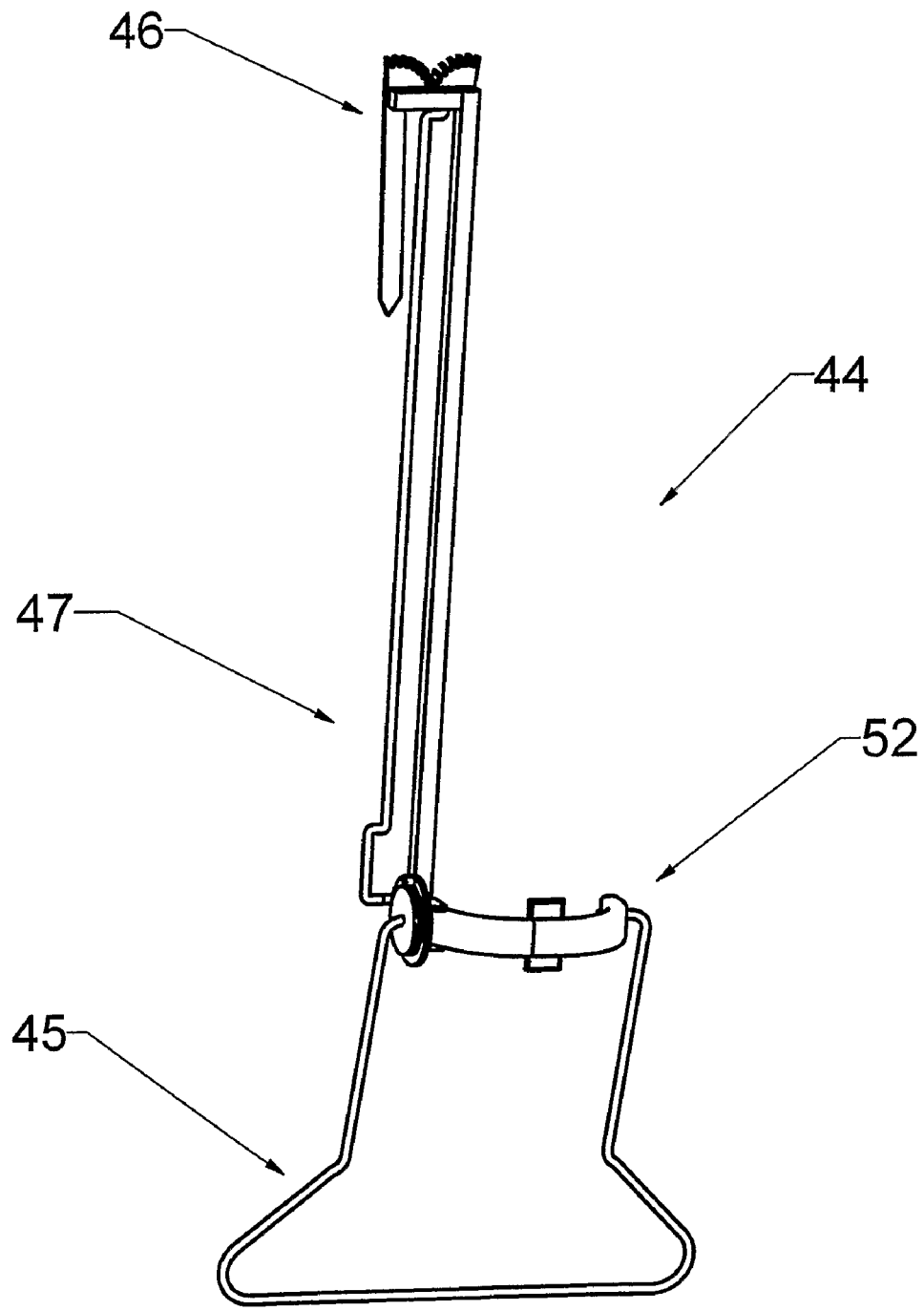
FIG. 40 is a perspective view of another embodiment of a pedestal position indicator.

As mentioned above, it should be understood that the coupler element 3 can include a variety of hitch designs. One type of hitch, which may be particularly appropriate for this invention, especially when used with heavier trailers, is that of a gooseneck hitch or one having a gooseneck coupler element. As shown in FIGS. 8, and 28-36, the trailer 1 may be designed for a gooseneck hitch. As such, the trailer itself may include a gooseneck hitch element 16 that represents at least a portion of the coupler element 3. The trailer 1 in such a design may also include a gooseneck pedestal 17 that may support at least a portion of the trailer 1 when it is unconnected to some type of vehicle or the like. On the vehicle, or more generally the source of towing power, there may be a gooseneck ball 18 to which the gooseneck hitch element attaches. To provide for the desired movement in a lateral direction 8, a lateral adjustment element 10 may be included in such a configuration so as to present a gooseneck adjustment element. As shown in FIGS. 25 and 38, it can be seen that in one embodiment for such a trailer, the lateral adjustment element 10 may include one or more gooseneck pedestal lateral movement guides 19. As shown in the FIG. 25, it can be understood from this one particular design (there, of course, may be many other types of designs) the gooseneck pedestal lateral movement guides 19 may serve to constrain movement in the desired direction when the appropriate actuator element 12 is activated. In the design shown, it can be understood that by using rails or the like, the gooseneck pedestal lateral movement guides 19 may laterally guide the movement of the pedestal as desired. From a reference to FIG. 25, it can be understood that the gooseneck pedestal lateral movement guide 19 may be configured to include a pair of gooseneck pedestal lateral movement guides 19. In addition, it can be seen that there may actually be a dual pairing of the gooseneck pedestal lateral movement guides 19. In this manner there may be upper and lower guiding of the lateral movement. In addition, embodiments may include gooseneck pedestal rollers 29 to permit relatively low friction lateral movement through a rolling action. As shown in FIG. 39, sliding is also possible, of course, and thus the mechanism may be configured with one or more gooseneck pedestal movement slide elements 20. In either configuration, the there may be a lateral movement along the guide or the slide.

Whether accomplished by the action of guiding or, more narrowly, rolling or sliding, the entire assembly may be designed to be contained or protected or shielded at least partly by a housing 27 or more particularly a pedestal movement housing 21 as shown in FIGS. 9-27. In some embodiments, there may also be one or more elements that serve as a shield 26. Naturally the housing 27 may serve as the elements shield 26. The elements shield 26 may be situated adjacent the lateral adjustment element 10. Thus when exposed to the elements or the conditions incidental to any trailering use, the entire assembly—as well as the users of the assembly—may be protected to retain an undisturbed ability to achieve the desired results. These elements, alone, in combination, or as the same component may serve to environmentally shield desired portions of a mechanism or the like.

Figure 2:
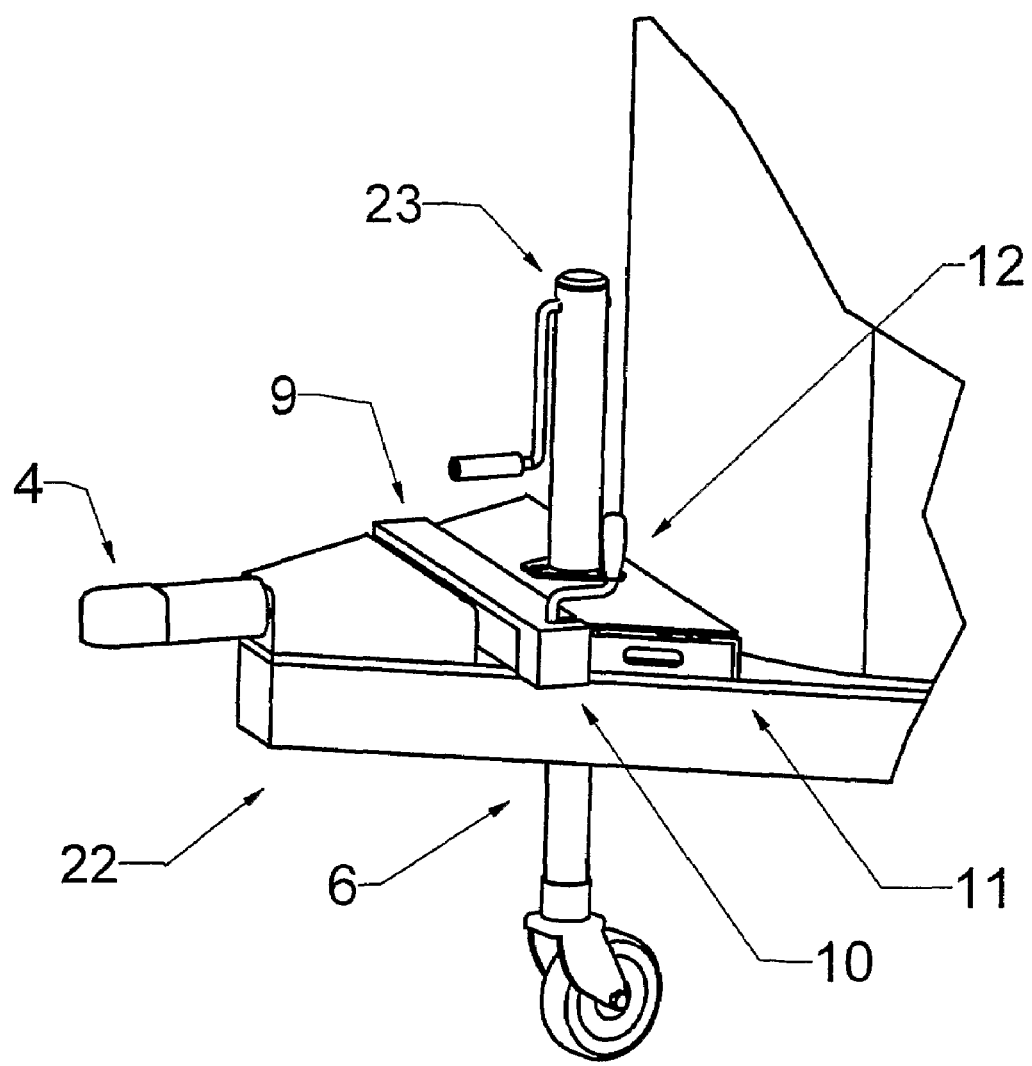
FIG. 2 is a close up of the pedestal area of the embodiment shown in FIG. 1.
Figure 3:
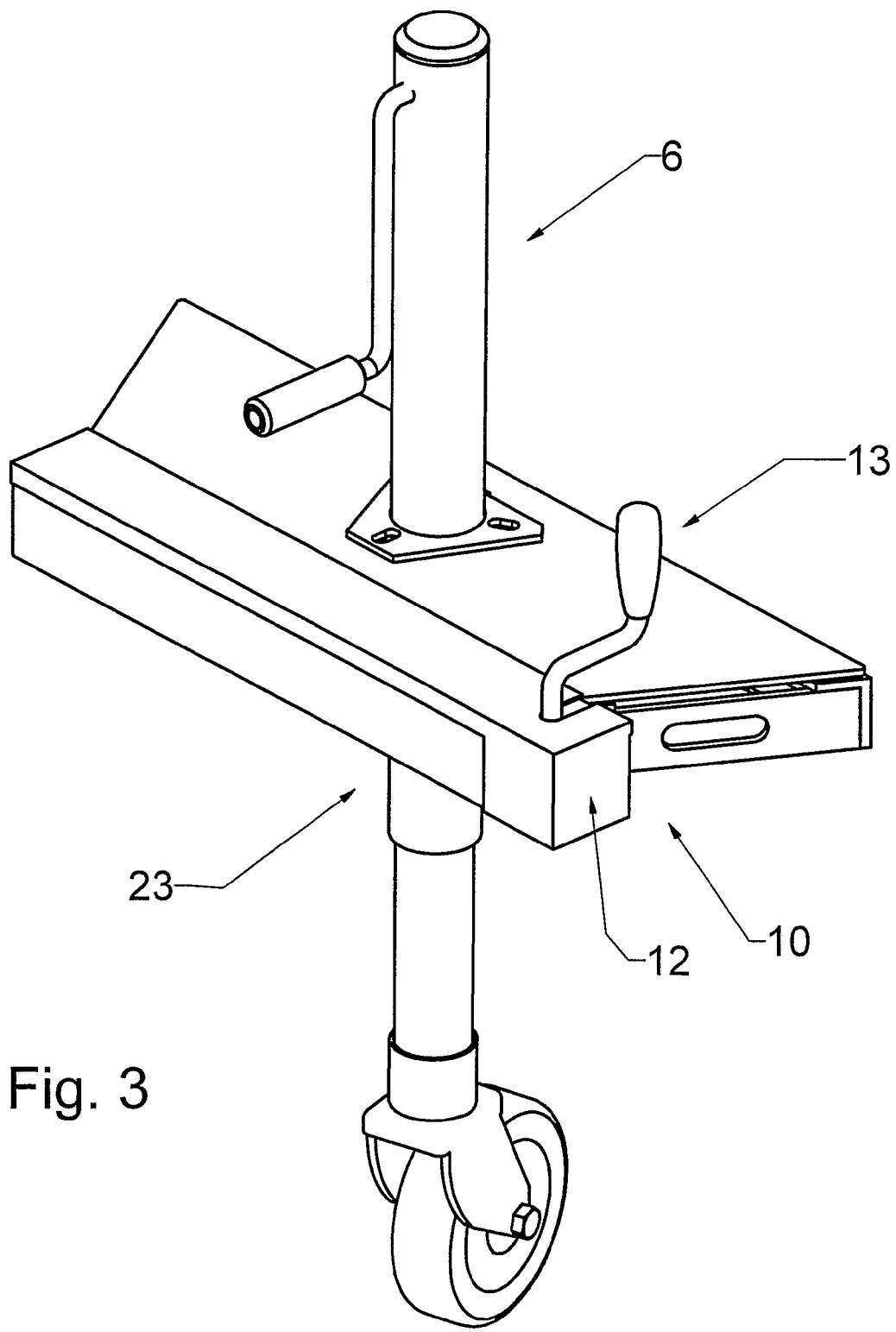
FIG. 3 shows details of the pedestal design in FIG. 2 prior to attachment to the pull-type trailer.
Figure 4:
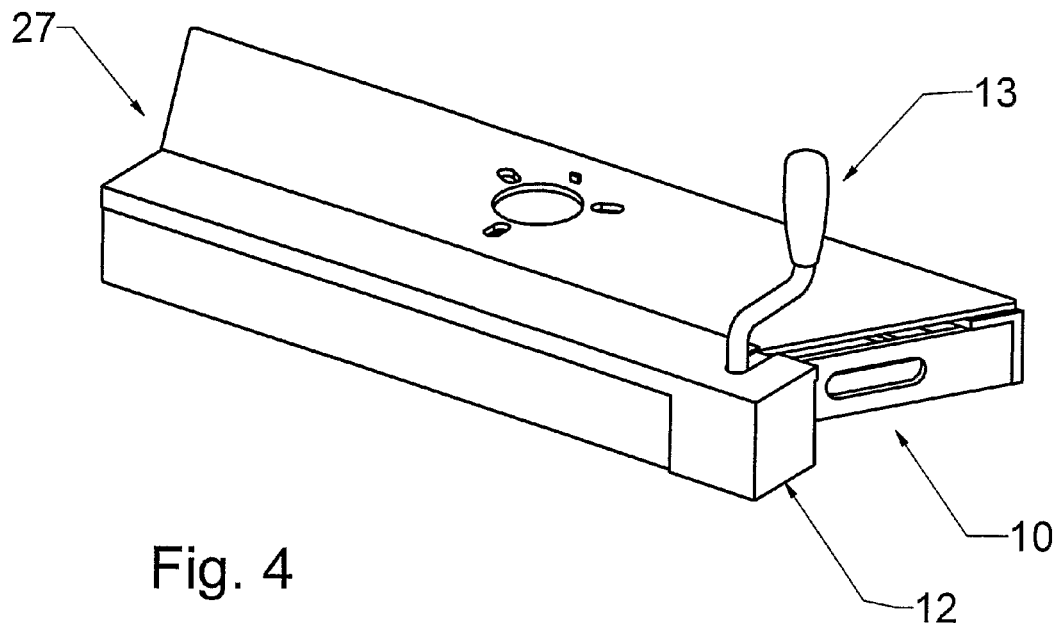
FIG. 4 shows the top portion of the isolated lateral trailer adjustment portion of the pedestal design in FIG. 2.
Figure 5:
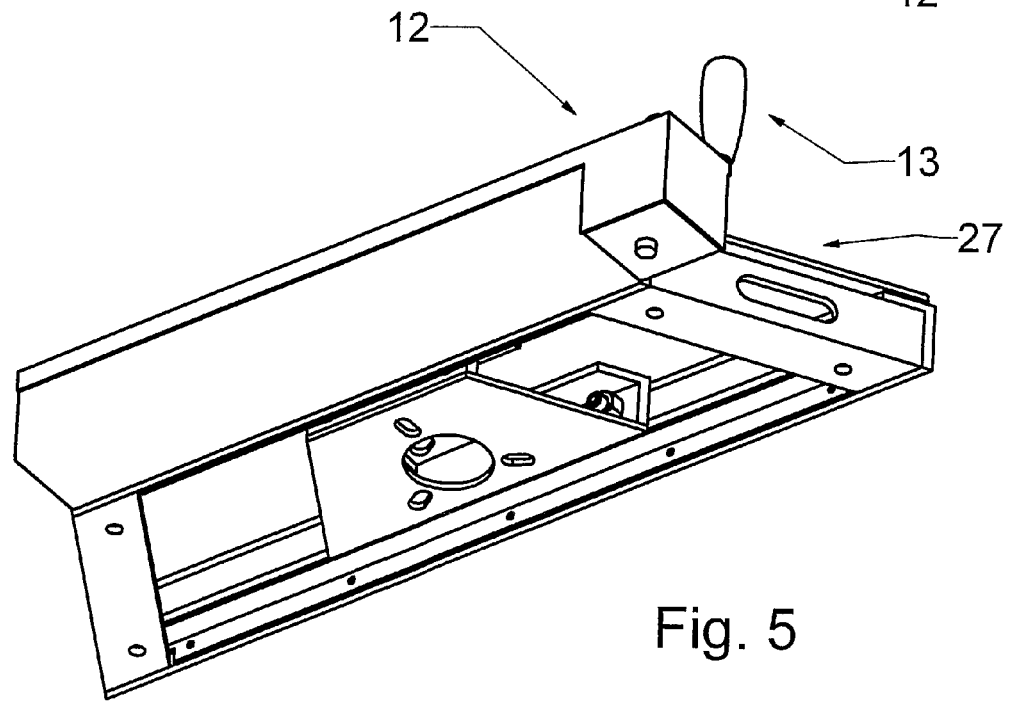
FIG. 5 shows the bottom portion of the isolated lateral trailer adjustment portion of the pedestal design in FIG. 2.
Figure 6:
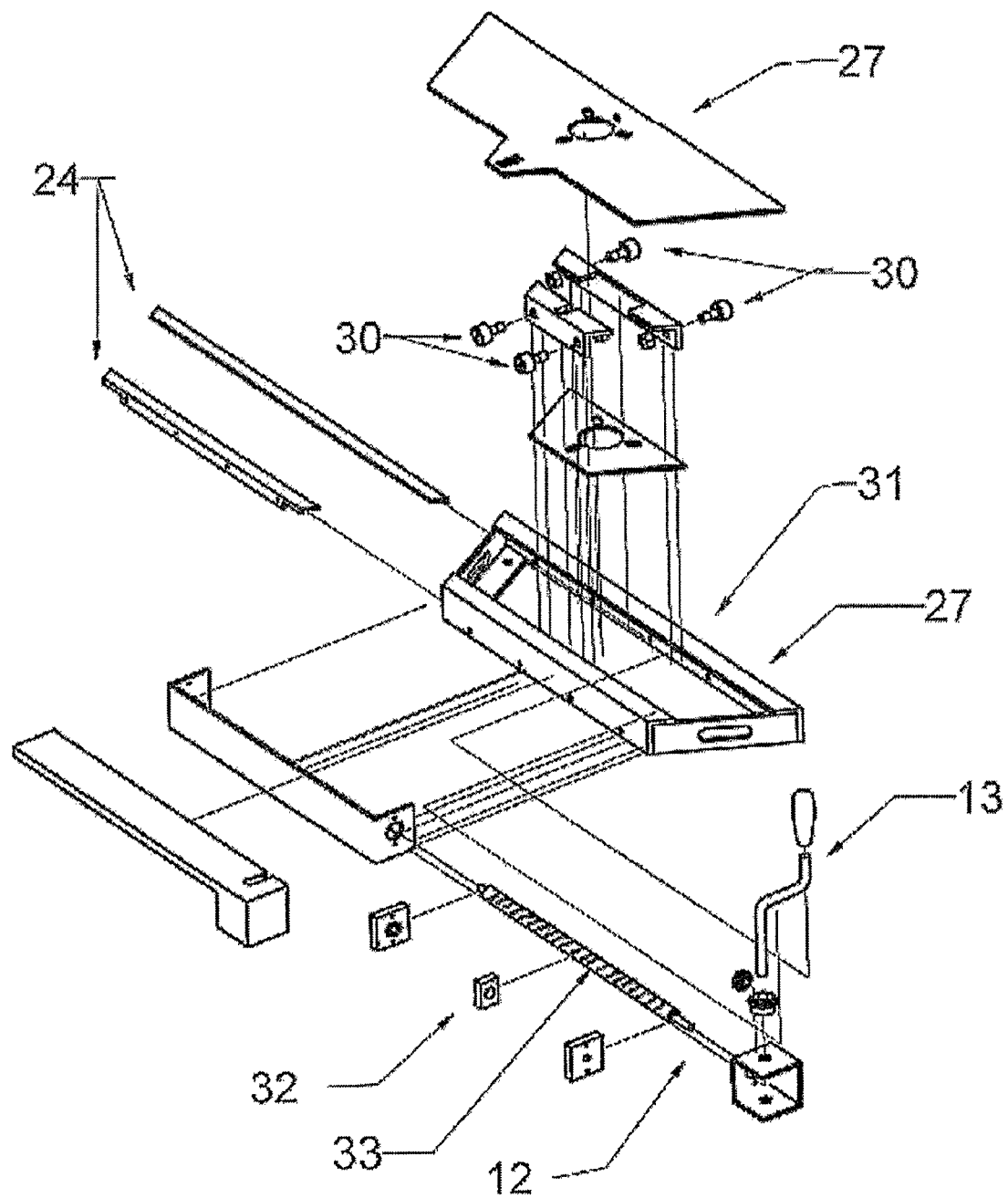
FIG. 6 is an exploded view of pedestal design in FIG. 2.
Figure 7:
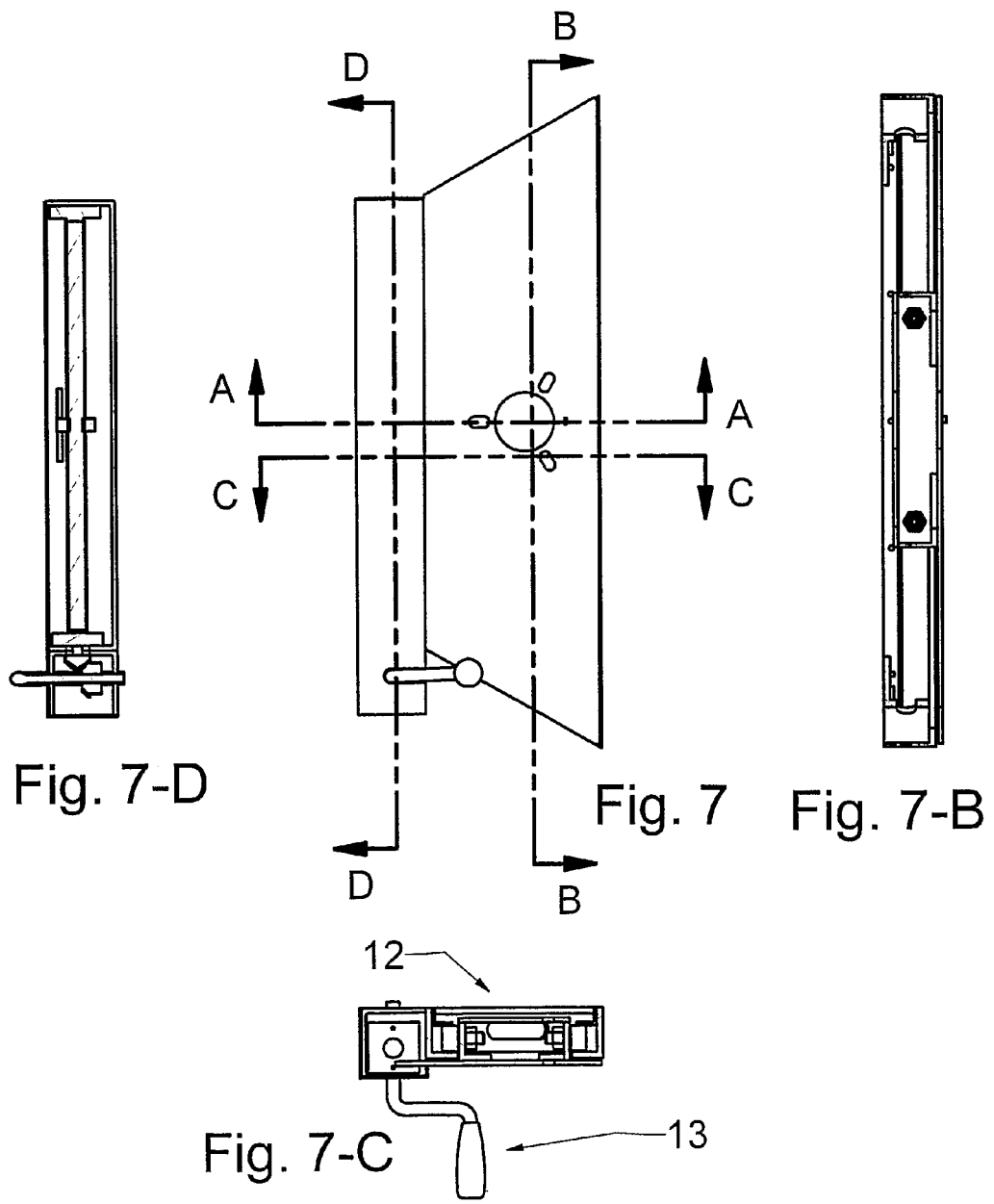

Yet another type of hitch design possible for coupler element 3 and for trailer 1 is a design that includes a tongue hitch element 22. As shown in FIGS. 1 and 2, tongue hitch element 22 may be a design commonly used for many trailers. In this arrangement, the trailer may include a tongue hitch element 22 as at least a portion of the coupler element 3. Further, as can be understood from FIGS. 2 and 3, in such a tongue hitch design the trailer may include a tongue pedestal 23 that may support at least a portion of the trailer 1 when it is unconnected to its source of towing power. Similar to the gooseneck arrangement, on a vehicle there may be a vehicle bumper mount ball or vehicle receiver ball mount as shown in FIGS. 1 and 1-B to which the tongue hitch element 22 may attach. Again, to provide for the desired movement in a lateral direction 8, the lateral adjustment element 10 may be configured as a tongue adjustment element. As shown in FIG. 6, it can be seen that in one embodiment for such a trailer, the lateral adjustment element 10 may include one or more tongue pedestal lateral movement guides 24. In the one particular design shown, the tongue pedestal lateral movement guides 24 may also serve to constrain movement in the desired direction when the appropriate actuator element 12 is activated. In the design shown, the tongue pedestal lateral movement guides 24 may serve to laterally guide the movement of the pedestal as desired. From a reference to FIG. 6, it can be understood that the tongue pedestal lateral movement guide 24 may be configured to include a pair of tongue pedestal lateral movement guides 31. Dual pairing is also possible in this configuration. In addition, embodiments may include tongue pedestal rollers 30 to permit relatively low friction lateral movement through the rolling action mentioned above, perhaps also as shown in FIG. 38. Sliding is again possible, and thus the mechanism may be configured with one or more tongue pedestal movement slide elements, perhaps as shown in FIG. 39. There may also be included one or more tongue pedestal movement slide elements. Again, whether accomplished by the action of guiding or, more narrowly, sliding the entire assembly may be designed to be contained or protected at least partly by a pedestal movement housing 27.

Finally, it should be understood that although embodiments are shown for both gooseneck and tongue hitch configurations (whether with recreational or commercial trailer bodies), there are many, many other types of hitch designs that may be configured for the present invention. These range from pintle hitches that include pintle hitch elements and pintle connection elements, to A-frame hitch elements (including but not limited to industry standard class I, II, III, IV and V configurations) to $5^{th}$ wheel elements (perhaps even with the lateral adjustment element housed within the trailer body), to ball hitch elements, to tube hitch elements, to bumper hitch elements, and even to plate hitch elements. In any such design, there may be included a receiver hitch such as into which a trailer ball may be inserted to insert hitch elements and the like. Again, it should be understood that unless specifically delineated the particular design of the hitch element is not limiting.

Figure 17:
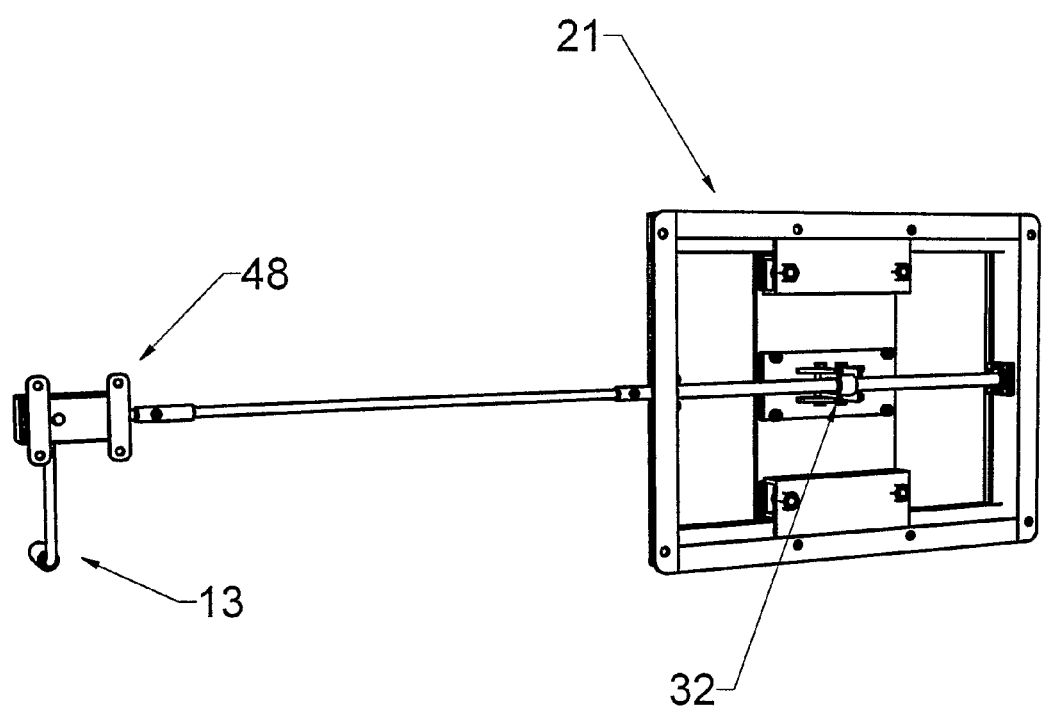
FIG. 17 shows a back view of the isolated lateral trailer adjustment portion of the pedestal design in FIG. 15.
Figure 18:
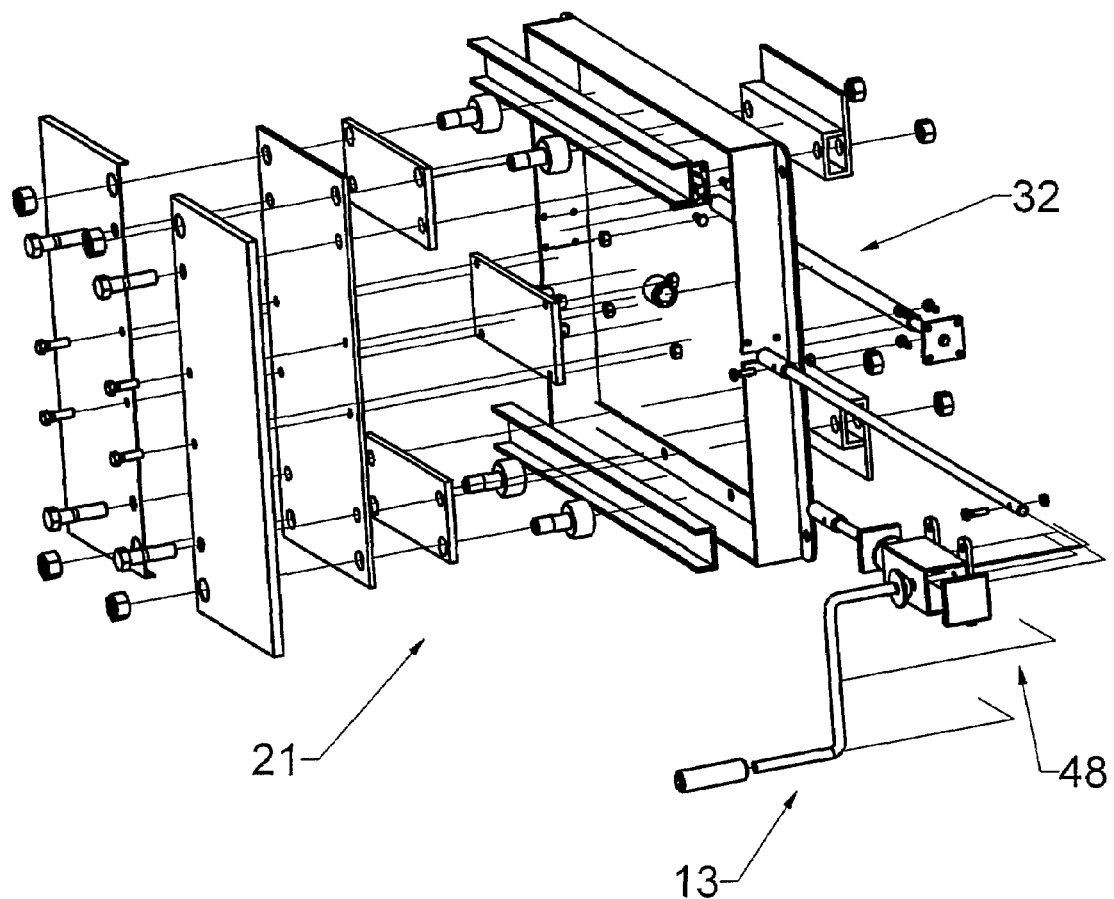
FIG. 18 is an exploded view of pedestal design in FIG. 15.
Figure 19:
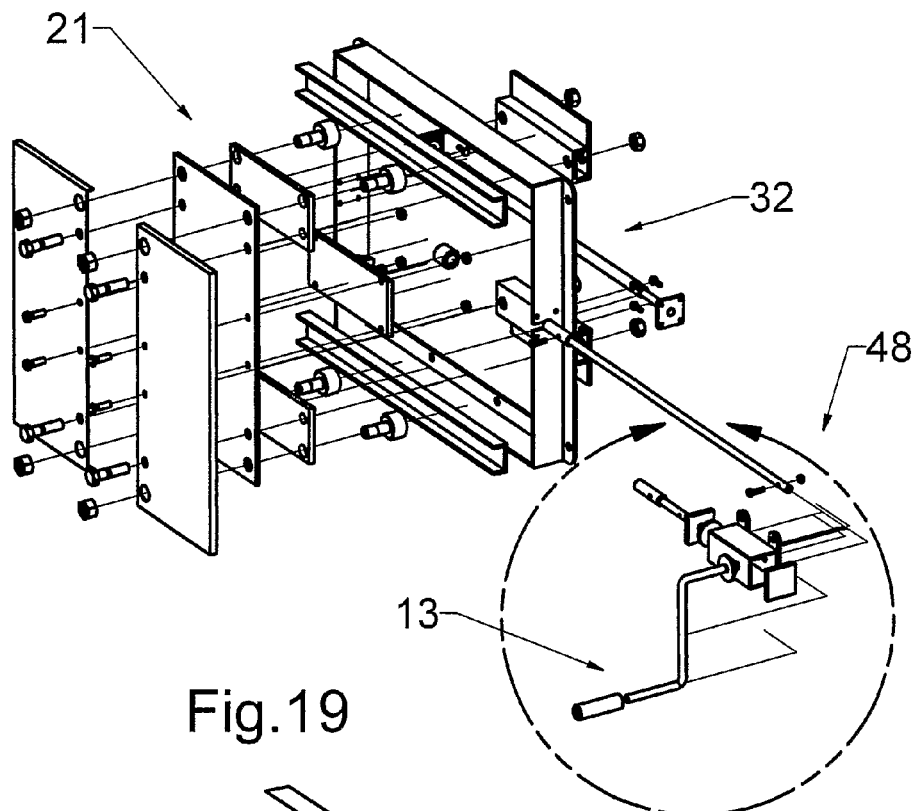
FIG. 19-19A shows an exploded view of an alternative pedestal design to the one shown in FIG. 15.
Figure 19A:
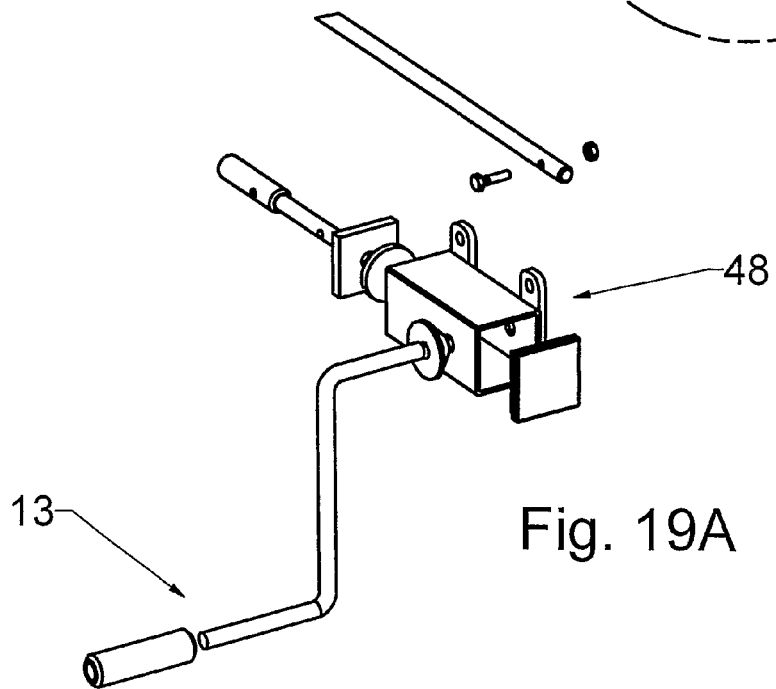
Figure 20:
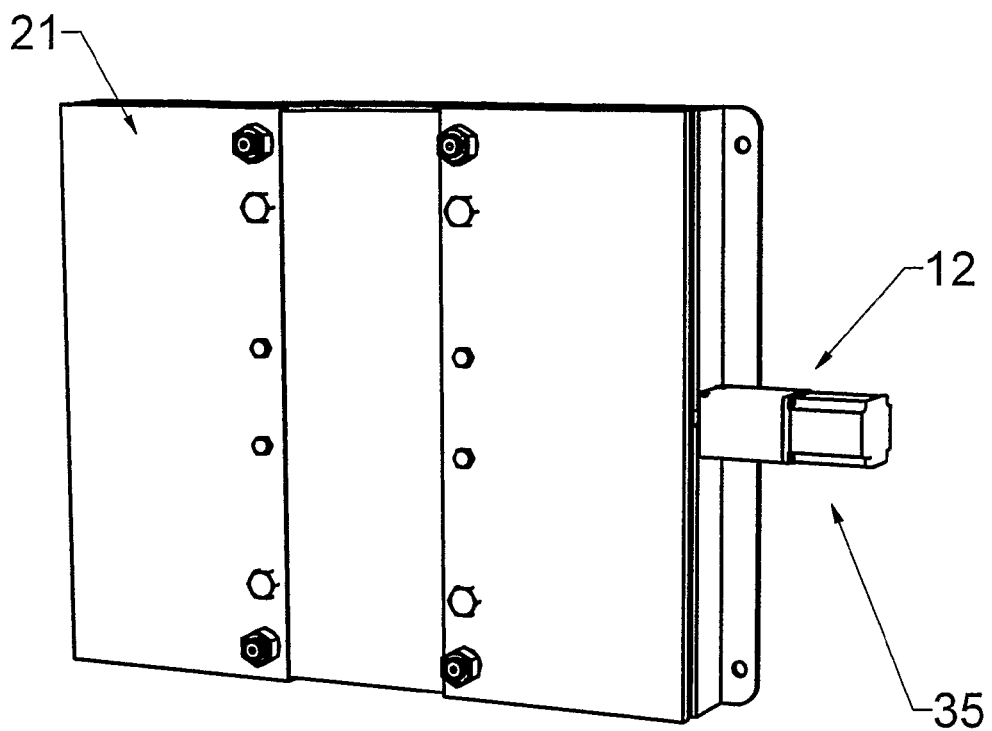
FIG. 20 shows a front view of a motorized embodiment of an isolated lateral trailer adjustment portion.
Figure 21:
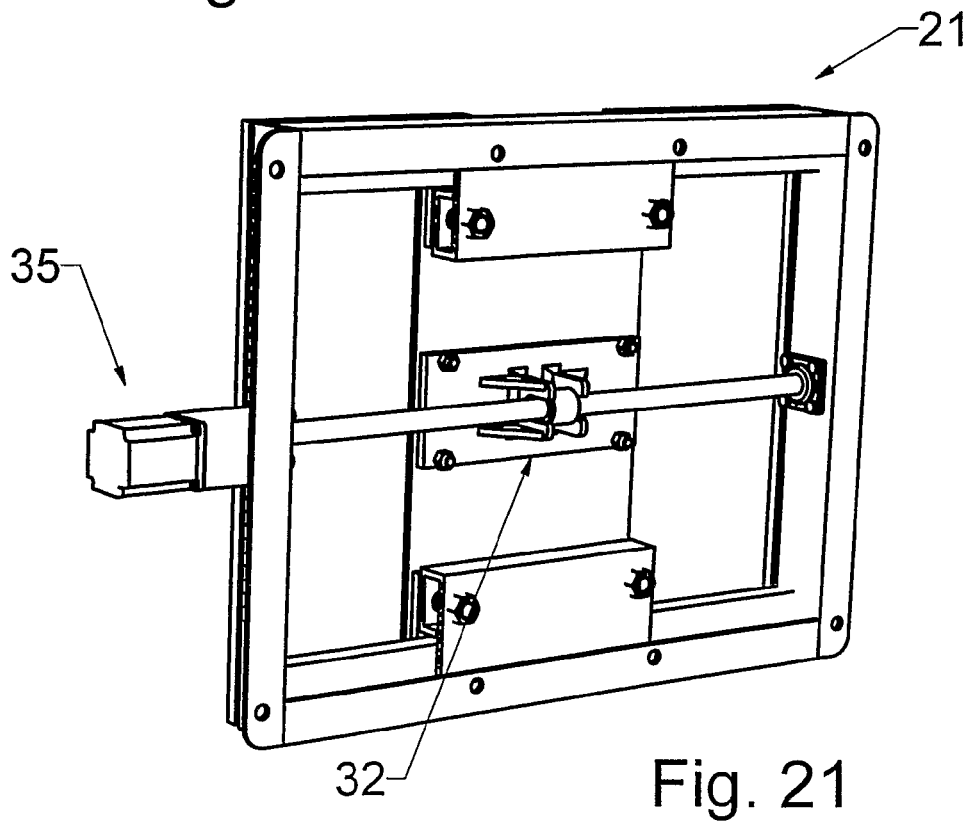
FIG. 21 shows a back view of the embodiment of the motorized lateral trailer adjustment portion of FIG. 20.
Figure 22:
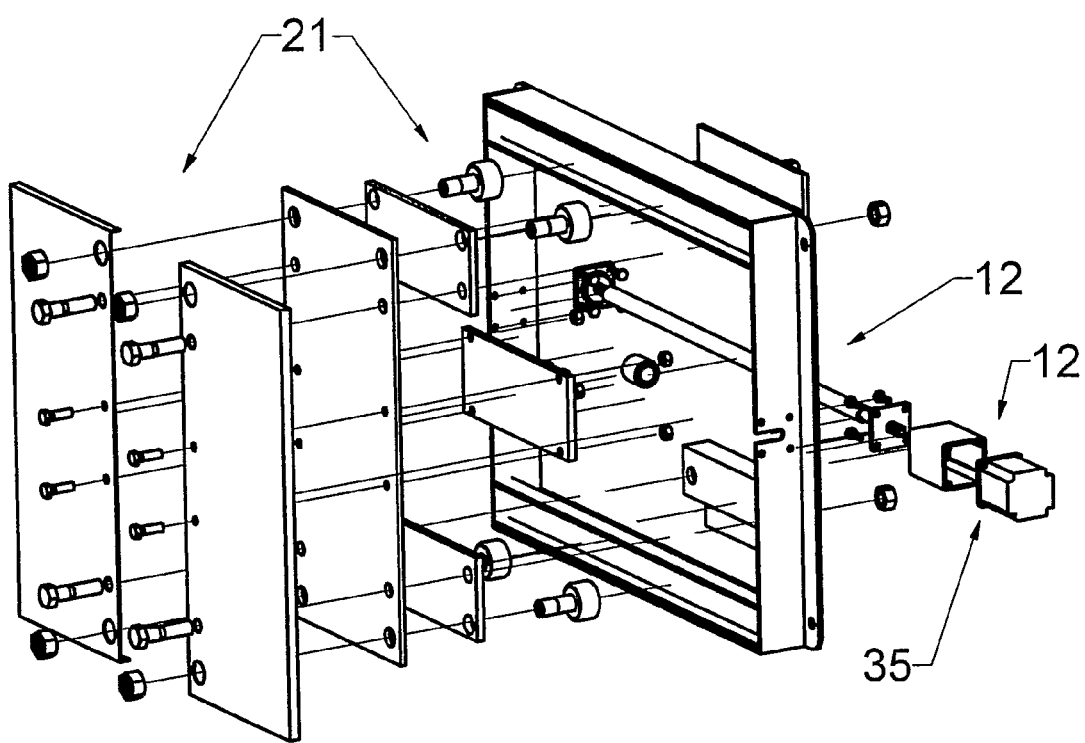
FIG. 22 is an exploded view of the motorized design shown in FIG. 20.
Figure 23:
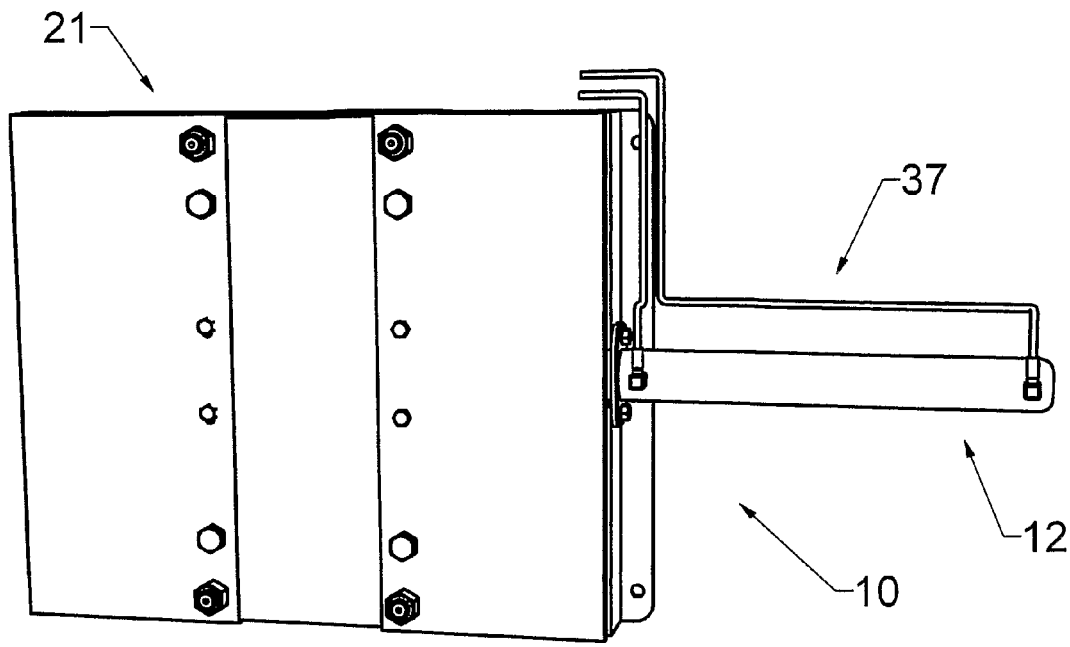
FIG. 23 shows a front view of a hydraulic embodiment of an isolated lateral trailer adjustment portion.
Figure 24:
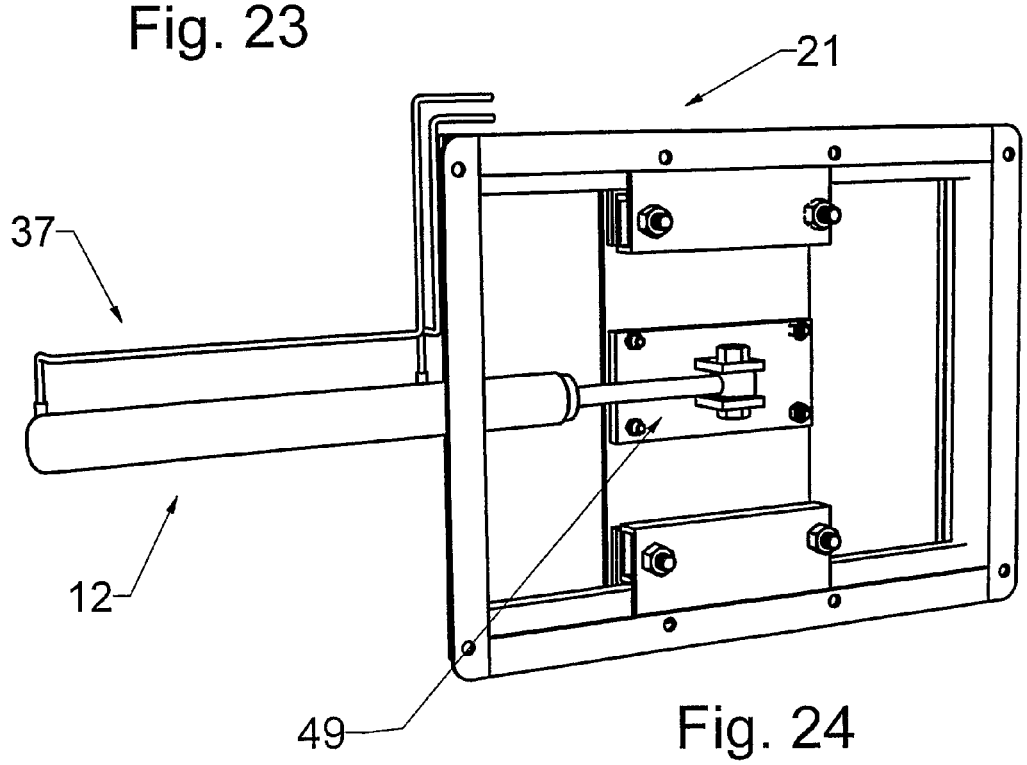
FIG. 24 shows a back view of the hydraulic lateral trailer adjustment portion of FIG. 23.
Figure 41:
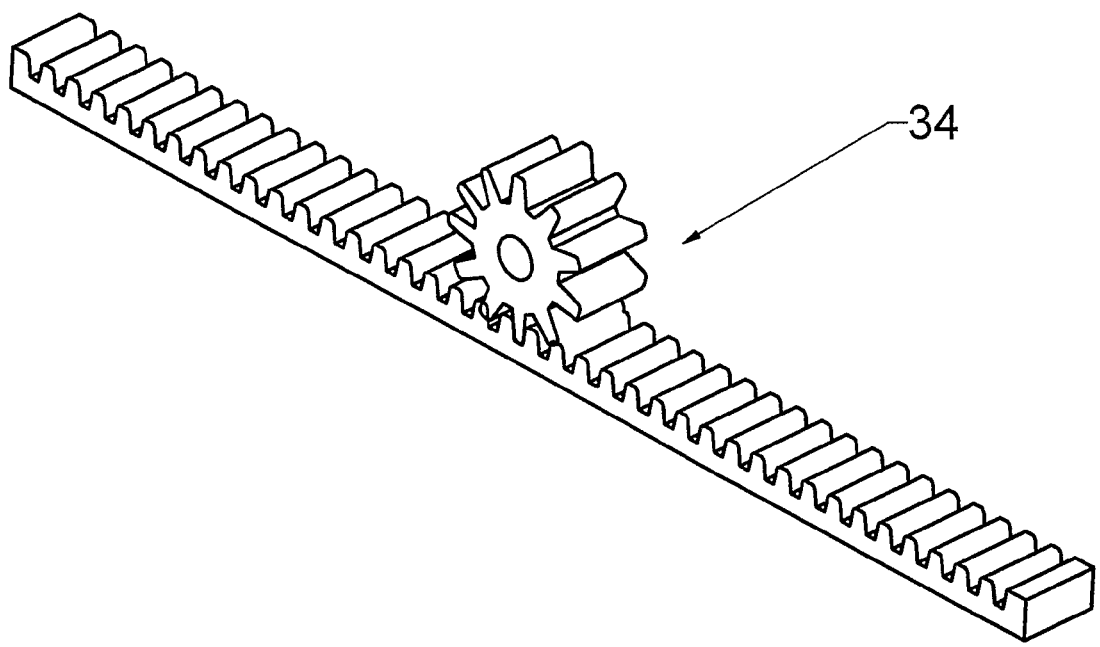
FIGS. 41-46 shows details of a rack and pinion embodiment used in place of a lead screw drive system such as shown in that of FIGS. 3-7.
Figure 42:
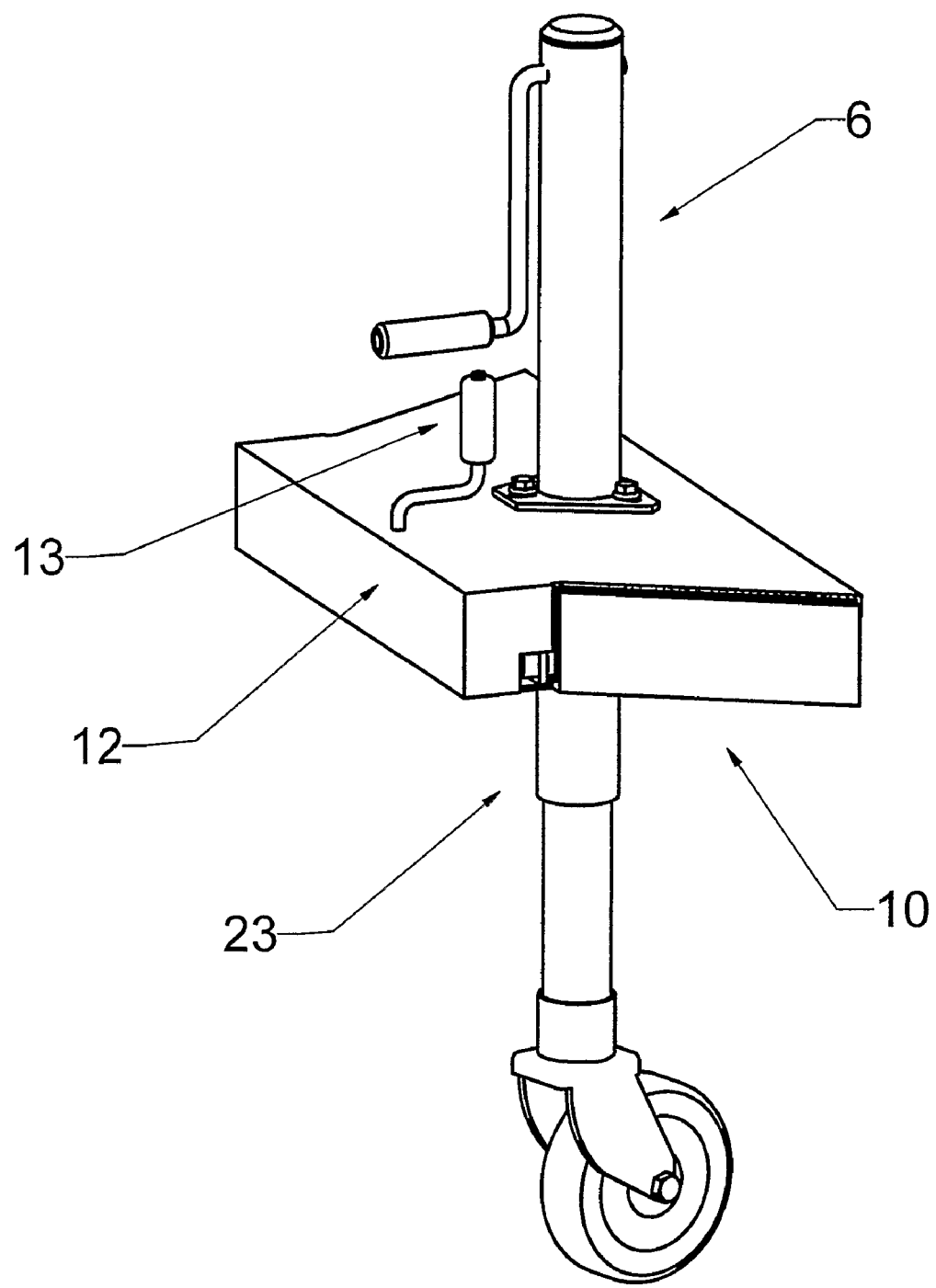
Figure 43:
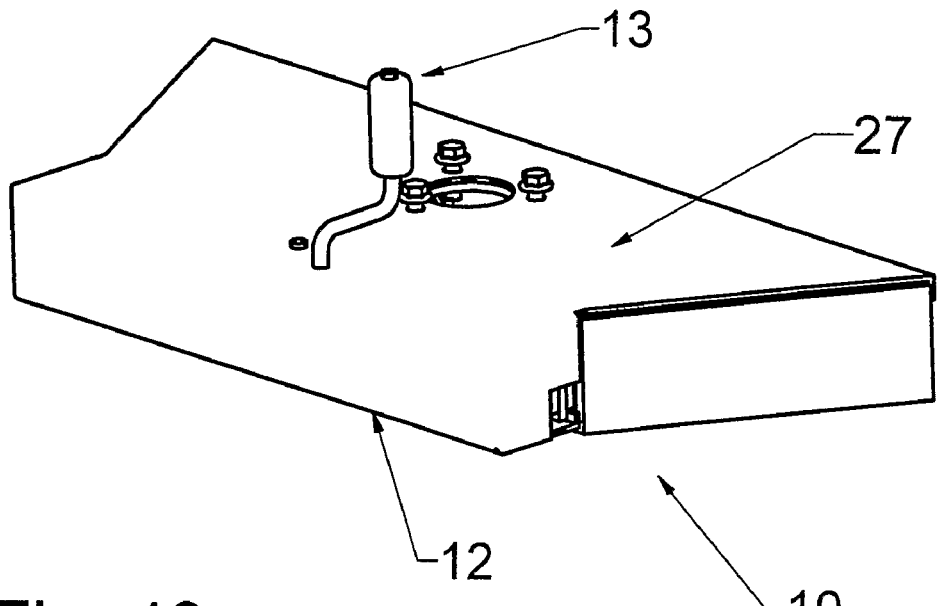
Figure 44:
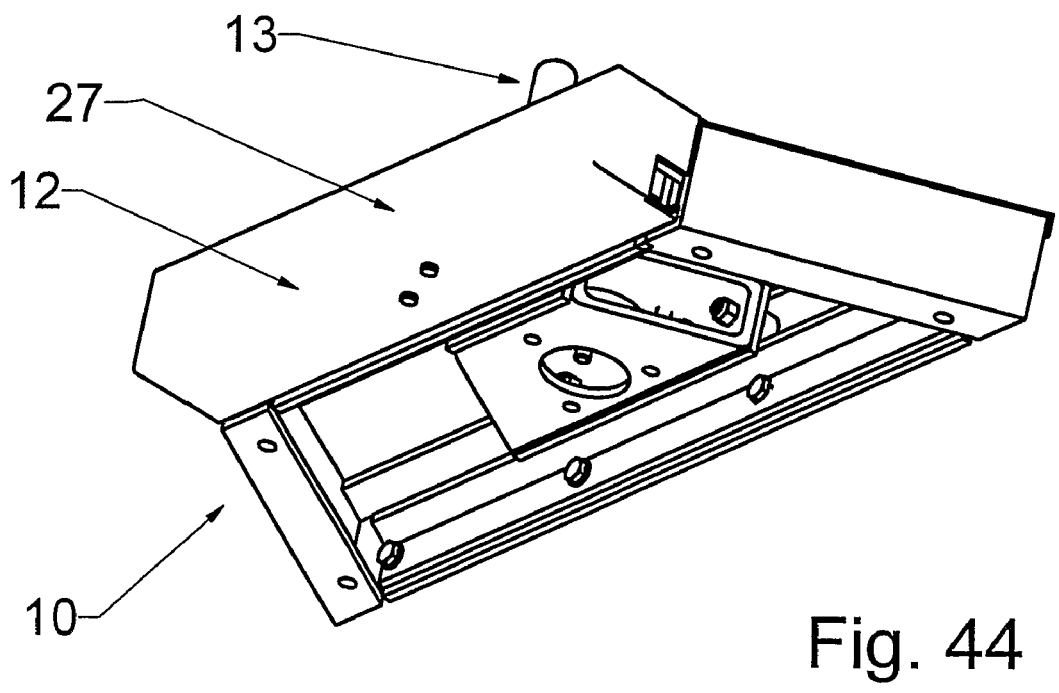
Figure 45:
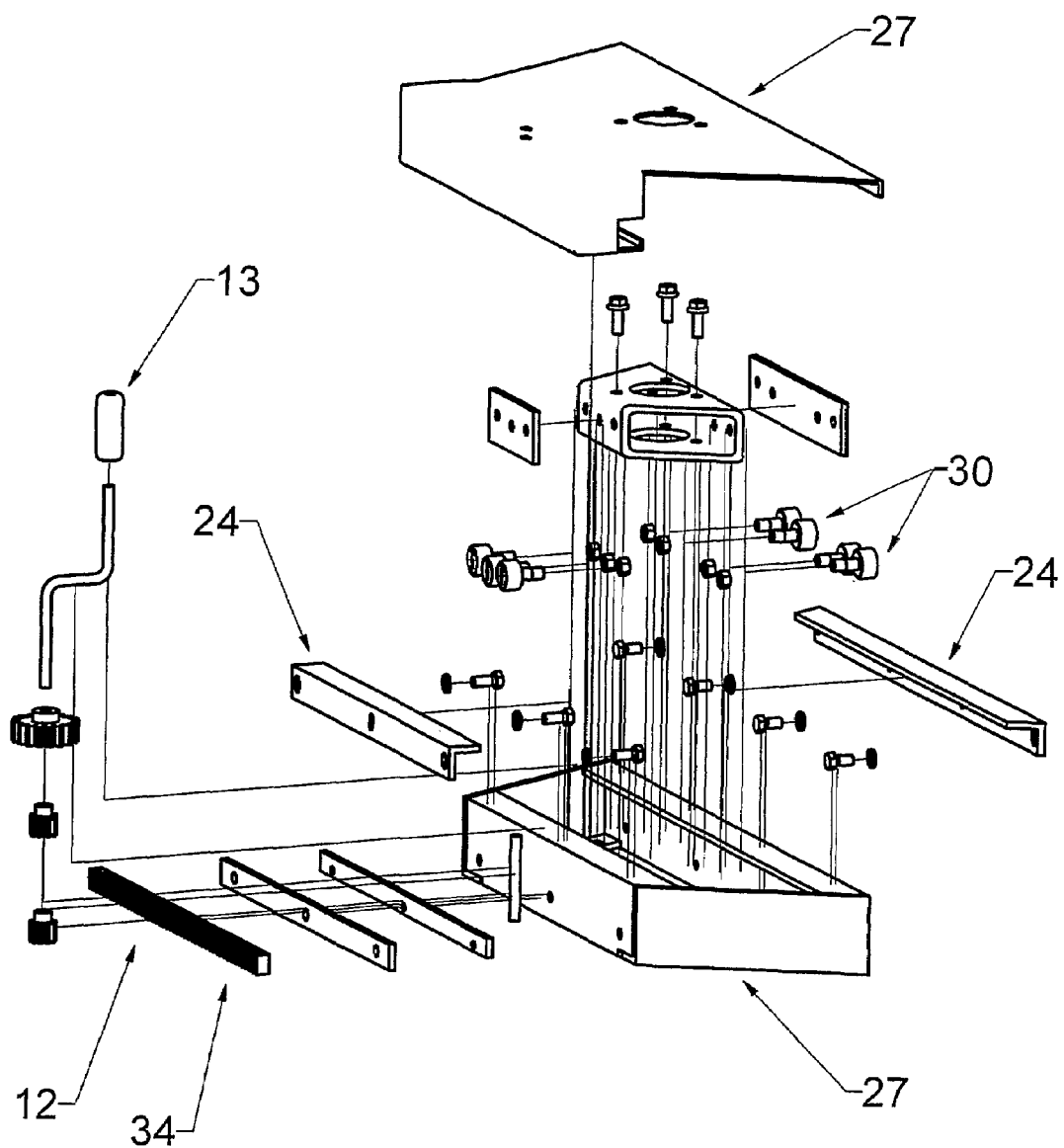
Figure 46:
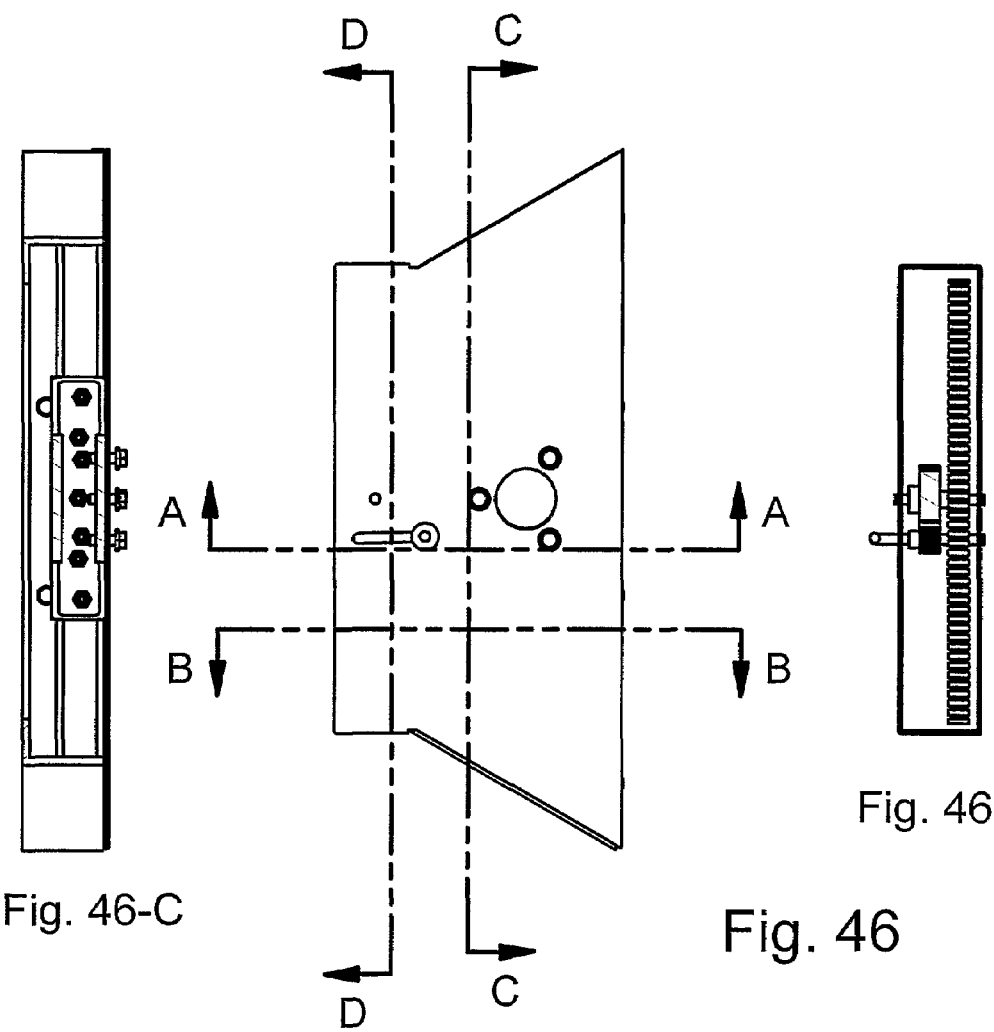
Figure 47:
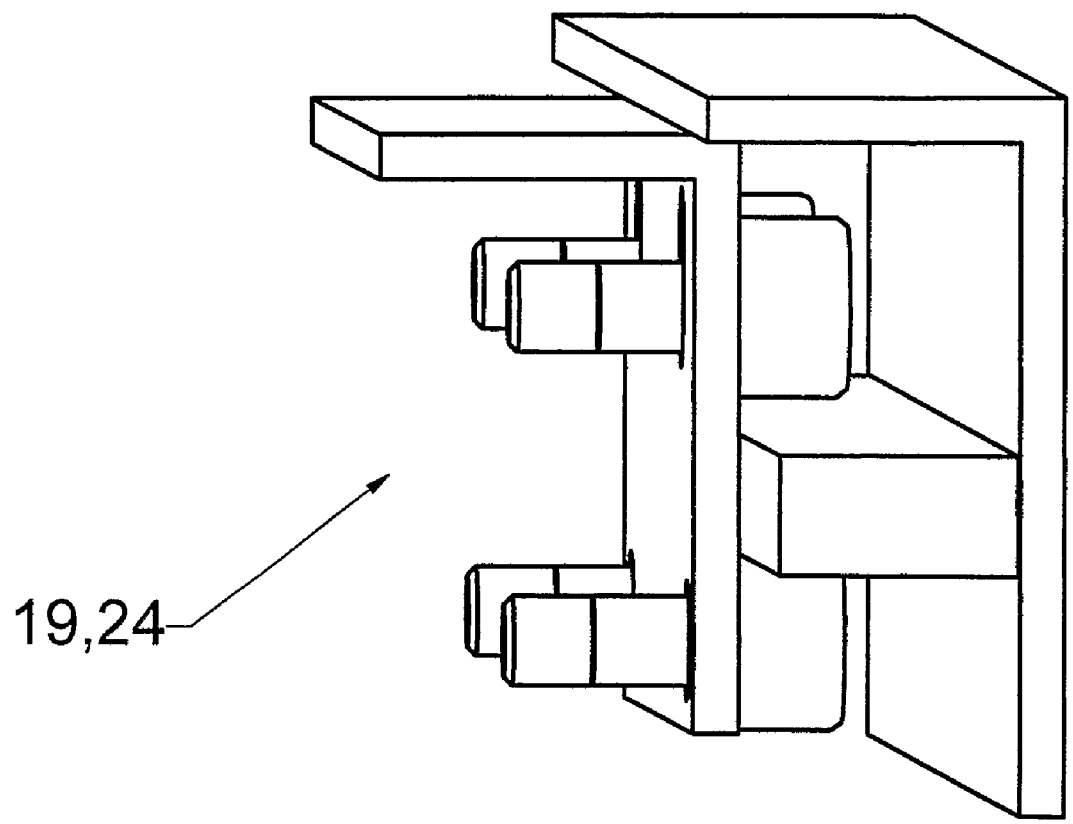
FIG. 47 is a perspective view of another embodiment of a pedestal movement guide.

As mentioned above, activation of some aspect to accomplish movement of at least some portion of the coupler element 3 in the lateral direction 8 can be accomplished in a variety of manners. The actual forces to cause the movement can similarly be created in many ways. As shown in FIGS. 6, 17-19, and 21-22, one manner in which the forces can be generated is through the use of some type of screw element 32; another way is through a rack and pinion design such as shown in FIGS. 42-46. As shown in FIGS. 17 and 18, an internal lead screw may be mounted in the frame as the screw element 32 to cause the lateral movement. The user may only need to cause a screwing motion to achieve the desired lateral movement. As shown in FIG. 6, it can be seen that the screw element 32 may actually be configured as a worm gear mechanism 33. Both the lead screw and the rack and pinion mechanisms can serve to permit a mechanical advantage so that movement can be relatively easy to accomplish—especially if manually actuated. As shown in FIG. 41, there may also be a rack and pinion element 34 to accomplish the desired movement. Other gear elements or gear mechanisms can also be used including but not limited to spur gear mechanisms, miter gear mechanisms (independently or even as part of the worm gear mechanism, as shown in FIG. 6), helical gear mechanisms, internal gear mechanisms, rack and spur gear mechanisms, pinion gear mechanisms. Regardless of the particular design chosen, the actuation may be accomplished through an automated design as well as manually. As shown in FIGS. 20-22, there may be included a motor drive 35 so that the movement can be achieved perhaps electrically through the operation of a switch at some location (perhaps even within the vehicle, trailer, or the like). Motorized movement can greatly simplify the actions required of the user, of course. Other types of drives are also possible as well. As shown in FIGS. 23-25, there may be a pneumatic drive element or a hydraulic drive element 37. These may act to pneumatically cause movement or hydraulically cause movement, perhaps through use of a shaft element 49 or the like as shown in FIG. 24.

Figure 10:
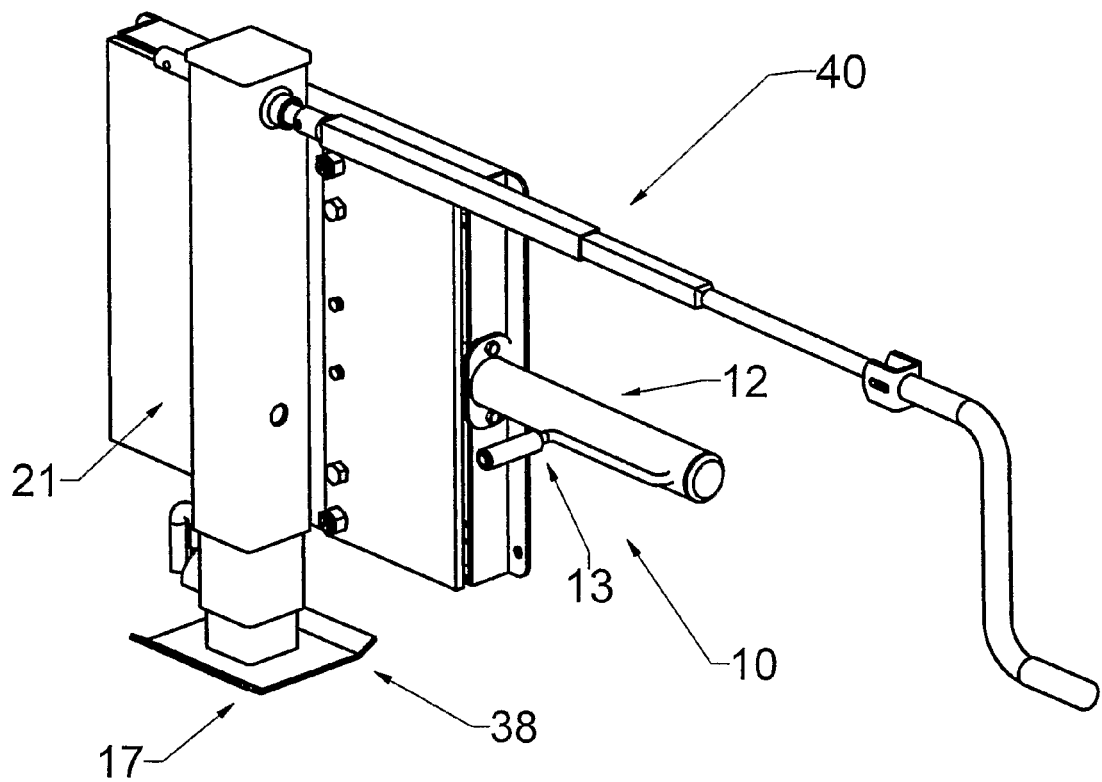
FIG. 10 shows details of the gooseneck pedestal design in FIG. 8 prior to attachment to the gooseneck pull-type trailer.
Figure 11:
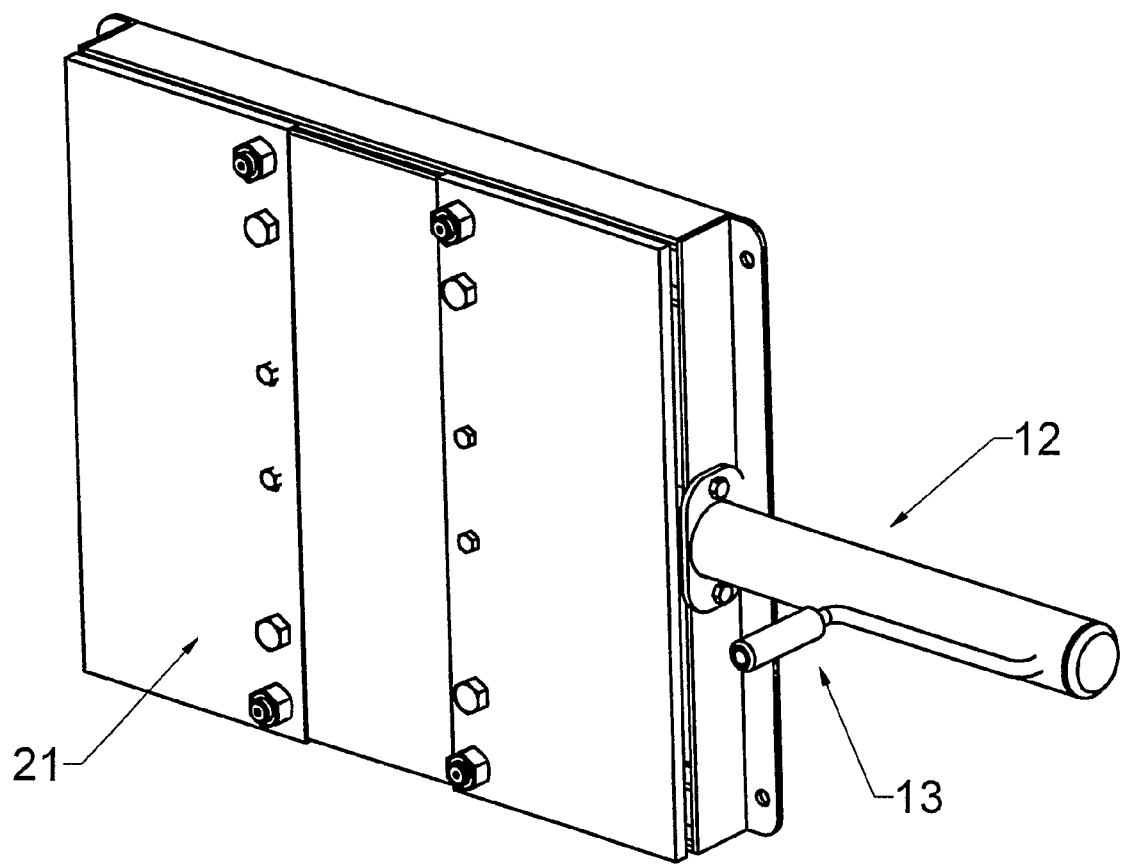
FIG. 11 shows a front view of the isolated lateral gooseneck trailer adjustment portion of the pedestal design in FIG. 8.
Figure 12:
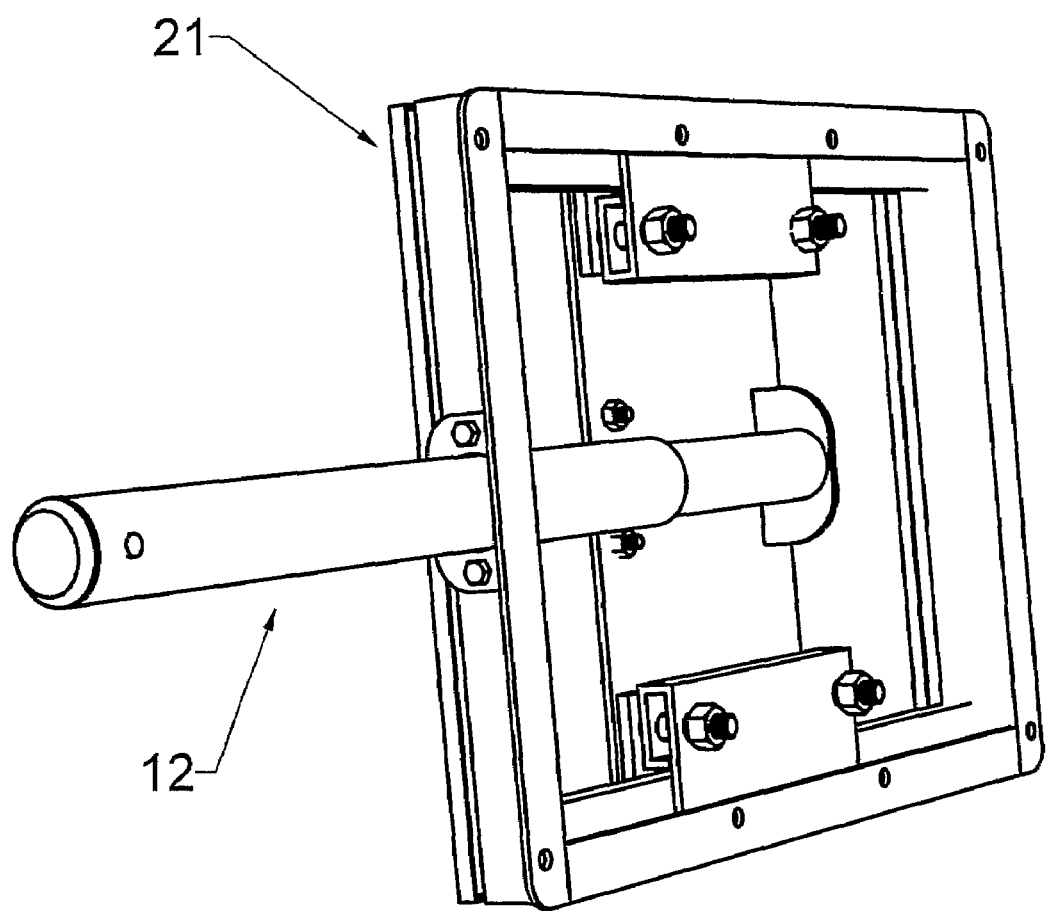
FIG. 12 shows a back view of the isolated lateral gooseneck trailer adjustment portion of the pedestal design in FIG. 8.
Figure 14:
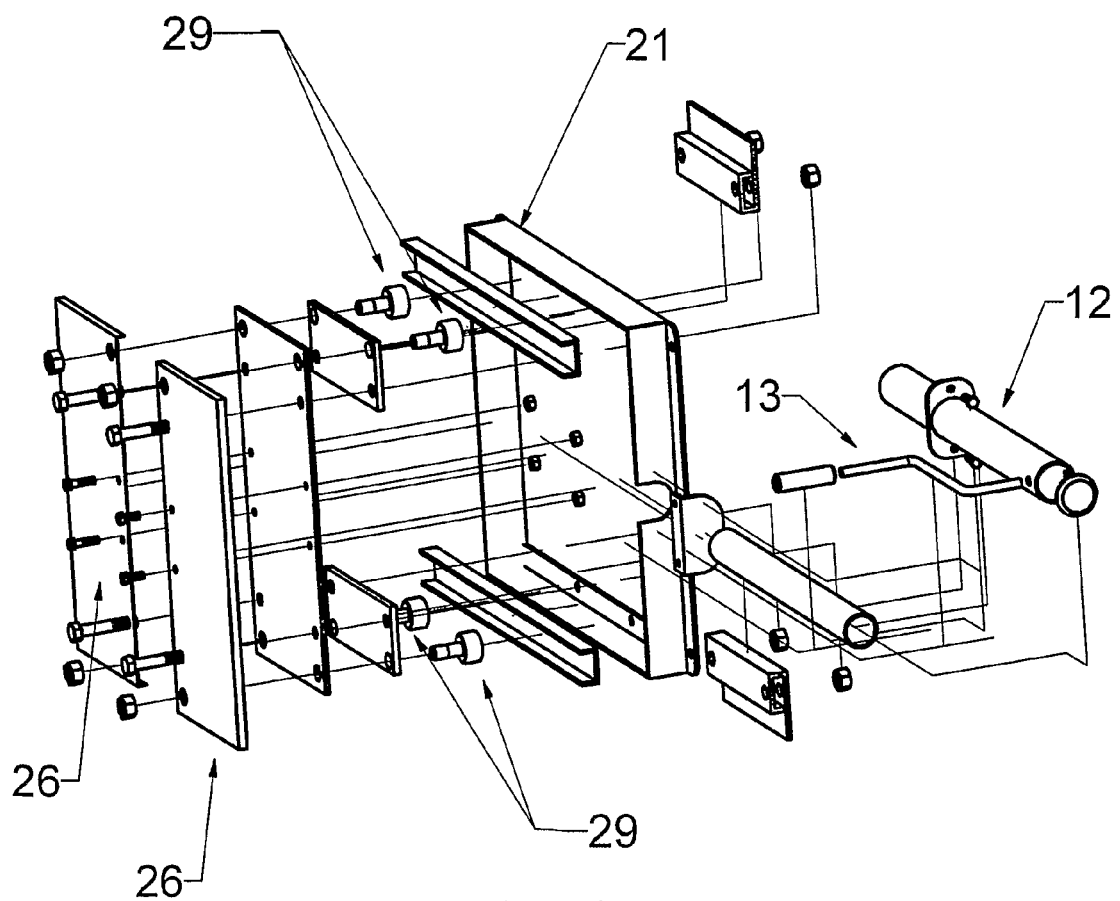
FIG. 14 is an exploded view of pedestal design in FIG. 8.
Figure 15:
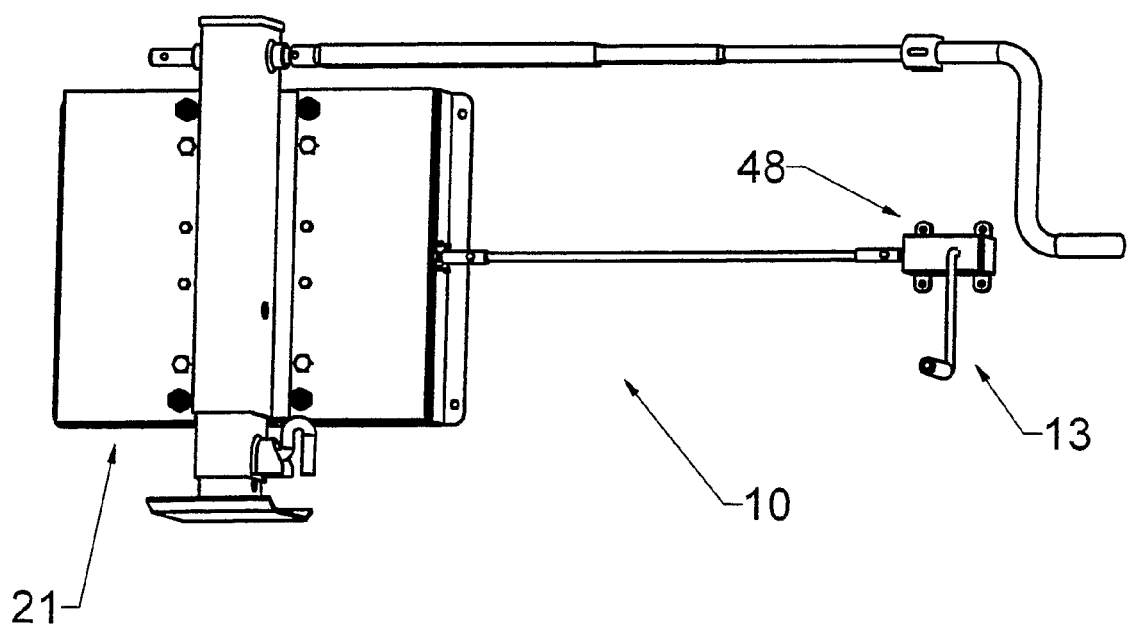
FIG. 15 is a perspective view of another embodiment for a pull-type trailer with a gooseneck hitch configuration prior to attachment to the pull-type trailer.
Figure 16:
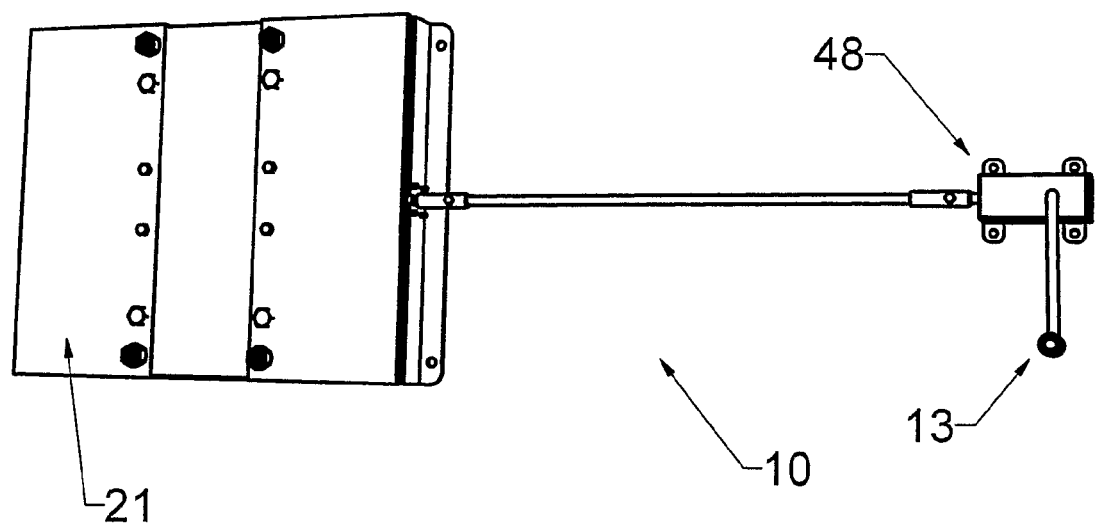
FIG. 16 shows a front view of the isolated lateral trailer adjustment portion of the pedestal design in FIG. 15.
Figure 35:
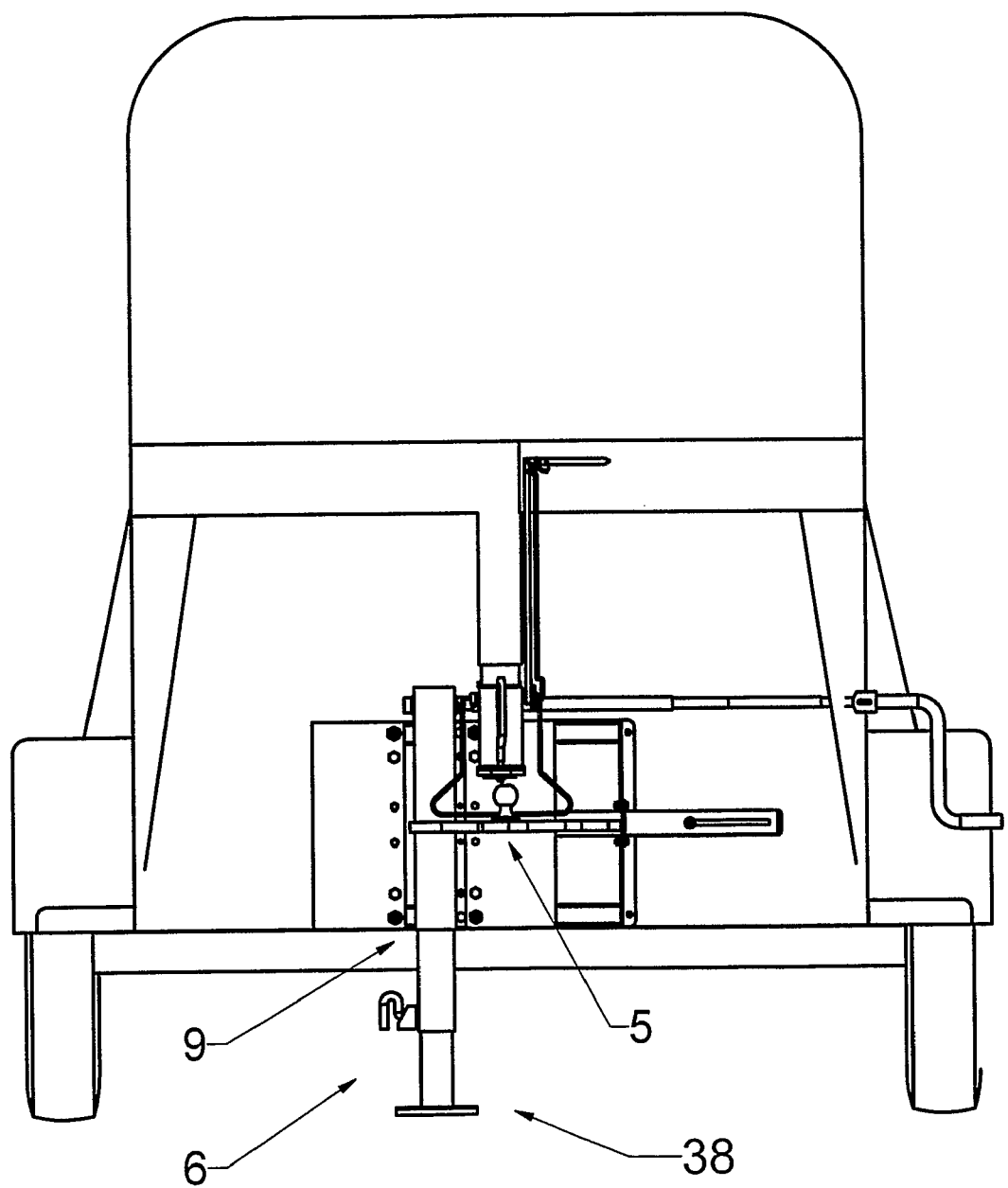
FIG. 35 is a front view of the gooseneck trailer configuration shown in FIG. 34 after the lateral trailer adjustment element has been operated for proper alignment.
Figure 36:
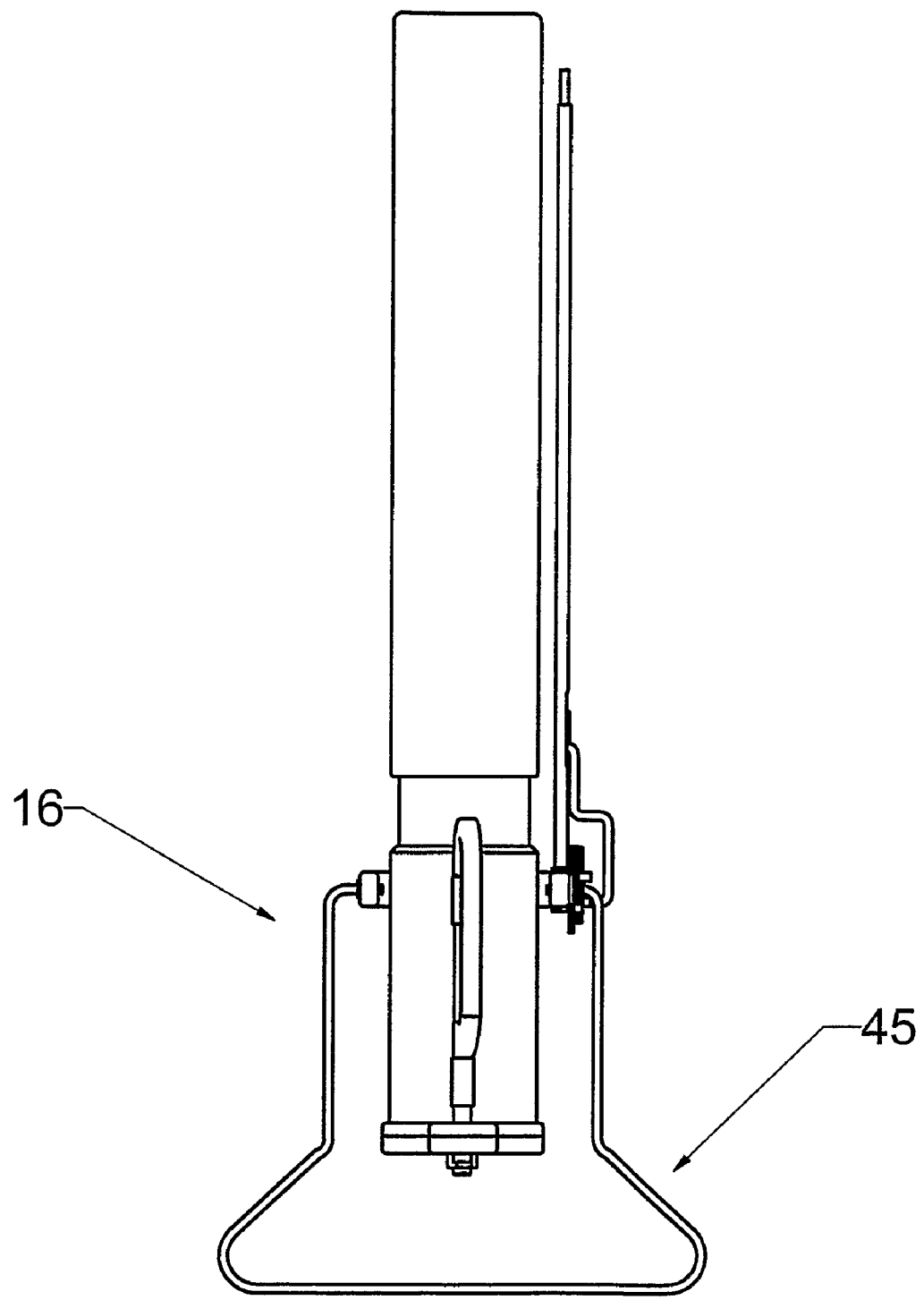
FIG. 36 is a front view of an alternative embodiment of a fore-aft indicator element as attached to one type of pedestal, a gooseneck coupler member.

Referring to the various figures and the discussion above but particularly indicated in FIGS. 10 and 35, it can be seen that embodiments may involve the use of the pedestal 6. Pedestal 6 may serve as one type of ground position element 38. The ground position element 38 may be important not so much because it vertically supports some portion of the trailer 1, but more because it is responsive to the ground and thus can provide a base against which the trailer can be pushed or moved laterally. In this fashion, lateral movement can occur not by causing a force on the vehicle or the like, but in response to the ground.

Of course, there can also be vertical support of the trailer 1. This vertical support may include a trailer vertical adjustment element. It may also serve as a vertical jack. By providing an independent trailer vertical support, that is, independent of the vehicle or other source of towing power, lateral movement can occur without a need for or independent of any vehicle involved. This can facilitate movement even during the for-and-aft positioning that will typically occur when hitching up a trailer. The vertical support may, of course, be a pedestal 6 and as shown in the various figures, the lateral trailer adjustment element 10 may be thus configured as an independent lateral adjustment element so that it does not require or respond to the source of towing power—at least for its movement forces. In this fashion, it can be understood how at least one embodiment can act to retentively laterally adjust, and even independently laterally adjust, the coupler element 3 in a manner that is responsive to the act of independently vertically supporting the trailer 1.

Figure 9:
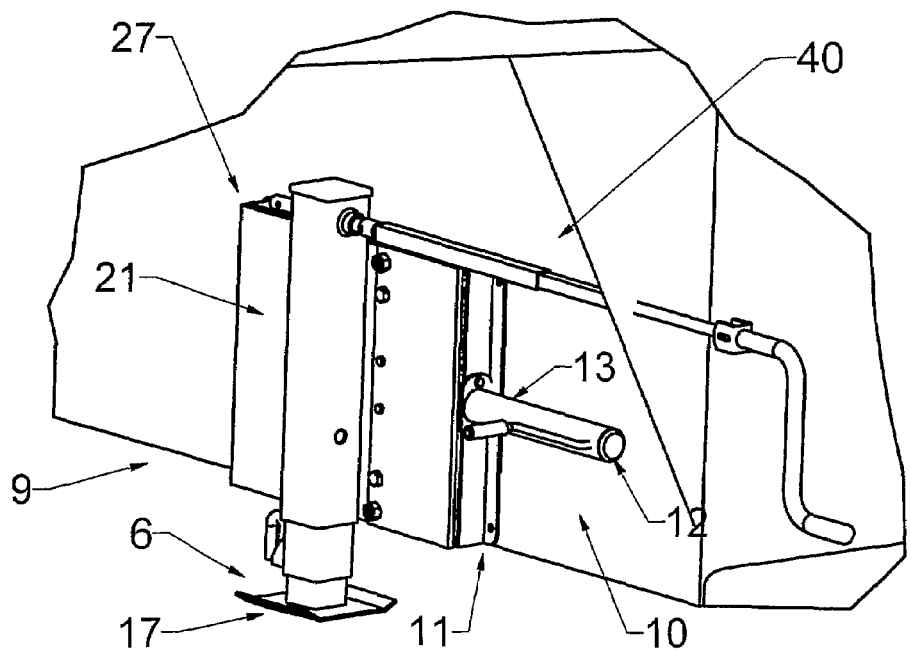
FIG. 9 is a close up of the pedestal area of the gooseneck embodiment shown in FIG. 8.

In providing a design that is compact, protected, reliable, and also has a minimum of user actions necessary to permit use of the device, designs may include a detachable, foldable or folding, or even adjustable actuator element, perhaps in configurations such as shown in FIG. 9. A detachable actuator element may include an arm or a handle that may be fully detachable and then inserted or at least connected to some other component to facilitate action by the device. Thus all the user may be required to do is to attach and then detach the actuator element. It may then be stored until its next occasion for use.

Embodiments may include a remote actuator element, such that the actuator itself may be designs for use in a manner where it is not physically attached to a frame or the like of a lateral adjustment element 10. In this fashion, the actuator, if mounted, could be mounted apart from the lateral adjustment element 10 for convenience. Examples of this type of a configuration are shown in FIGS. 15-19, where the remote actuator element 48 is a separately mounted element that can be mounted at any desired location. The remote actuator element 48 may also plug in or merely be removed from a connection (such as a wireless connection or the like) when not in use. Naturally a remote actuator element 48 may or may not be detachable; all that may be necessary is that a remote actuator element 48 act to remotely, that is not necessarily directly attached to the actual lateral adjustment element 10, activate the desired activity. Likewise, an adjustable actuator element may be positioned or repositioned for use. An adjustable actuator element may include components such as a folding or telescoping handle or the like. Importantly, it should be understood that the adjustable actuator element may either involve opening the component for user or even adjusting the component to suit a particular user. Once possible embodiment that may be used as an adjustable actuator element may be a telescoping shaft 40 as shown in FIGS. 9-10. This may adjust as the lateral adjustment element 10 is actuated and moved. It may also be adjusted by the user such as to select a particular configuration that best suits that user. Again it should be understood that the two aspects, adjustability and detachability, may be provided alone or together in various embodiments.

Figure 27:
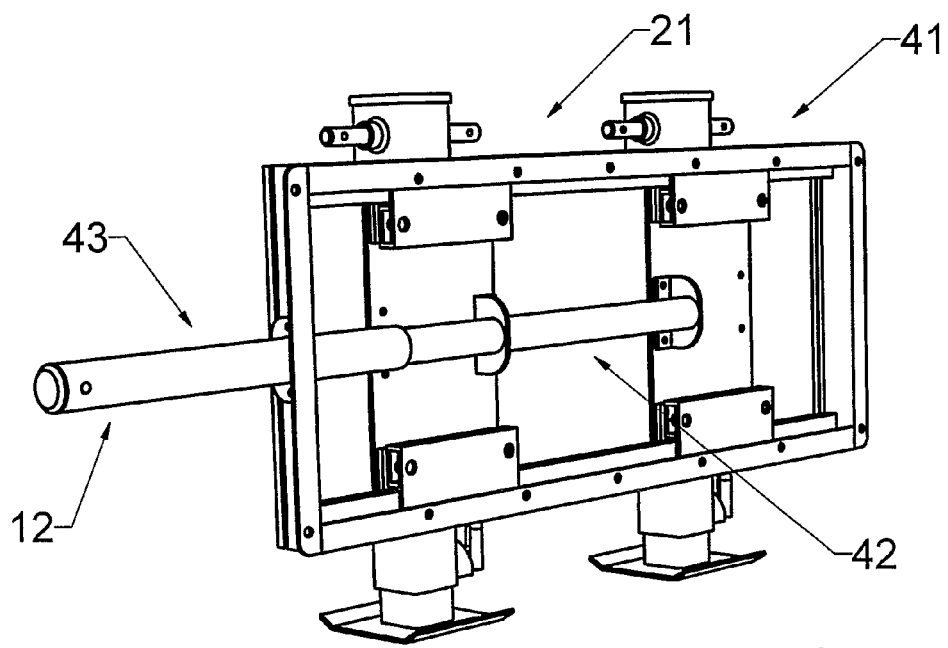
FIG. 27 shows a back view of the embodiment of the isolated lateral trailer adjustment portion of FIG. 26.
Figure 28:
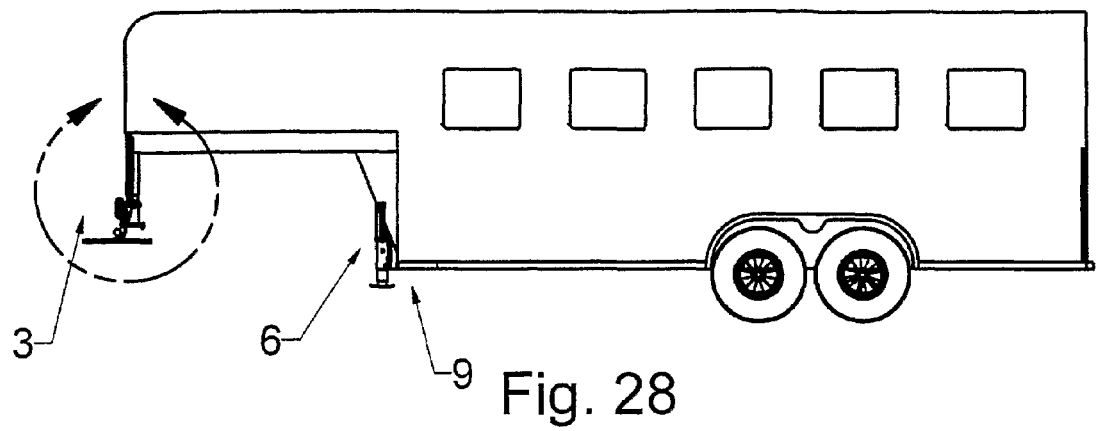
FIG. 28 is a side view of a gooseneck trailer with a fore-aft indicator element.

As shown in FIG. 27, it can be understood that some trailer configurations may involve more than one leg or pedestal 6. This may include providing a second vertical jack or the like. For such designs, embodiments of the invention may include a second retentive lateral trailer adjustment element 41 and even a lateral trailer adjustment connection element 42. As can be seen in the figure, the second retentive lateral trailer adjustment element 41 may be a substantial duplicate of the first, but in some designs, it should be understood that it need not include all the components of the first. As shown, it is also possible to have the first and second retentive lateral trailer adjustment elements connected or responsive to each other in some fashion. As shown in FIG. 27, this may be through a connection, or even a shared actuator element 43, by which any rotational movement actuation imparted to the first may be automatically received by the second. In this fashion, among others, it may be understood that the two lateral adjustment elements 10 may be equally responsive. They may also utilize or activate a shared actuator element 43 as mentioned above. Not just activating one lateral adjustment element 10, such a design may also secondarily retentively laterally adjust the coupler element 3. It may also include the steps of secondarily vertically adjusting or secondarily vertically jacking the trailer 1. Naturally after the trailer is hitched, a user may accomplish the step of vertically retracting the support to get it out of the way for the towing activity. He or she might also re-center the lateral adjustment element 10 for the next use.

As mentioned above, it should be understood that many different designs and configurations are possible. The ones presented are not intended to be limiting. Similarly, the invention may be used with a variety of trailer configurations, including but not limited to: boat trailers, recreational vehicle trailer or RV's, campers, horse trailers, utility trailers, commercial trailers, or the like. It may be attached as a part of original equipment or it may be provided as an after-market accessory and may be attached to the vehicle towing trailer body, heavy duty trailer body, or the like. Embodiments may be configured heavier or lighter depending on the weight of the trailer intended to be used with the unit. Some embodiments may be housed within the trailer body as well.

In addition, and as shown in FIGS. 28-37, there may be provided either alone or in conjunction with the lateral adjustment element 10, a fore-aft position indicator 44. As mentioned above, the vehicle or other source of towing power may first be positioned by backing it up toward the trailer 1. As shown in FIGS. 34-37, the fore-aft position indicator 44 may provide some type of indication, either visually or audibly that the vehicle is in the correct position. This indication may be provided to the driver by reflecting an indication likely through a reflective surface on the vehicle, perhaps such as one or more of the vehicle's standard rearview mirrors. Through proper positioning or design, it thus may serve as a reflective surface visible indicator. When the truck or other source of towing power is backed up to the trailer, such as a gooseneck trailer, so the vehicle coupler element is near the couple portion location of the trailer hitch, the fore-aft position indicator 44 may be available to indicate proper positioning. This may occur in a continuous state so that the driver can inch his or her way to the proper fore-aft position. While it may provide a discrete indication such as a pop-up when in the appropriate position, it may also provide a continuous movement such as to permit the driver to see smaller amounts of movement as the source of tow power is backed up. In this manner the indicator may serve as a relative distance gauge by gauging or marking or measuring off some distance aspect. It may also be a calibrated distance gauge whereby precise amounts of movement can be understood by the driver.

Figure 30:
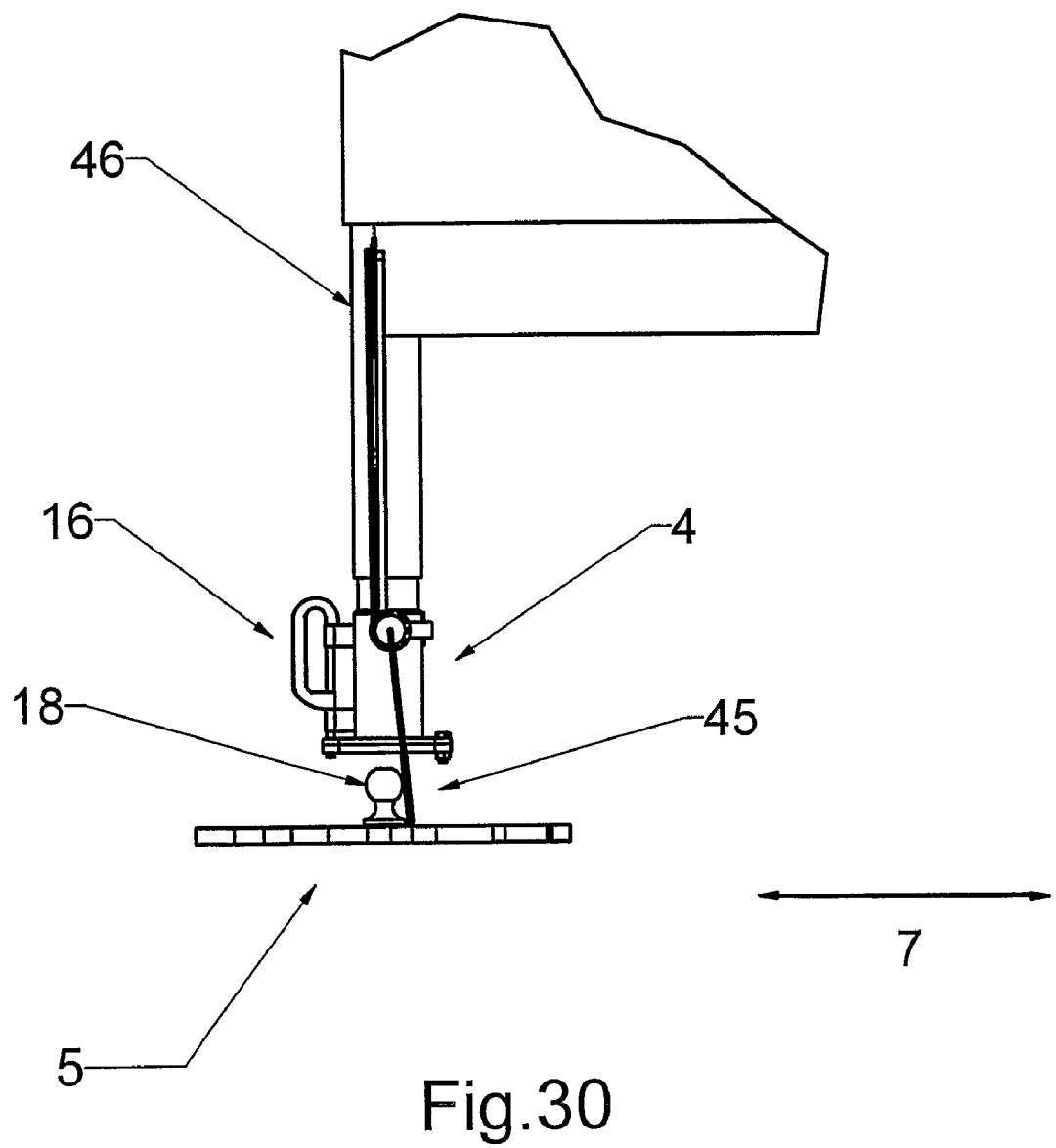
Figure 34:
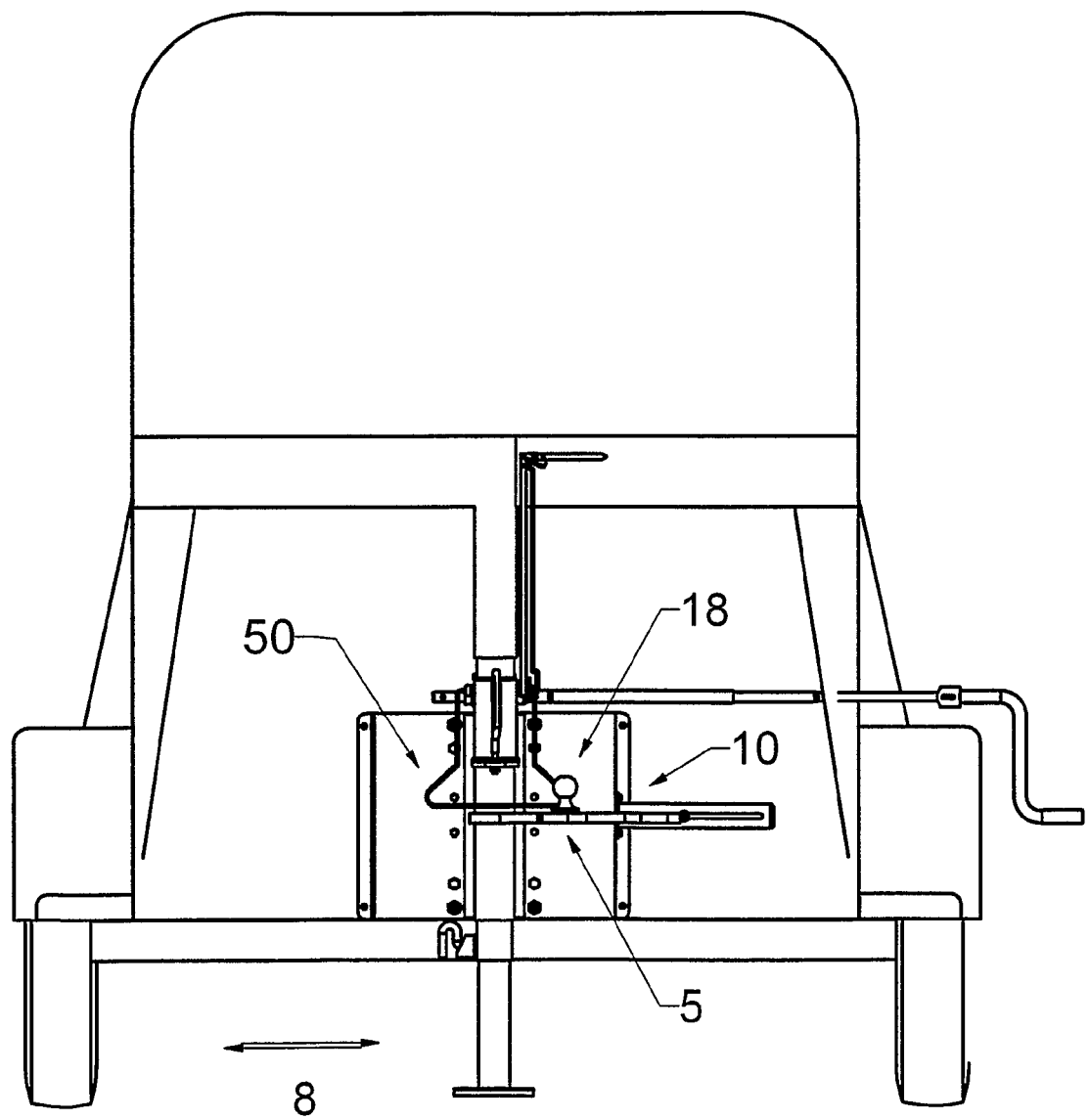
FIG. 34 is a front view of a gooseneck trailer configuration having a lateral trailer adjustment element and a fore-aft indicator element shown in FIG. 28 that is indicating proper fore-aft position even though a lateral misalignment.

Embodiments having a relative fore-aft position indicator 44 may, as shown in FIG. 34, also have this included in conjunction with a relative position sensor 50. In this manner the combination may sense and perhaps also indicate the relative positions of the trailer and the source of tow power. In the design shown in FIG. 34 among others, the truck or other vehicle may be backed up until the relative position sensor 50 engages the trailer. This may then activate the fore-aft position indicator 44 to eventually indicate proper positioning in some manner, perhaps by movement of a flag or other indicator, or even a fore and aft position gauge 46. Again, an audio and/or a light signal may also be provided as the signal or independent of a flag or other signal element. If positioned so as to be visible to the driver, perhaps through a mirror, the signal may indicate to the driver of the vehicle that a proper fore and aft positioning or alignment has been achieved. In some embodiments, the relative position sensor 50 may be a bail element 45, and may be moved into a travel or storage position, such as an upward detent position (not shown), either after the proper fore and aft positioning has been obtained, or optionally at any other desired time. As shown in FIG. 30, it may also automatically move out of the way such as when dropping the trailer. As such it may serve as an automatic retraction element or it may even be designed as providing an over center connection or the like for this purpose, among others. By not engaging the trail until within a specific relative distance, the design may provide a reactionary range limited position sensor so that until the trailer is close enough, it may not be activated and thus it may be able to provide a more accurate reading by not having to indicate relative position over too large a range of distances. It can thus provide a high in-field sensitivity element that is adequate to permit positioning within the tolerances needed to properly lower and couple the type of hitch involved.

If the fore-aft position indicator 44 is combined with the lateral adjustment element 10, a lateral adjustment may also be made. Since perfect lateral alignment is not likely assured, the relative position sensor 50 may be configured as a laterally dynamic position sensor, in that it may be able to accommodate any lateral relative positioning between the source of tow power and the trailer within a reasonable range and thus laterally dynamically sense some item. As shown in FIGS. 29-36, one design for such an element may be to use a bail element 45 that has a linearly configured response element such as the lower portion. This may even be an orthogonal bar so that any movement across it may roughly indicate the same fore-aft position.

Figure 29:
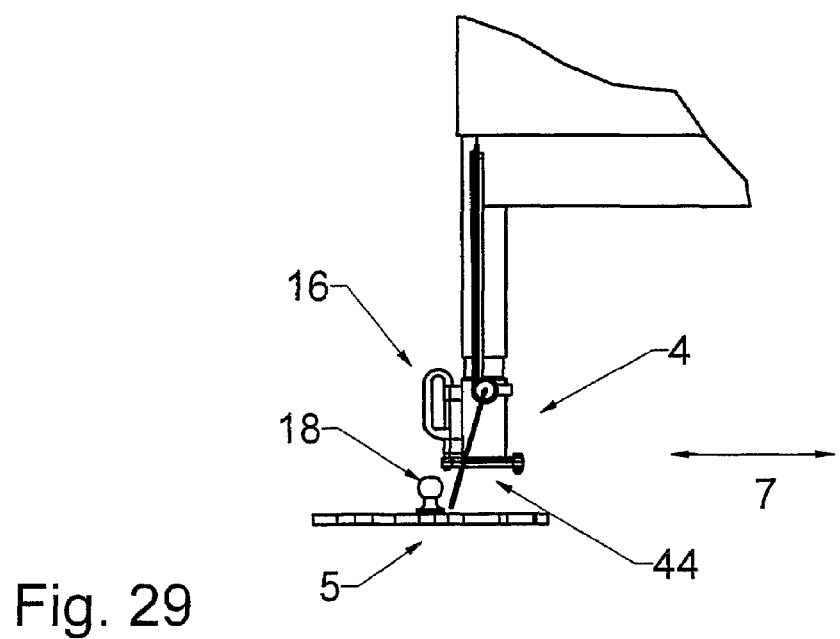
FIGS. 29 and 30 are side views of the indicator element shown in FIG. 28 during two different positions during the coupling process.
Figure 33:
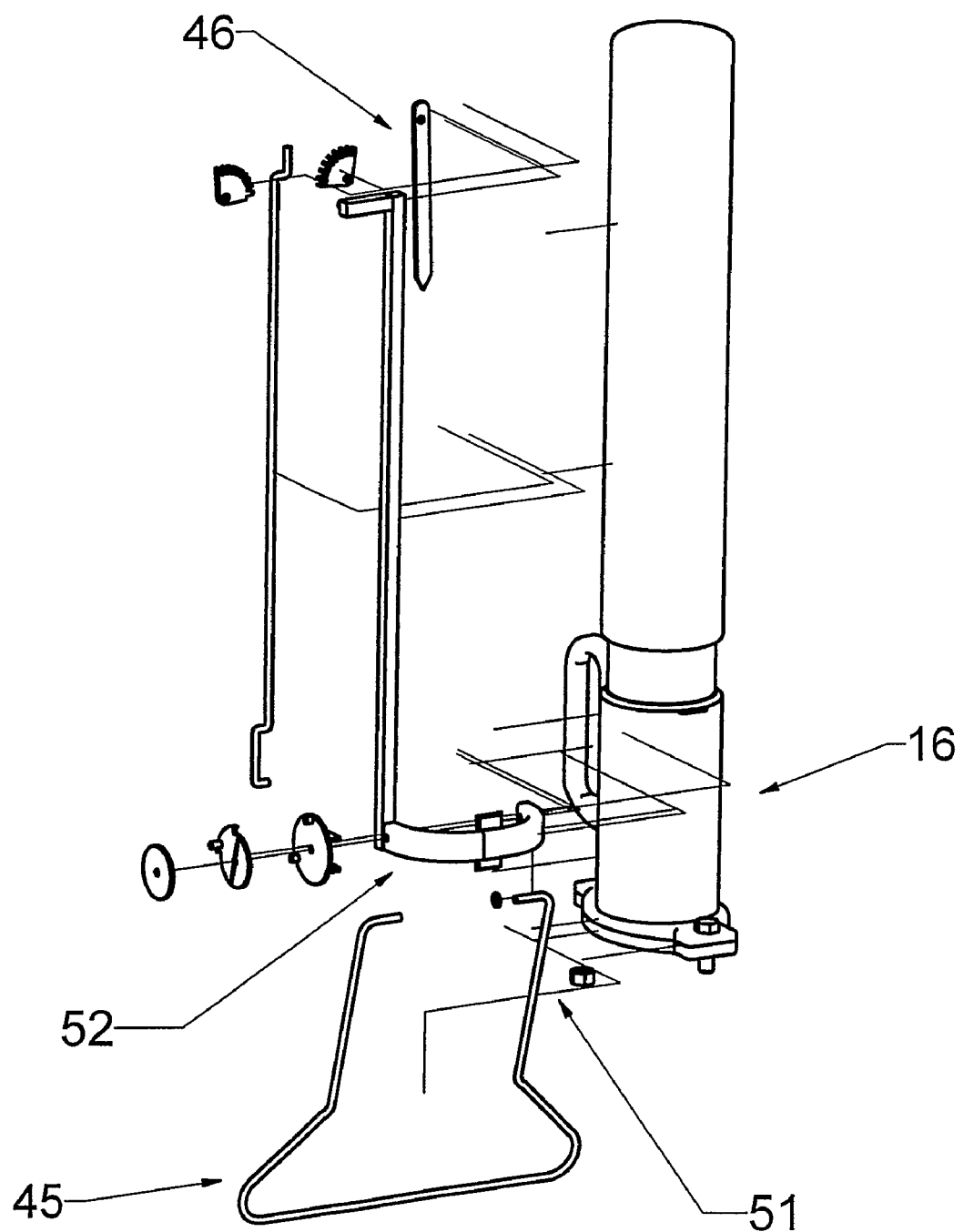
FIG. 33 is an exploded view of the indicator element shown in FIG. 28 as it may be attached to one type of pedestal.
Figure 37A:
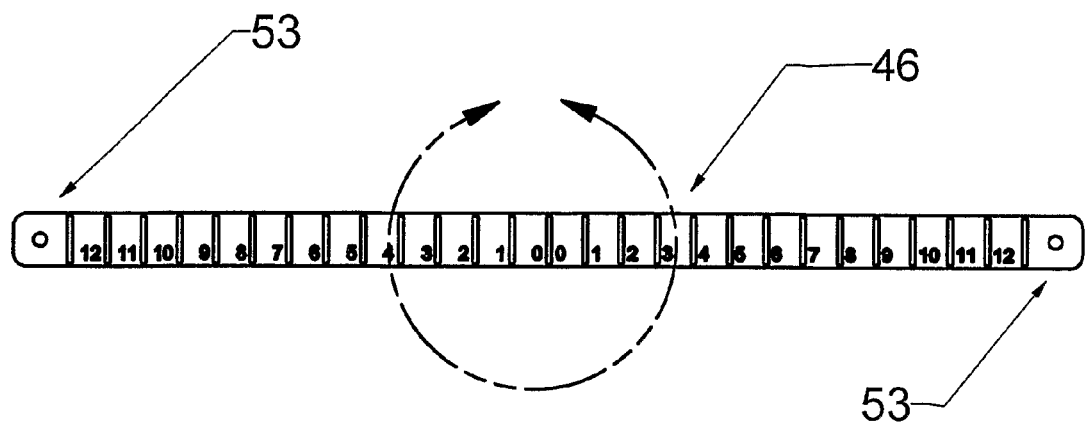
FIGS. 37A-B are depictions of an isolated indicator portion such as might be used in conjunction with or as an alternative to the fore-aft indicator element shown in FIG. 36.
Figure 37B:
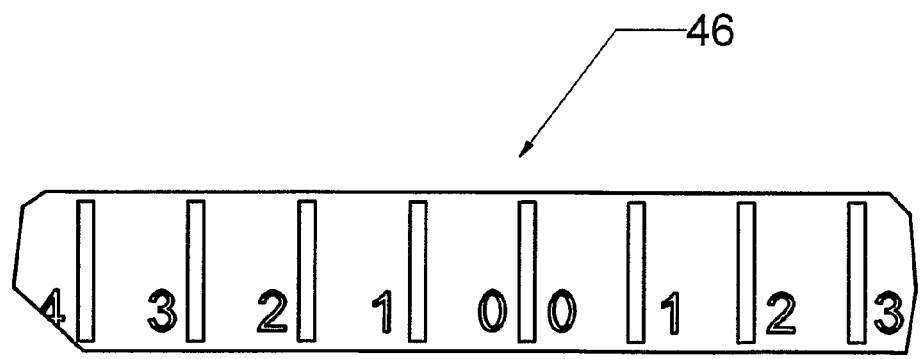

Several features may be of practical importance. In one embodiment, designs may include a trailer mount 52 as shown in FIG. 33; it may also include a vehicle mount 53 as shown in FIG. 37. Each of these mounts may be of such as type that they are easily accomplished by a user and thus may serve as a user mount. They may also be designed as a non-intrusive mount included but not limited to by using adhesive or magnetic attachments so that the trailer or vehicle is not damaged or affected in the event they are removed. In addition, designs may be independent of a vehicle indicator element or trailer indicator element so no mounting or other action on one or the other is necessary. As shown in FIGS. 29 and 30, no special changes or complementary elements are necessary on the source of tow power to achieve the indication; similarly, as shown in FIG. 37 no changes may be necessary to the trailer when the indicator is attached to the vehicle as described above. In embodiments such as shown in FIGS. 29, 30, and 33, there may be included an automatic position return element 51, perhaps such as a spring or other bias element so that the relative position sensor is automatically repositioned in an appropriate location if the vehicle were to be pulled forward and re-backed up to the trailer or so some sensor element is automatically biased in a desired direction.

Once properly positioned, the trailer may then be lowered, through the vertical adjustment as previously described, to engage the coupler element 3. If provided in combination with a lateral adjustment element 10, the retentive lateral adjustment device or devices may then be actuated to move the couple portion of the trailer over the ball of the truck until lateral alignment is achieved. Embodiments providing a vertical jack, such as a drop leg jack, may vertically adjust the trailer and corresponding couple portion of the hitch of the trailer until coupling of the couple portions of the truck and trailer are achieved. In some embodiments, the sensor, such as the bail element 45, may be designed as a resistently pliable sensor element that is firm but yields in over stressed and can then be bent back into shape. Other embodiment may have a breakaway sensor element, and in any design the sensor may be a replaceable sensor element so that if bent or broken it can be easily replaced. As shown in FIGS. 29-36 can be seen that the bail element 45 need not be structural and thus may be bent or damaged without damaging any portion of the trailer. A ¼ inch rod bail may be used and may be easily replaceable.

Figure 31:
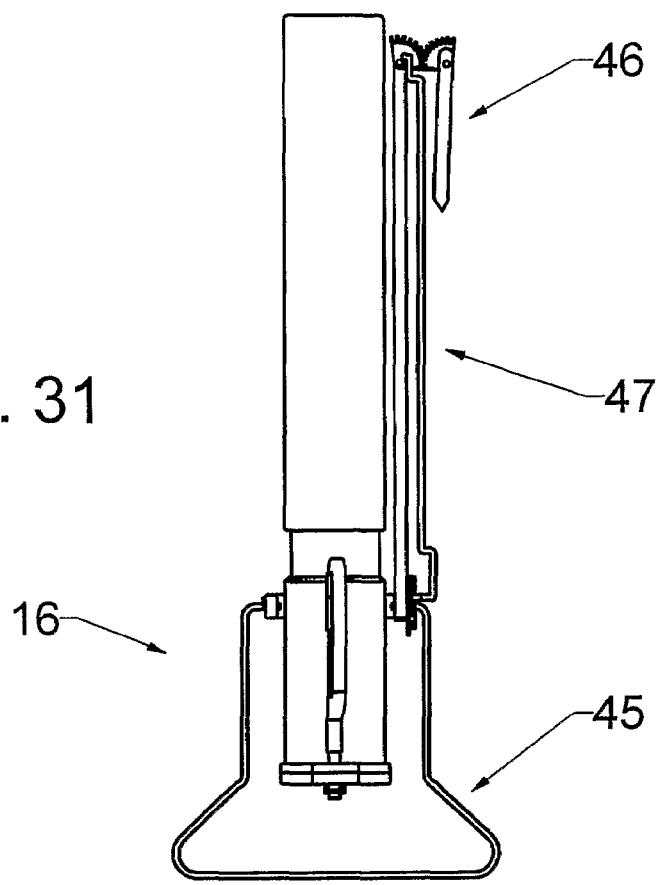
FIG. 31 is a front view of the indicator element shown in FIG. 28 as attached to one type of pedestal.
Figure 32:
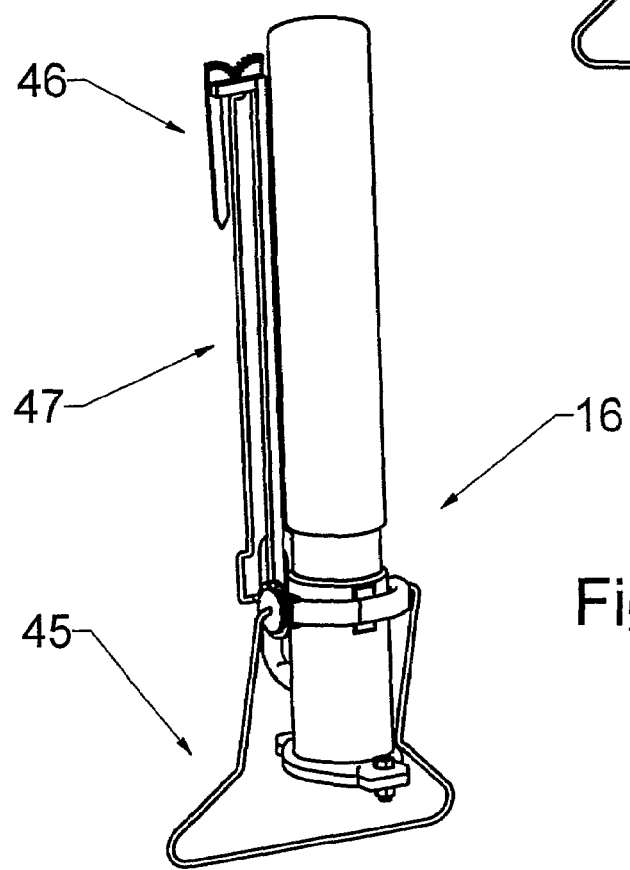
FIG. 32 is a perspective view of the attached indicator element shown in FIG. 31.

The fore-aft position gauge 46 may provide a direct indication of fore-aft positioning. It may comprise a colored signal element, such as a rod tip as shown in FIGS. 31 and 32, a flag, or even a light for visual signal of positioning. An audio signal may also be provided for audio position signaling. The audio signal and/or light can be provided alone or in combination with other signal elements. One embodiment is shown in FIG. 41 having a colored (not shown) rod tip and a connector element 47, potentially a push rod or other connector. In some embodiments, multiple mechanical plates, and potentially a fixed plate, cam plate, and detent plate assembly.

Another embodiment of a fore-aft position indicator is shown in FIG. 37. As shown, this type of a design can provide an indication of relative distance through linear or other indications much like a ruler or the like. This type of a design can be used as a very simple addition to a vehicle whereby relative fore-aft position or even amounts of movement of the vehicle alone can be indicated to a driver. This can be useful in establishing a coupler element in a coupled configuration by permitting the driver to know with more precision just how much movement the driver is accomplishing. For example, assume the driver is told or visually know that he or she needs to move back another seven inches. By mounting this type of an indicator on a door jamb or the like of a vehicle, the driver may be able to merely open his or her door and notice apparent movement of some ground indicia, perhaps such as a rock or the like to know how much movement he or she has accomplished. In this type of a design, the relative distance gauge may also be a calibrated distance gauge whereby the indications on the device itself may correspond to the amount of movement accomplished and indicator may provide a calibrated indication of some distance, be it a movement distance or a relative distance between two objects. Since the gauge may be a some distance from the ground or other indicia, the indications or increments on it may be designed with the driver's perspective (herein termed "parallax") in mind so that perhaps some smaller distance (perhaps such as ⅝ of an inch or the like) may serve to indicate a full inch of vehicle movement due to the closer location of the gauge as compared to the ground indicia or the like. In this manner the device may serve as not only a "parallax" factored distance gauge to provide a "parallax" factored indication, but also through its placement on a relatively unnoticed doorjamb area, it may serve as a hidden distance gauge and even a door jamb gauge, a vehicle running board gauge, or even a vehicle step gauge. It may be mounted through removable and non-intrusive means such as by adhesive or magnetic techniques as well.

In regard to another type of indicator embodiment, and again, potentially referred to as a fore-aft indicator, a signal element, such as a flag, colored signal element, or the like, signals the position, timing, or alignment configuration of which the couple portion of the trailer hitch is moved over a triggering couple portion of a hitch of a source of tow power. The condition may indicate in some embodiments that the couple portion of the trailer is aligned with the couple portion of the source of tow power. Engagement of the trigger with the couple portion of the source of tow power may actuate the mechanisms and connector elements causing the signal element to activate, such as by pushing the rod up, or raising the flag or the like. A further indicator embodiment of the present invention may include a fore-aft plate gauge, that is utilized after a source of tow power is positioned proximate the couple portion of the trailer. The couple portion of the trailer may be vertically adjusted to provide initial accommodation to the adjustment of the source of tow power and its hitch and couple portion thereof. After the source of tow power has been positioned proximate the trailer couple portion, fine positioning may be accomplished by the use of the fore-aft indicator 44.

As previously mentioned, the indicator may be provided in the form of a plate, and in some embodiments, a rule such as the gauge 46 shown in FIG. 37. Indicia may comprise ruled hash marks, and in certain embodiments, may represent the actual or a proportionate amount of travel of the source of tow power and the couple portion thereof. Accordingly, the incremental distance between the hash marks may or may not equate exactly to the repositioning and travel of the source of tow power and its couple portion. In an embodiment, each mark is numerically numbered and increasing from a center point of the indicator out along each extent of the indicator, although numbering is not crucial. Each increment of the indicia, such as hash marks, may represent the actual travel of the source of tow power and its couple portion respective of the amount of adjustment noticed by the driver or other individuals given their perspective (for example, a drivers view from inside a truck cab). Therefore, the actual incremental distance between the hash marks may or may not equate to the distance moved of the source of tow power or its couple portion.

The indicator may be mounted to the truck or trailer, either as a magnetic or adhesive embodiment or by a fastener configuration, such as screws or rivets, to the threshold of a vehicle door, to a step, to a running board, etc. The indicator may also be a plate, potentially comprised of steel or aluminum to reduce maintenance thereof, and in some preferred embodiments may be of about 0.0625 to about 0.125 inches in thickness. The indicator may have hashmarks, numbers, or other indicia configured with, and in some embodiments etched into, the material. Highlighting of the indicia may provide additional functionality. In utilizing this embodiment, a reference mark may be taken from the ground or other non-moving source respective of the source of tow power. Alternatively, in some embodiments, the indicator may be kept on the ground during adjustment, in which case a reference mark should be made respective of the moving source of tow power, such as a scratch on the truck or other reference. During movement of the source of tow power, the relative position of the reference mark respective of an initial and a subsequent indicia increment may indicate an amount traveled. A conversion respective of the incremental indicia distances and the actual traveled distance may be required. Although some embodiments identify a 'zero' indicia mark, any indicia of the indicator may be initially utilized perhaps with a count may be made of the number of incremental indicia marks respective of the reference mark measured during adjustment of the source of tow power.

As can be easily understood from the foregoing, the basic concepts of the present invention may be embodied in a variety of ways. It involves both trailer attachment techniques as well as devices to accomplish the appropriate trailer attachment. In this application, the techniques are disclosed as part of the results shown to be achieved by the various devices described and as steps that are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims that will be included in any subsequent patent application.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used, the term "element" is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element, which causes that action. Similarly, each physical element disclosed should be understood to encompass a disclosure of the action which that physical element facilitates. Regarding this last aspect, as but one example, the disclosure of an "actuator" should be understood to encompass disclosure of the act of "actuating"—whether explicitly discussed or not—and, conversely, were there effectively disclosure of the act of "actuating", such a disclosure should be understood to encompass disclosure of a "actuator" and even a "means for actuating." Such changes and alternative terms are to be understood to be explicitly included in the description.

Any patents, publications, or other references mentioned in this application for patent are hereby incorporated by reference. In addition, as to each term used it should be understood that unless its utilization in this application is inconsistent with such interpretation, common dictionary definitions should be understood as incorporated for each term and all definitions, alternative terms, and synonyms such as contained in the Random House Webster's Unabridged Dictionary, second edition are hereby incorporated by reference.

Thus, the applicant(s) should be understood to have support to claim and make a statement of invention to at least: i) each of the hitching devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) the various combinations and permutations of each of the elements disclosed, and xii) each potentially dependent claim or concept as a dependency on each and every one of the independent claims or concepts presented.

With regard to claims whether now or later presented for examination, it should be understood that for practical reasons and so as to avoid great expansion of the examination burden, the applicant may at any time present only initial claims or perhaps only initial claims with only initial dependencies. Support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible.

Finally, any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

All references in the disclosure, and in the following list of references are each hereby incorporated by reference; however, to the extent some statements might be considered inconsistent with the patenting of this/these invention(s) such statements are expressly not to be considered as made by the applicant(s).

| DOCUMENT NO | DATE | NAME | CLASS | SUBCLASS | FILING DATE |
|---|---|---|---|---|---|
| Des. 311,511 | 12/10/1990 | Craig | D12 | 162 | 13/06/1988 |
| Des. 344,485 | 22/02/1994 | Linne et al. | D12 | 187 | 18/06/1992 |
| 831,956 | 25/12/1906 | Jonas | | | 05/04/1906 |
| 839,518 | 25/12/1906 | Shaw | | | 27/04/1906 |
| 929,920 | 03/08/1909 | Davis | 280 | 477 | 29/04/1909 |
| 1,065,989 | 01/07/1913 | Verbeke | | | 12/04/1913 |
| 1,131,018 | 09/03/1915 | Troutman | | | 25/06/1914 |
| 1,235,082 | 31/07/1917 | Brethorst | | | 29/03/1917 |
| 1,304,276 | 20/05/1919 | Haeseleer | | | 14/10/1918 |
| 1,314,982 | 02/09/1919 | Reed | | | 07/04/1919 |
| 1,326,551 | 30/12/1919 | Turnbull | | | 11/01/1917 |
| 1,350,962 | 24/08/1920 | Flory | | | 04/02/1919 |
| 1,391,760 | 27/09/1921 | Collier | | | 25/10/1919 |
| 1,424,631 | 01/08/1922 | Edmonds | | | 28/05/1921 |
| 1,433,922 | 31/10/1922 | Williams | | | 15/05/1919 |
| 1,450,526 | 03/04/1923 | Timmis | | | 15/02/1922 |
| 1,479,182 | 01/01/1924 | Jeschke | | | 21/03/1922 |
| 1,665,133 | 03/04/1928 | Gibson | | | 08/03/1927 |
| 1,768,304 | 24/06/1930 | Ayler | | | 17/04/1929 |
| 2,050,093 | 04/08/1936 | Goldman | 280 | 33.9 | 30/09/1935 |
| 2,089,400 | 10/08/1937 | Morris | 280 | 33.44 | 11/07/1936 |
| 2,091,668 | 31/08/1937 | Bradford | 280 | 33.44 | 17/08/1936 |
| 2,104,734 | 11/01/1938 | Carpenter | 280 | 33.44 | 28/08/1935 |
| 2,150,269 | 14/03/1939 | Dreisbach | 280 | 33.44 | 03/09/1937 |
| 2,287,234 | 23/06/1942 | Ducharme | 280 | 33.15 | 17/06/1941 |
| 2,386,195 | 09/10/1945 | Clark | 280 | 33.14 | 12/02/1944 |
| 2,444,876 | 06/07/1948 | Kuhl | 280 | 33.44 | 30/04/1947 |
| 2,451,660 | 19/10/1948 | Clark et al. | 280 | 33.15 | 06/08/1946 |
| 2,463,926 | 08/03/1949 | Ward | 280 | 33.44 | 19/11/1947 |
| 2,472,514 | 07/06/1949 | Brinkley | 5 | 317 | 18/01/1946 |
| 2,475,443 | 05/07/1949 | Bill | 280 | 43 | 17/05/1948 |
| 2,523,211 | 19/09/1950 | Hedgpeth | 280 | 33.44 | 28/10/1947 |
| 2,531,289 | 21/11/1950 | Murat | 280 | 33.44 | 02/06/1947 |
| 2,546,531 | 27/03/1951 | Vutz | 280 | 33.44 | 10/05/1949 |
| 2,638,315 | 12/05/1953 | Wagner | 254 | 86 | 03/02/1947 |
| 2,663,574 | 22/12/1953 | Martin | | | 13/02/1945 |
| 2,687,899 | 31/08/1954 | Bendtsen | 280 | 504 | 27/04/1951 |

-continued

| DOCUMENT NO | DATE | NAME | CLASS | SUBCLASS | FILING DATE |
|---|---|---|---|---|---|
| 2,708,045 | 10/05/1955 | Shontz | 214 | 506 | 04/05/1953 |
| 2,712,452 | 05/07/1955 | Hallowell | 280 | 79.1 | 13/08/1951 |
| 2,736,575 | 28/02/1956 | Gebhart | 280 | 477 | 19/05/1953 |
| 2,783,039 | 26/02/1957 | Wilson | 267 | 1 | 30/07/1954 |
| 2,786,690 | 26/03/1957 | F. L. Tharp | 280 | 3 | 04/04/1954 |
| 2,854,148 | 30/09/1958 | Mattos et al. | | | 12/04/1957 |
| 2,864,627 | 16/12/1958 | Kleinknecht | 280 | 401 | 28/03/1955 |
| 2,885,462 | 05/05/1959 | Sylvester | 174 | 94 | 14/12/1956 |
| 2,917,323 | 15/12/1959 | Mandekic | 280 | 470 | 20/05/1955 |
| 2,919,142 | 29/12/1959 | Winget | 280 | 481 | 11/10/1956 |
| 2,947,551 | 02/08/1960 | Reimers | 280 | 499 | 22/04/1959 |
| 2,984,011 | 16/05/1961 | Hamilton | 33 | 46 | 02/08/1957 |
| 2,992,832 | 18/07/1961 | Robinson | 280 | 24 | 15/12/1959 |
| 3,084,953 | 09/04/1963 | McGregor | 280 | 150.5 | 19/02/1960 |
| 3,099,462 | 30/07/1963 | Lent | 280 | 478 | 17/05/1962 |
| 3,118,688 | 21/01/1964 | Stilley | 280 | 447 | 29/12/1960 |
| 3,126,210 | 24/03/1964 | Hill | 280 | 478 | 14/08/1961 |
| 3,150,884 | 29/09/1964 | Drott | 280 | 460 | 09/01/1962 |
| 3,159,368 | 01/12/1964 | Ahlbin el al. | 248 | 225 | 14/03/1962 |
| 3,169,028 | 09/02/1965 | Scrivner | 280 | 478 | 03/12/1962 |
| 3,178,203 | 13/04/1965 | Elliott | 280 | 470 | 29/08/1962 |
| 3,181,891 | 04/05/1965 | Moats | 280 | 475 | 05/07/1963 |
| 3,201,144 | 17/08/1965 | Smyser | 280 | 477 | 29/05/1962 |
| 3,266,818 | 16/08/1966 | Hill et al. | 280 | 478 | 28/09/1964 |
| 3,281,161 | 25/10/1966 | Anderson | 280 | 476 | 15/03/1965 |
| 3,311,390 | 28/03/1967 | Rendessy | 280 | 504 | 28/06/1965 |
| 3,319,977 | 16/05/1967 | Quandt et al. | 280 | 475 | 08/06/1965 |
| 3,329,402 | 04/07/1967 | Grumman | 254 | 86 | 12/07/1965 |
| 3,400,948 | 10/09/1968 | Matson | 280 | 406 | 09/01/1967 |
| 3,439,764 | 22/04/1969 | Kimball | 180 | 12 | 03/04/1967 |
| 3,464,882 | 02/09/1969 | Morton | 161 | 151 | 21/01/1965 |
| 3,482,847 | 09/12/1969 | Hart | 280 | 3 | 30/01/1968 |
| 3,549,173 | 22/12/1970 | Stanfield | 280 | 457 | 29/01/1969 |
| 3,576,225 | 27/04/1971 | Chambers | 180 | 8 | 15/01/1969 |
| 3,596,925 | 03/08/1971 | Richie | 280 | 477 | 10/09/1969 |
| 3,622,182 | 23/11/1971 | Grosse-Rhode | 280 | 478 A | 13/11/1969 |
| 3,659,876 | 02/05/1972 | Melton | 280 | 511 | 12/11/1970 |
| 3,715,132 | 06/02/1973 | Denny | 280 | 405 R | 24/02/1971 |
| 3,718,317 | 27/02/1973 | Hilmer | 254 | 186 HC | 27/01/1971 |
| 3,738,672 | 12/06/1973 | Dalton | 280 | 3 | 20/09/1971 |
| 3,740,077 | 19/06/1973 | Williams | 280 | 475 | 08/05/1972 |
| 3,740,078 | 19/06/1973 | Murr | 280 | 478 R | 23/08/1971 |
| 3,765,703 | 16/10/1973 | Voelkerding et al. | 280 | 477 | 14/02/1972 |
| 3,767,230 | 23/10/1973 | DeVries | 280 | 477 | 08/12/1971 |
| 3,774,149 | 2011/1973 | Bennett | 340 | 52 | 07/09/1972 |
| 3,782,760 | 01/01/1974 | Mann | 280 | 467 | 06/12/1972 |
| 3,807,767 | 30/04/1974 | Moline | 280 | 477 | 05/02/1973 |
| 3,818,599 | 25/06/1974 | Tague | 33 | 264 | 25/09/1972 |
| 3,823,962 | 16/07/1974 | Martin, Jr. | 280 | 514 | 24/08/1973 |
| 3,825,921 | 23/07/1974 | Marus et al. | 340 | 282 | 17/11/1972 |
| 3,837,675 | 24/09/1974 | Barnes et al. | 280 | 423 R | 14/02/1973 |
| 3,858,966 | 07/01/1975 | Lowell, Jr. | 350 | 307 | 02/01/1974 |
| 3,860,267 | 14/01/1975 | Lyons | 280 | 478 B | 14/09/1973 |
| 3,889,384 | 17/06/1975 | White | 33 | 264 | 14/06/1973 |
| 3,893,713 | 08/07/1975 | Ivy | 280 | 511 | 28/06/1974 |
| 3,904,225 | 09/09/1975 | George et al. | 280 | 478 R | 29/07/1974 |
| 3,912,119 | 14/10/1975 | Hill et al. | 280 | 478 A | 31/01/1975 |
| 3,918,746 | 11/11/1975 | Lehtisaari | 280 | 477 | 15/11/1974 |
| 3,922,007 | 25/11/1975 | Friedebach | 280 | 456 R | 26/071973 |
| 3,938,122 | 10/02/1976 | Mangus | 340 | 275 | 15/11/1974 |
| 3,989,270 | 02/11/1976 | Henderson | 280 | 478 A | 17/04/1975 |
| 4,029,335 | 14/06/1977 | Cady et al. | 280 | 439 | 31/03/1976 |
| 4,047,734 | 13/09/1977 | Miles | 280 | 486 | 23/02/1976 |
| 4,054,302 | 18/10/1977 | Campbell | 280 | 477 | 31/03/1976 |
| 4,060,255 | 29/11/1977 | Zimmerman | 280 | 478.1 | 16/03/1976 |
| 4,065,147 | 27/12/1977 | Ross | 280 | 477 | 01/06/1976 |
| 4,073,508 | 14/02/1978 | George et al. | 280 | 478 R | 19/07/1976 |
| 4,082,311 | 04/04/1978 | Hamman | 280 | 507 | 28/03/1977 |
| 4,125,272 | 14/11/1978 | Putnam, Jr. et al. | 280 | 478 B | 14/03/1977 |
| 4,159,833 | 03/07/1979 | Meiners | 280 | 478 R | 23/01/1978 |
| 4,168,082 | 18/09/1979 | Hendrickson | 280 | 476 R | 03/07/1978 |
| 4,168,847 | 25/09/1979 | Westphal | 280 | 423 R | 17/03/1978 |
| 4,169,610 | 02/10/1979 | Paufler | 280 | 477 | 06/03/1978 |
| 4,173,353 | 06/11/1979 | Steele | 280 | 477 | 17/03/1975 |

-continued

| DOCUMENT NO | DATE | NAME | CLASS | SUBCLASS | FILING DATE |
|---|---|---|---|---|---|
| 4,176,853 | 04/12/1979 | Brock | 280 | 423 R | 21/07/1978 |
| 4,176,854 | 04/12/1979 | Hill et al. | 280 | 478 R | 19/06/1978 |
| 4,183,548 | 15/01/1980 | Schneckloth | 280 | 433 | 21/09/1978 |
| 4,186,938 | 05/02/1980 | Youngblood | 280 | 402 | 10/04/1978 |
| 4,186,939 | 05/02/1980 | Woods et al. | 280 | 477 | 21/08/1978 |
| 4,187,494 | 05/02/1980 | Jessee | 340 | 52 R | 04/11/1977 |
| 4,202,562 | 13/05/1980 | Sorenson | 280 | 415 R | 15/05/1978 |
| 4,205,453 | 03/06/1980 | Steele | 33 | 180 AT | 08/09/1978 |
| 4,215,875 | 05/08/1980 | Younger | 280 | 478 B | 31/10/1978 |
| 4,254,968 | 10/03/1981 | DelVecchio | 280 | 477 | 02/10/1979 |
| 4,254,969 | 10/03/1981 | Martin | 280 | 478 B | 18/06/1979 |
| 4,283,173 | 11/08/1981 | Gostomski et al. | 280 | 508 | 09/10/1979 |
| 4,285,138 | 25/08/1981 | Berry | 33 | 264 | 13/03/1980 |
| 4,313,264 | 02/02/1982 | Miller, Sr. | 33 | 264 | 11/07/1979 |
| 4,320,907 | 23/03/1982 | Eaton | 280 | 511 | 19/12/1979 |
| 4,374,593 | 22/02/1983 | Smith et al. | 280 | 491 E | 22/05/1981 |
| 4,398,744 | 16/08/1983 | Schoppel et al. | 280 | 540 | 02/03/1981 |
| 4,428,596 | 31/01/1984 | Bell et al. | 280 | 507 | 12/03/1982 |
| 4,431,208 | 14/02/1984 | Geeves | 280 | 475 | 12/07/1982 |
| 4,472,100 | 18/09/1984 | Wagner | 414 | 481 | 15/12/1981 |
| 4,473,239 | 25/09/1984 | Smart | 280 | 763.1 | 03/06/1982 |
| 4,511,159 | 16/04/1985 | Younger | 280 | 477 | 30/04/1984 |
| 4,537,416 | 27/08/1985 | Linaburg | 280 | 478 | 15/02/1984 |
| 4,583,481 | 22/04/1986 | Garrison | 116 | 28 R | 15/10/1984 |
| 4,621,432 | 11/11/1986 | Law | 33 | 264 | 27/06/1985 |
| 4,666,176 | 19/05/1987 | Sand | 280 | 477 | 15/04/1985 |
| 4,669,748 | 02/06/1987 | LeVee | 280 | 423 R | 19/05/1986 |
| 4,708,359 | 24/11/1987 | Davenport | 280 | 477 | 29/12/1986 |
| 4,773,667 | 27/09/1988 | Elkins | 280 | 478 B | 30/04/1987 |
| 4,774,823 | 04/10/1988 | Callison | 70 | 14 | 20/04/1987 |
| 4,792,151 | 20/12/1988 | Feld | 280 | 406 A | 13/08/1987 |
| 4,799,705 | 24/01/1989 | Janes et al. | 280 | 477 | 15/05/1987 |
| 4,854,604 | 08/08/1989 | Stallsworth | 280 | 477 | 19/05/1988 |
| 4,856,200 | 15/08/1989 | Riggs | 33 | 264 | 24/06/1988 |
| 4,856,804 | 15/08/1989 | Nash | 280 | 430 | 11/04/1988 |
| 4,884,496 | 05/12/1989 | Donavich | 98 | 6 | 01/02/1989 |
| 4,893,829 | 16/01/1990 | Davis | 280 | 479.2 | 03/03/1989 |
| 4,903,978 | 27/02/1990 | Schrum, III | 280 | 477 | 14/06/1989 |
| 4,905,376 | 06/03/1990 | Neeley | 33 | 264 | 24/10/1988 |
| 4,911,460 | 27/03/1990 | DePaula | 280 | 478.1 | 13/02/1989 |
| 4,961,589 | 09/10/1990 | Faurenhoff | 280 | 475 | 09/03/1989 |
| 4,961,590 | 09/10/1990 | Davenport | 280 | 477 | 14/07/1990 |
| 4,991,865 | 12/02/1991 | Francisco | 280 | 477 | 21/08/1989 |
| 5,005,852 | 09/04/1991 | Smyly, Sr. | 280 | 477 | 23/08/1989 |
| 5,009,444 | 23/04/1991 | Williams, Jr. | 280 | 477 | 21/09/1989 |
| 5,009,445 | 23/04/1991 | Williams, Jr. | 280 | 477 | 03/10/1989 |
| 5,016,900 | 21/05/1991 | McCully | 280 | 477 | 20/12/1989 |
| 5,035,441 | 30/07/1991 | Murray | 280 | 477 | 20/04/1990 |
| 5,036,593 | 06/08/1991 | Collier | 33 | 264 | 04/05/1990 |
| 5,080,386 | 14/01/1992 | Lazar | 280 | 477 | 02/11/1990 |
| 5,085,408 | 04/02/1992 | Norton et al. | 254 | 325 | 23/04/1990 |
| 5,108,123 | 28/04/1992 | Rubenzik | 280 | 477 | 08/04/1991 |
| 5,113,588 | 19/05/1992 | Walston | 33 | 264 | 26/12/1991 |
| 5,114,170 | 19/05/1992 | Lanni et al. | 280 | 477 | 29/01/1991 |
| 5,125,679 | 30/06/1992 | Delano | 280 | 425.2 | 28/09/1989 |
| 5,143,393 | 01/09/1992 | Meyer | 280 | 491.1 | 19/03/1991 |
| 5,150,911 | 29/09/1992 | Williams | 280 | 502 | 24/09/1990 |
| 5,184,839 | 09/02/1993 | Guedry | 280 | 24/04 | 24/04/1991 |
| 5,195,769 | 23/03/1993 | Williams, Jr. | 280 | 478.1 | 30/08/1991 |
| 5,224,270 | 06/07/1993 | Burrus | 33 | 264 | 11/12/1991 |
| 5,236,215 | 17/08/1993 | Wylie | 280 | 477 | 17/07/1992 |
| 5,269,554 | 14/12/1993 | Law et al. | 280 | 477 | 27/04/1992 |
| 5,277,446 | 11/01/1994 | Hamel | 280 | 477 | 09/04/1993 |
| 5,282,515 | 01/02/1994 | Bell | 180 | 11 | 18/06/1991 |
| 5,286,050 | 15/02/1994 | Stallings, Jr. et al. | 280 | 477 | 19/06/1992 |
| 5,288,095 | 22/02/1994 | Swindall | 280 | 479.2 | 03/02/1993 |
| 5,288,096 | 22/02/1994 | Degelman | 280 | 508 | 10/05/1993 |
| 5,309,289 | 03/05/1994 | Johnson | 359 | 871 | 11/03/1991 |
| 5,314,202 | 24/05/1994 | Wilkins, Jr. | 280 | 511 | 02/11/1992 |
| 5,328,199 | 12/07/1994 | Howe | 280 | 477 | 25/02/1993 |
| 5,335,930 | 09/08/1994 | Tighe | 280 | 477 | 04/12/1992 |
| 5,338,047 | 16/08/1994 | Knisley | 280 | 3 | 22/07/1992 |
| 5,340,143 | 23/08/1994 | Williams, Jr. | 280 | 475 | 03/02/1994 |
| 5,384,329 | 20/09/1994 | Morin et al. | 280 | 461.1 | 20/04/1992 |
| 5,405,160 | 11/04/1995 | Weaver | 280 | 477 | 10/06/1992 |

-continued

| DOCUMENT NO | DATE | NAME | CLASS | SUBCLASS | FILING DATE |
|---|---|---|---|---|---|
| 5,449,191 | 12/09/1995 | Cattau | 280 | 438.1 | 31/08/1994 |
| 5,465,992 | 14/11/1995 | Anderson | 280 | 477 | 08/12/1994 |
| 5,478,101 | 26/12/1995 | Roberson | 280 | 477 | 29/06/1994 |
| 5,482,309 | 09/01/1996 | Hollis | 280 | 423.1 | 14/03/1994 |
| 5,482,310 | 09/01/1996 | Staggs | 280 | 477 | 20/12/1994 |
| 5,503,422 | 02/04/1996 | Austin | 280 | 477 | 08/08/1994 |
| 5,509,682 | 23/04/1996 | Lindenman et al. | 280 | 440 | 07/10/0994 |
| 5,513,870 | 07/05/1996 | Hickman | 280 | 477 | 24/05/1995 |
| 5,516,137 | 14/05/1996 | Kass et al. | 280 | 434 | 28/11/1994 |
| 5,516,139 | 14/05/1996 | Woods | 280 | 477 | 17/02/1995 |
| 5,529,329 | 25/06/1996 | McCoy | 280 | 438.1 | 28/11/1994 |
| 5,529,330 | 25/06/1996 | Roman | 280 | 477 | 23/01/1995 |
| 5,558,352 | 24/09/1996 | Mills | 280 | 477 | 01/03/1995 |
| 5,580,076 | 03/12/1996 | DeRoule et al. | 280 | 406.2 | 01/09/1993 |
| 5,580,088 | 03/12/1996 | Griffith | 280 | 479.2 | 04/10/1995 |
| 5,650,764 | 22/07/1997 | McCullough | 340 | 431 | 25/08/1994 |
| 5,657,175 | 12/08/1997 | Brewington | 359 | 872 | 23/07/1992 |
| 5,669,621 | 23/09/1997 | Lockwood | 280 | 477 | 22/11/1993 |
| 5,678,839 | 21/10/1997 | Pobud, Jr. et al. | 280 | 491.5 | 11/05/1995 |
| 5,680,706 | 28/10/1997 | Talcott | 33 | 286 | 28/02/1996 |
| 5,690,348 | 25/11/1997 | Williams, Jr. | 280 | 477 | 28/08/1995 |
| 5,697,630 | 16/12/1997 | Thompson et al. | 280 | 477 | 17/11/1995 |
| 5,707,070 | 13/01/1998 | Lindenman et al. | 280 | 438.1 | 20/10/1995 |
| 5,725,231 | 10/03/1998 | Buie | 280 | 455.1 | 20/11/1995 |
| 5,758,893 | 02/06/1998 | Schultz | 280 | 477 | 27/02/1996 |
| 5,769,443 | 23/06/1998 | Muzny | 280 | 477 | 11/01/1996 |
| 5,779,256 | 14/07/1998 | Vass | 280 | 477 | 26/03/1996 |
| 5,785,330 | 28/07/1998 | Shoquist | 280 | 81.6 | 29/10/1996 |
| 5,797,616 | 25/08/1998 | Clement | 280 | 477 | 03/05/1996 |
| 5,806,196 | 15/09/1998 | Gibbs et al. | 33 | 333 | 14/04/1997 |
| 5,806,872 | 15/09/1998 | Szczypski | 280 | 479.2 | 03/10/1996 |
| 5,821,852 | 13/10/1998 | Fairchild | 340 | 431 | 20/05/1997 |
| 5,839,745 | 24/11/1998 | Cattau et al. | 280 | 434 | 31/07/1996 |
| 5,882,027 | 16/03/1999 | Tevis | 280 | 433 | 07/12/1995 |
| 5,882,029 | 16/03/1999 | Kennedy | 280 | 477 | 18/08/1997 |
| 5,887,884 | 30/03/1999 | Smith | 280 | 489 | 29/01/1997 |
| 5,893,575 | 13/04/1999 | Larkin | 280 | 491.1 | 23/05/1997 |
| 5,909,892 | 08/06/1999 | Richardson | 280 | 477 | 21/03/1997 |
| 5,924,716 | 20/07/1999 | Burkhart, Sr. et al. | 280 | 476.1 | 23/10/1996 |
| 5,927,229 | 27/07/1999 | Karr, Jr. | 116 | 28 R | 14/05/1998 |
| 5,927,742 | 27/07/1999 | Draper | 280 | 477 | 27/12/1996 |
| 5,951,035 | 14/09/1999 | Phillips, Jr. et al. | 280 | 477 | 11/03/1997 |
| 5,970,619 | 26/10/1999 | Wells | 33 | 264 | 20/06/1997 |
| 5,975,552 | 02/11/1999 | Slaton | 280 | 478.1 | 02/12/1997 |
| 5,979,927 | 09/11/1999 | Hale | 280 | 477 | 17/11/1997 |
| 6,010,142 | 04/01/2000 | McCoy et al. | 280 | 490.1 | 18/08/1994 |
| 6,042,136 | 28/03/2000 | Heinecke | 280 | 477 | 22/06/1998 |
| 6,076,847 | 20/06/2000 | Thornton | 280 | 477 | 26/08/1998 |
| 6,086,083 | 11/07/2000 | Wilks | 280 | 479.1 | 26/01/1998 |
| 6,089,590 | 18/07/2000 | Bowers | 280 | 477 | 17/03/1999 |
| 6,102,422 | 15/08/2000 | Damron | 280 | 477 | 27/10/1997 |
| 6,179,318 B1 | 30/01/2001 | Howard | 280 | 477 | 19/07/1999 |
| 6,182,997 B1 | 06/02/2001 | Ullrich et al. | 280 | 476.1 | 20/09/1999 |
| 6,193,258 B1 | 27/02/2001 | Kennedy | 280 | 477 | 13/11/1998 |
| 6,259,357 B1 | 10/07/2001 | Heider | 340 | 431 | 30/12/1999 |
| 6,312,004 B1 | 06/11/2001 | Kiss | 280 | 507 | 20/04/2000 |
| 6,318,747 | 20/11/2001 | Ratican | 280 | 477 | 21/07/1999 |
| 6,341,794 | 29/01/2002 | Hunter | 280 | 477 | 01/11/2000 |
| 6,348,112 B1 | 19/02/2002 | Hildreth et al. | 148 | 658 | 05/01/2000 |
| 6,357,126 B1 | 19/03/2002 | Gillen, Jr. | 33 | 264 | 10/05/2000 |
| 6,357,777 B1 | 19/03/2002 | Linger et al. | 280 | 441 | 13/04/2000 |
| 6,634,666 B2 | 21/10/2003 | Shilitz et al. | 280 | 470 | 04/12/2001 |
| US 2002/0185838 A1 | Published 12/12/2002 | Shilitz et al. | 280 | 467 | 21/03/2002 |

What is claimed is:

1. An adjustable trailer coupling system comprising:
   a. a trailer;
   b. a coupler element rigidly mounted to said trailer and laterally immovable relative thereto;
   c. a pedestal to which said trailer is responsive, said pedestal comprising a vertically extensible pedestal part that extends downwards from a trailer portion to an underlying surface,
   wherein said vertically extensible pedestal part is laterally immobile relative to said underlying surface during lateral adjustment of said coupler element, and
   wherein said coupler element is laterally movable relative to said vertically extensible pedestal part,
   d. a continuous movement, retentive lateral trailer adjustment element fixedly mounted to said trailer and established above said vertically extensible pedestal part;
   e. a pedestal mount connecting said continuous movement, retentive lateral trailer adjustment element and said pedestal; and
   f. an actuator element to which said retentive lateral trailer adjustment element is responsive.

2. An adjustable trailer coupling system as described in claim 1 and further comprising a frame mount to which said continuous movement, retentive lateral trailer adjustment element fixedly mounted to said trailer is responsive.

3. An adjustable trailer coupling system as described in claim 1 wherein said continuous movement, retentive lateral trailer adjustment element fixedly mounted to said trailer comprises a screw element.

4. An adjustable trailer coupling system as described in claim 3 wherein said screw element comprises a screw element selected from a group consisting of a worm gear mechanism and a miter gear mechanism.

5. An adjustable trailer coupling system as described in claim 1 wherein said continuous movement, retentive lateral trailer adjustment element fixedly mounted to said trailer comprises an adjustment element selected from a group consisting of a rack and pinion element and a gear element.

6. An adjustable trailer coupling system as described in claim 1 wherein said continuous movement, retentive lateral trailer adjustment element fixedly mounted to said trailer comprises a shaft element.

7. An adjustable trailer coupling system as described in claim 1 wherein said continuous movement, retentive lateral trailer adjustment element fixedly mounted to said trailer comprises a motor drive.

8. An adjustable trailer coupling system as described in claim 3 wherein said continuous movement, retentive lateral trailer adjustment element fixedly mounted to said trailer comprises a motor drive.

9. An adjustable trailer coupling system as described in claim 1 wherein said continuous movement, retentive lateral trailer adjustment element fixedly mounted to said trailer comprises a pneumatic drive element.

10. An adjustable trailer coupling system as described in claim 1 wherein said continuous movement, retentive lateral trailer adjustment element fixedly mounted to said trailer comprises a hydraulic drive element.

11. An adjustable trailer coupling system as described in claim 1 wherein said actuator element to which said retentive lateral trailer adjustment element is responsive comprises a remote actuator element.

12. An adjustable trailer coupling system as described in claim 11 wherein said remote actuator element to which said retentive lateral trailer adjustment element is responsive comprises a manual actuator element.

13. An adjustable trailer coupling system as described in claim 12 wherein said manual actuator element comprises a hand crank.

14. An adjustable trailer coupling system as described in claim 1 wherein said actuation mechanism to which said retentive lateral trailer adjustment element is responsive comprises a manual actuator element.

15. An adjustable trailer coupling system as described in claim 14 wherein said manual actuator element comprises a hand crank.

16. An adjustable trailer coupling system as described in claim 15 wherein said actuator element to which said retentive lateral trailer adjustment element is responsive comprises an actuator element selected from a group consisting of a detachable actuator element and a folding actuator element.

17. An adjustable trailer coupling system as described in claim 15 wherein said actuator element to which said retentive lateral trailer adjustment element is responsive comprises an adjustable actuator element.

18. An adjustable trailer coupling system as described in claim 17 wherein said adjustable actuator element comprises a telescoping shaft.

19. An adjustable trailer coupling system as described in claim 1 and further comprising:
   a. a trailer body; and
   b. a plurality of trailer wheels to which said trailer body is responsive.

20. An adjustable trailer coupling system as described in claim 19 wherein said trailer body comprises a trailer body selected from a group consisting of a boat trailer body, a recreational vehicle body, a camper body, a horse trailer body, a utility trailer body, a vehicle towing trailer body, an agricultural use trailer body, a flat bed trailer body, and a heavy duty trailer body.

21. An adjustable trailer coupling system as described in claim 19 wherein said continuous movement, retentive lateral trailer adjustment element fixedly mounted to said trailer comprises an independent trailer vertical support.

22. An adjustable trailer coupling system as described in claim 19 and further comprising a second retentive lateral trailer adjustment element.

23. An adjustable trailer coupling system as described in claim 22 and further comprising a lateral trailer adjustment connection element to which both said retentive lateral trailer adjustment element and said second retentive lateral trailer adjustment element are equally responsive.

24. An adjustable trailer coupling system as described in claim 23 wherein said actuator element to which said retentive lateral trailer adjustment element is responsive comprises a shared actuator element to which both said retentive lateral trailer adjustment element and said second retentive lateral trailer adjustment element are equally responsive.

25. An adjustable trailer coupling system as described in claim 19 wherein said actuator element to which said retentive lateral trailer adjustment element is responsive comprises a detachable actuator element.

26. An adjustable trailer coupling system as described in claim 19 wherein said actuator element to which said retentive lateral trailer adjustment element is responsive comprises an adjustable actuator element.

27. An adjustable trailer coupling system as described in claim 1 wherein said pedestal comprises a gooseneck pedestal, and wherein said actuator element to which said retentive lateral trailer adjustment element is responsive comprises:
   a. a gooseneck pedestal lateral movement guide; and
   b. a gooseneck pedestal movement slide element.

28. An adjustable trailer coupling system as described in claim 27 wherein said gooseneck pedestal lateral movement guide comprises a pair of gooseneck pedestal movement guides, and wherein said gooseneck pedestal movement slide element comprises a dual pairing of gooseneck pedestal rollers.

29. An adjustable trailer coupling system as described in claim 27 and further comprising:
   a. a pedestal movement housing to which said continuous movement, retentive lateral trailer adjustment element fixedly mounted to said trailer is responsive; and
   b. an elements shield situated adjacent said pedestal movement housing.

30. An adjustable trailer coupling system as described in claim 1 wherein said pedestal comprises a tongue pedestal, and wherein said actuator element to which said retentive lateral trailer adjustment element is responsive comprises:
   a. a tongue pedestal lateral movement guide; and
   b. a tongue pedestal movement slide element.

31. An adjustable trailer coupling system as described in claim 30 wherein said tongue pedestal lateral movement guide comprises a pair of tongue pedestal movement guides, and wherein said tongue pedestal movement slide element comprises a dual pairing of tongue pedestal rollers.

32. An adjustable trailer coupling system as described in claim 30 and further comprising:
   a. a pedestal movement housing to which said continuous movement, retentive lateral trailer adjustment element fixedly mounted to said trailer is responsive; and
   b. an elements shield situated adjacent said pedestal movement housing.

33. An adjustable trailer coupling system as described in claim 30 wherein said coupler element comprises an A-frame hitch element.

34. An adjustable trailer coupling system as described in claim 1 wherein said coupler element comprises a pintle hitch element.

35. An adjustable trailer coupling system as described in claim 1 wherein said coupler element comprises a trailer coupler element selected from the group consisting of: a $5^{th}$ wheel element, a pin hitch element, a ball hitch element, a receiver hitch element, an insert hitch element, a tube hitch element, a bumper hitch element, and a plate hitch element.

36. An adjustable trailer coupling system as described in claim 1 wherein said continuous movement, retentive lateral trailer adjustment element fixedly mounted to said trailer comprises an independent trailer vertical support.

37. An adjustable trailer coupling system as described in claim 1 and further comprising a second retentive lateral trailer adjustment element.

38. An adjustable trailer coupling system as described in claim 1 and further comprising a trailer vertical adjustment element.

39. An adjustable trailer coupling system as described in claim 1 wherein said pedestal is at least part of a trailer vertical adjustment element.

40. An adjustable trailer coupling system as described in claim 39 wherein said trailer vertical adjustment element comprises a vertical jack.

41. An adjustable trailer coupling system as described in claim 39 wherein said trailer vertical adjustment element comprises at least two vertical adjustment elements.

42. An adjustable trailer coupling system as described in claim 41 wherein said at least two vertical adjustment elements comprise at least two vertical jacks.

43. An adjustable trailer coupling system as described in claim 1 wherein said continuous movement, retentive lateral trailer adjustment element fixedly mounted to said trailer comprises an independent lateral adjustment element.

* * * * *